United States Patent
Wang et al.

(10) Patent No.: US 10,937,610 B2
(45) Date of Patent: Mar. 2, 2021

(54) KEYBOARD KEYSWITCHES HAVING ADJUSTABLE TACTILE FEEDBACK MEMBERS

(71) Applicant: Darfon Electronics, Taoyuan (TW)

(72) Inventors: Yung-Chih Wang, Taoyuan (TW); Chia-Hung Liu, Taoyuan (TW); Yu-Chun Hsieh, Taoyuan (TW); Chen Yang, Taoyuan (TW); Chih-Yao Chi, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 16/534,519

(22) Filed: Aug. 7, 2019

(65) Prior Publication Data
US 2019/0393004 A1    Dec. 26, 2019

Related U.S. Application Data

(63) Continuation-in-part of application No. 16/448,282, filed on Jun. 21, 2019.

(30) Foreign Application Priority Data

Jun. 22, 2018   (TW) ................. 10712158.8
Aug. 7, 2018    (TW) ................. 10712749.3

(51) Int. Cl.
*H01H 13/85*     (2006.01)
*H01H 13/705*    (2006.01)
(Continued)

(52) U.S. Cl.
CPC ........... *H01H 13/85* (2013.01); *G06F 3/0202* (2013.01); *H01H 13/705* (2013.01);
(Continued)

(58) Field of Classification Search
CPC .. H01H 13/705; H01H 13/85; H01H 2215/00; H01H 2215/028; G06F 3/0202; G06F 3/0216
See application file for complete search history.

(56) References Cited

U.S. PATENT DOCUMENTS 3,674,970 A    7/1972  Bedocs
4,447,681 A    5/1984  Desmarais
(Continued)

FOREIGN PATENT DOCUMENTS

CN    201047939 Y    4/2008
CN    203812764 U    9/2014
(Continued)

OTHER PUBLICATIONS

European Search Report in related application 19190555.3 dated Jan. 21, 2020.
(Continued)

*Primary Examiner* — Vanessa Girardi
(74) *Attorney, Agent, or Firm* — Patterson + Sheridan, LLP

(57) ABSTRACT

A keyboard includes a plurality of keyswitch structures and an adjusting plate movably disposed under the keyswitch structures. Each of the keyswitch structures includes a tactile feedback member. The adjusting plate includes a plate body and a plurality of adjusting bars protruding from the plate body toward the keyswitch structures and respectively corresponding to the tactile feedback members of the keyswitch structures. When the adjusting plate moves relative to the keyswitch structures, the adjusting bars drive the tactile feedback members to change tactile feedback of the keyswitch structures.

21 Claims, 51 Drawing Sheets

(51) Int. Cl.
*G06F 3/02* (2006.01)
*H01H 13/88* (2006.01)
*H01H 13/86* (2006.01)

(52) U.S. Cl.
CPC ............ *H01H 13/86* (2013.01); *H01H 13/88* (2013.01); *H01H 2215/00* (2013.01)

(56) References Cited

U.S. PATENT DOCUMENTS

| | | | |
|---|---|---|---|
| 4,553,009 | A | 11/1985 | Van Zeeland et al. |
| 4,939,327 | A | 7/1990 | Wu et al. |
| 4,990,731 | A | 2/1991 | Wu et al. |
| 5,015,811 | A | 5/1991 | Moriyama et al. |
| 6,172,868 | B1 | 1/2001 | Oura |
| 6,236,339 | B1 | 5/2001 | Kamizono |
| 8,305,241 | B2 * | 11/2012 | Wang ............... G06F 3/0202 341/24 |
| 10,079,123 | B2 | 9/2018 | Yu |
| 10,102,987 | B1 | 10/2018 | Alexander et al. |
| 10,128,063 | B2 | 11/2018 | Liao et al. |
| 10,310,609 | B2 | 6/2019 | Liu |
| 10,431,402 | B2 | 10/2019 | Hsieh et al. |
| 2017/0213663 | A1 | 7/2017 | Jhuang |
| 2018/0006648 | A1 | 1/2018 | Liu |
| 2018/0074587 | A1 | 3/2018 | Liu |
| 2018/0137997 | A1 | 5/2018 | Wang et al. |
| 2019/0164703 | A1 | 5/2019 | Yang et al. |
| 2019/0393003 | A1 | 12/2019 | Wang et al. |

FOREIGN PATENT DOCUMENTS

| | | | | |
|---|---|---|---|---|
| CN | 104867771 | A | 8/2015 | |
| CN | 104882316 | A | 9/2015 | |
| CN | 105206456 | A | 12/2015 | |
| CN | 105206457 | A | 12/2015 | |
| CN | 205542520 | U | 8/2016 | |
| CN | 106024474 | * | 12/2016 | ............ H01H 13/02 |
| CN | 205789638 | U | 12/2016 | |
| CN | 106683930 | A | 5/2017 | |
| CN | 206379297 | U | 8/2017 | |
| CN | 206774427 | U | 12/2017 | |
| CN | 207068731 | U | 3/2018 | |
| CN | 108010775 | A | 5/2018 | |
| CN | 108269710 | A | 7/2018 | |
| CN | 108346539 | A | 7/2018 | |
| CN | 207868107 | U | 9/2018 | |
| CN | 108922810 | A | 11/2018 | |
| CN | 108091514 | B | 6/2019 | |
| JP | H 0428123 | A | 1/1992 | |
| JP | H11265252 | A | 9/1999 | |
| TW | 195991 | | 12/1992 | |
| TW | 201705173 | A | 2/2017 | |
| TW | I581290 | B | 5/2017 | |
| TW | 201727685 | A | 8/2017 | |
| TW | I607476 | B | 12/2017 | |
| TW | I667676 | B | 8/2019 | |
| WO | 2018133440 | A1 | 7/2018 | |

OTHER PUBLICATIONS

European Search Report in related application EP 19218006.5 dated Apr. 2, 2020.
Non-Final Rejection in related application US20190393003 dated Jul. 29, 2020.
Chinese Office Action in related applicaiton 2020091101963200 dated Sep. 16, 2020.
Chinese Office Action dated Oct. 9, 2020, for Chinese Patent Application No. 201910727509.9.

* cited by examiner

KEYBOARD KEYSWITCHES HAVING ADJUSTABLE TACTILE FEEDBACK MEMBERS

CROSS REFERENCE TO RELATED APPLICATIONS

The application is a continuation-in-part of U.S. patent application Ser. No. 16/448,282, filed on Jun. 21, 2019; which application claims benefit of Taiwan patent application no. 107127493, filed on Aug. 7, 2018 and Taiwan patent application no. 10712588, filed on Jun. 22, 2018. Each of the above referenced applications is incorporated herein by reference in its entirety.

BACKGROUND

1. Field

This disclosure generally relates to a keyboard. Particularly, the disclosure relates to a keyboard with adjustable tactile feedback.

2. Description of the Prior Art

Keyswitches in a conventional keyboard generally provide only one kind of tactile feedback. Users have to select the keyboard with appropriate tactile feedback among keyboards with different kinds of tactile feedback according to personal pressing habits. However, when the user is under different operation situations, such as typing, gaming, it is generally desirable to have different tactile feedbacks, so that keyboards that provide merely a single type of tactile feedback cannot satisfy the user's needs, and the user has to purchase additional keyboards with different tactile feedbacks, resulting in extra cost and storage concerns for keyboards not in use.

SUMMARY

It is an object of the disclosure to provide a keyboard, which can provide multiple kinds of tactile feedback for users to choose, so as to satisfy users' needs.

In an embodiment, the disclosure provides a keyboard including a plurality of keyswitch structures and an adjusting plate movably disposed under the keyswitch structures. Each of the keyswitch structures includes a tactile feedback member, and the adjusting plate includes a plate body and a plurality of adjusting bars protruding from the plate body toward the keyswitch structures and respectively corresponding to the tactile feedback members of the keyswitch structures. When the adjusting plate moves relative to the keyswitch structures, the adjusting bars drive the tactile feedback members to change tactile feedback of the keyswitch structures.

In an embodiment, the keyboard further includes a bottom housing. The adjusting plate is movably disposed on the bottom housing. The adjusting plate has a control member coupling with the plate body. The control member is exposed outside the bottom housing and provided for a user to control the movement of the adjusting plate to different positions.

In an embodiment, the keyboard further includes a bottom housing disposed under the adjusting plate and a linking mechanism movably disposed on the bottom housing and coupling with the adjusting plate. When the linking mechanism moves relative to the bottom housing, the adjusting plate moves along with the linking mechanism.

In an embodiment, the linking mechanism includes a first linking bar movably disposed on the bottom housing and a second linking bar rotatably disposed on the bottom housing. A first end of the second linking bar couples with the first linking bar, and a second end of the second linking bar couples with the plate body.

In an embodiment, the plate body has a coupling portion. The coupling portion is bent downward from the plate body to couple with the second end of the second linking bar.

In an embodiment, he first linking bar has an accommodation portion. the first end of the second linking bar is accommodated in the accommodation portion. The second end of the second linking bar is pivotally connected to the bottom housing.

In an embodiment, the keyboard further includes a set of magnetic members disposed corresponding to the bottom housing and the first linking bar. When the linking mechanism moves, the set of magnetic members are selectively close to or away from each other.

In an embodiment, the keyboard further includes a switch unit and an indicator electrically connected to the switch unit. The adjusting plate further includes an indicator bar disposed corresponding to the switch unit. When the linking mechanism moves, the indicator bar selectively triggers the switch unit to change an indicating status of the indicator to indicate whether the tactile feedback of the keyswitch structures is changed.

In an embodiment, the linking mechanism includes a rotatable unit rotatably disposed on the bottom housing, a first linking bar coupling with the rotatable unit, and a second linking bar rotatably disposed on the bottom housing. A first end of the second linking bar couples with the first linking bar, and a second end of the second linking bar couples with the plate body.

In an embodiment, the keyboard further includes a resilient member connected to the second linking bar and the bottom housing.

In an embodiment, the keyboard further includes a set of magnetic members disposed corresponding to the rotatable unit and the bottom housing. When the rotatable unit rotates, the set of magnetic members are selectively close to or away from each other.

In an embodiment, the linking mechanism includes a rotatable unit and a coupling unit coupling the rotatable unit and the adjusting plate. The rotatable unit is rotatable about a rotation axis and has a slot having a first end and a second end. A distance between the first end and the rotation axis is different from a distance between the second end and the rotation axis.

In an embodiment, the coupling unit has a protrusion. When the rotatable unit rotates relative to the bottom housing, the slot rotates relative to the protrusion, so the protrusion is located in the slot near the first end or the second end to drive the adjusting plate to move.

In an embodiment, the linking mechanism includes a rotatable unit rotatable about a rotation axis. The rotatable unit has a slot having a first end and a second end. A distance between the first end and the rotation axis is different from a distance between the second end and the rotation axis. The adjusting plate has a protrusion. When the rotatable unit rotates relative to the bottom housing, the slot rotates relative to the protrusion, so the protrusion is located in the slot near the first end or the second end to drive the adjusting plate to move.

In an embodiment, the keyboard further includes a first magnetic member and a second magnetic member disposed on the bottom housing. The rotatable unit has a magnetic portion. When rotatable unit rotates, the magnetic portion is selectively close to the first magnetic member or the second magnetic member.

In an embodiment, the keyboard includes a set of magnetic members disposed corresponding to the adjusting plate and the bottom housing, wherein when the adjusting plate moves, the set of magnetic members are selectively close to or away from each other.

In an embodiment, the tactile feedback member includes a positioning portion and an extending arm. The adjusting bar corresponds to the positioning portion or the extending arm. When the adjusting plate moves, the adjusting bar drives the positioning portion or the extending arm to move to change a relative position of the positioning portion and the extending arm.

In another embodiment, the disclosure provides a keyboard including a keyswitch module and an auxiliary module connected to the keyswitch module. The keyswitch module includes a plurality of keyswitch structures, an adjusting plate disposed under the keyswitch structures, a bottom housing disposed under the adjusting plate, and a linking mechanism movably disposed on the bottom housing and coupling with the adjusting plate. Each of the keyswitch structures includes a tactile feedback member. The adjusting plate includes a plate body and a plurality of adjusting bars protruding from the plate body toward the keyswitch structures and respectively corresponding to the tactile feedback members of the keyswitch structures. The auxiliary module includes a driving device and a coupling member. The coupling member couples the driving device and the linking mechanism. The driving device drives the coupling member to move to drive the linking mechanism to move relative to the bottom housing, so that the adjusting plate moves along with the linking mechanism, and the adjusting bars drive the tactile feedback members to change tactile feedback of the keyswitch structures.

In an embodiment, the auxiliary module is detachably connected to the keyboard module, and the auxiliary module is electrically connected to the keyswitch module by a pogo pin.

In an embodiment, the auxiliary module further includes a wireless module. The keyswitch module is wirelessly connected to an information processing device by the wireless module.

Compared to the prior art, the keyboard of the disclosure can change the tactile feedback of multiple keyswitch structures by controlling a single adjusting plate, thereby quickly and conveniently satisfying the user's need for tactile feedback.

BRIEF DESCRIPTION OF THE DRAWINGS

FIGS. 20A and 20B are a perspective view and an exploded of an embodiment of the keyswitch module of the disclosure, respectively.

FIG. 21 is a partial enlarged view of an embodiment of the keyswitch module of the disclosure.

FIGS. 22A and 22B are an exploded view and an assembly view of an embodiment of the first linking bar and the base, respectively.

DETAILED DESCRIPTION

The disclosure provides a keyswitch structure, particularly a keyswitch structure with adjustable tactile feedback. The keyswitch structure can be applied to independent keyboards or integrated into electronic devices to provide multiple tactile feedbacks, such as different stiffnesses (i.e. different required pressing forces), dome-collapse-like tactile feedback, linear feedback. Hereinafter, the keyswitch structure of the disclosure will be described in detail with reference to the drawings.

Figure 1A:
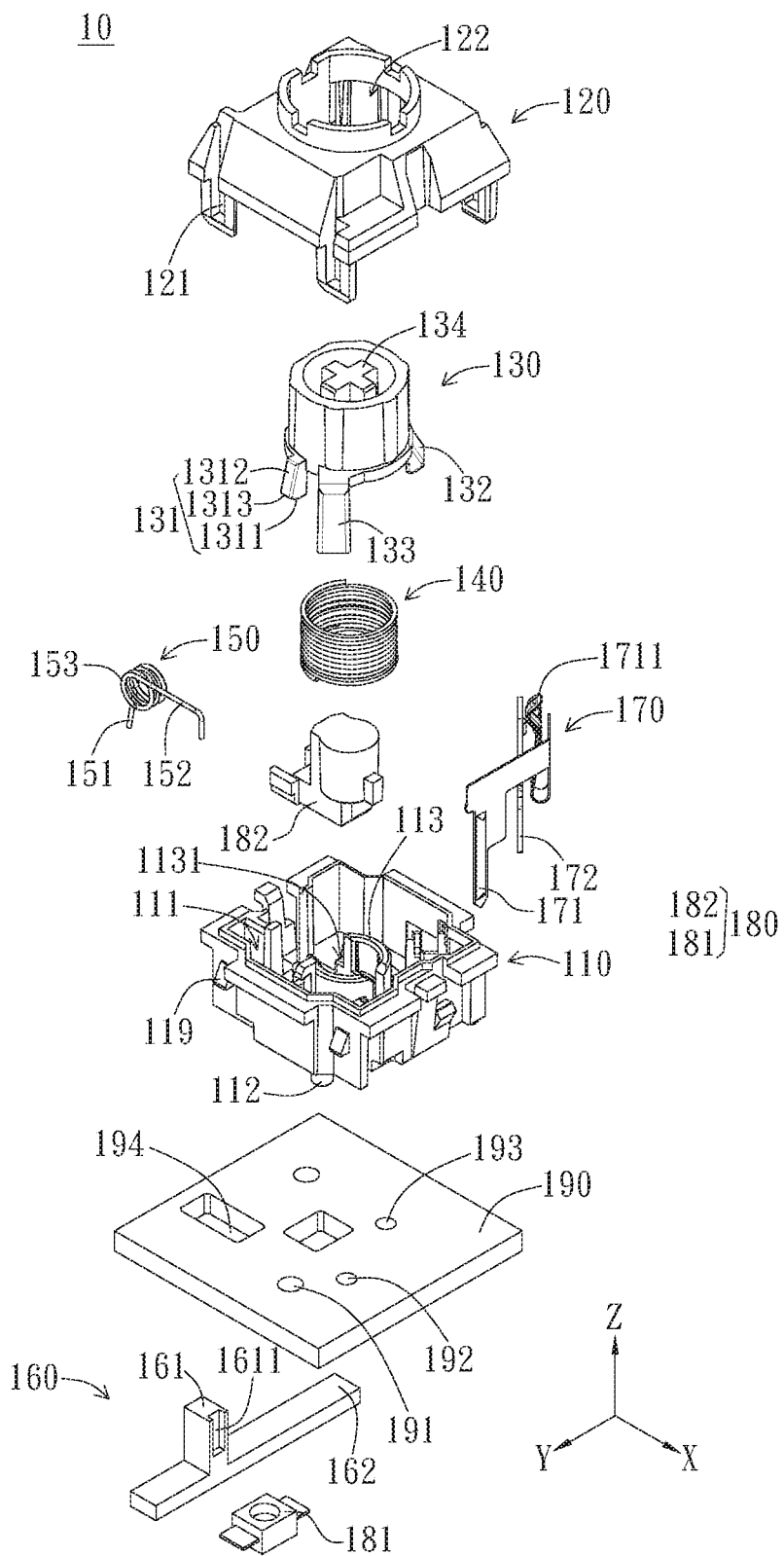
FIGS. 1A and 1B are exploded views of a first embodiment of the keyswitch structure of the invention from different viewing angles.
Figure 1B:
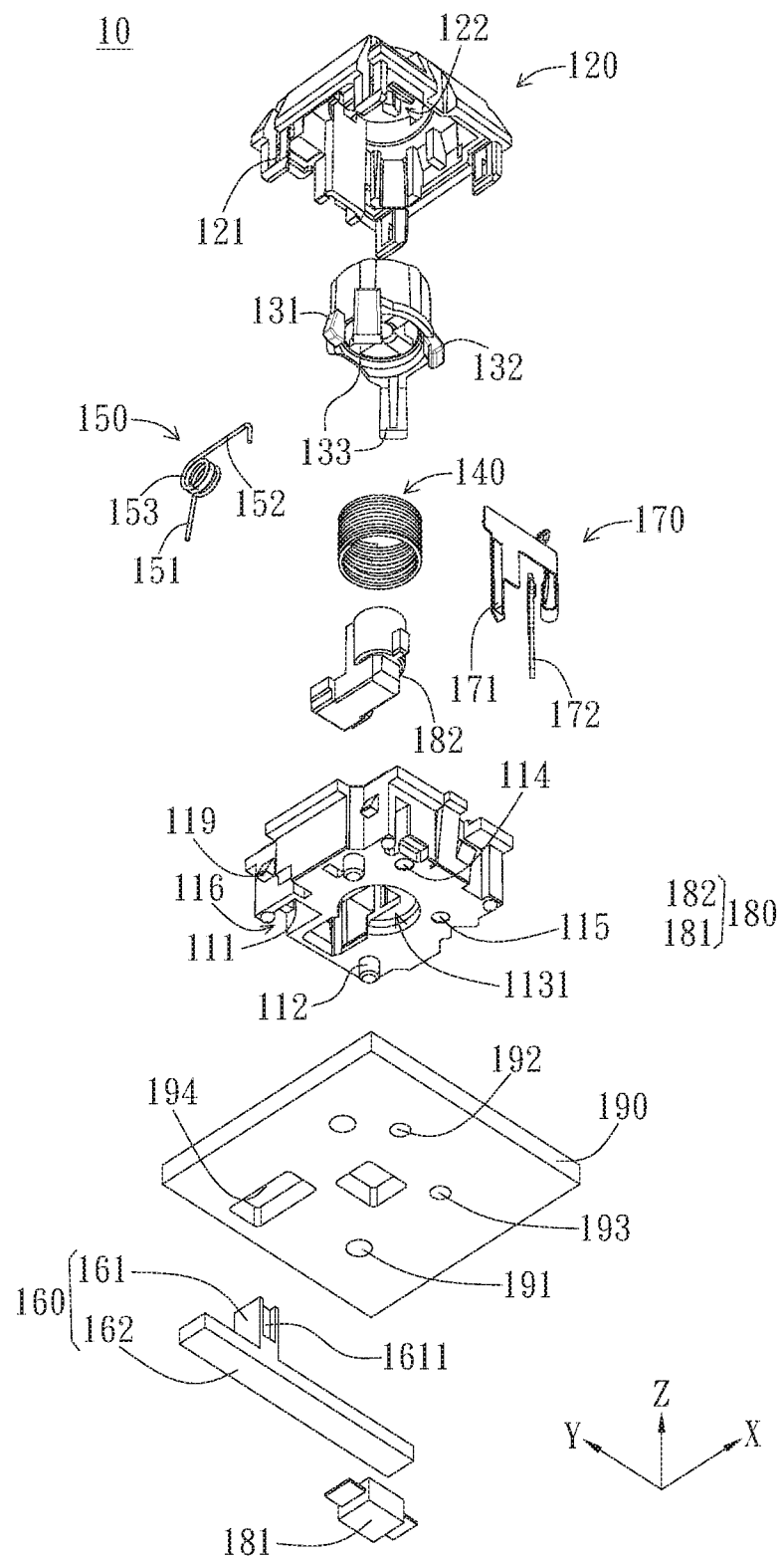
Figure 1C:
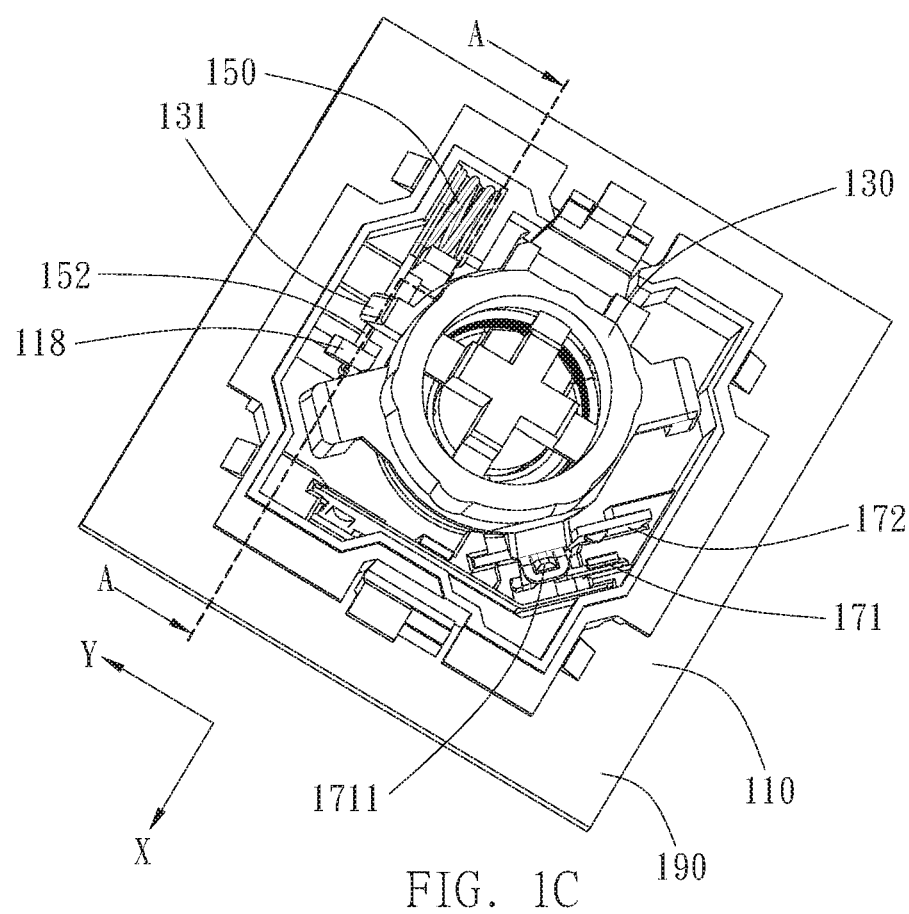
FIG. 1C is an assembly view of FIG. 1A without the cover.

FIGS. 1A and 1B are exploded views of an embodiment of the keyswitch structure of the disclosure from different viewing angles. FIG. 1C is an assembly view of FIG. 1A without the cover. As shown in FIGS. 1A to 1C, in an embodiment, a keyswitch structure 10 includes a base 110, a cover 120, a plunger 130, a restoring unit 140, a tactile feedback member 150, and an adjusting unit 160. The base 110 has a positioning means 111. The cover 120 is combined with the base 110. The plunger 130 is movably received within the cover 120 and capable of moving relative to the base 110. The plunger 130 has a cam portion 131. The restoring unit 140 is disposed between the base 110 and the plunger 130 to provide a restoring force to enable the plunger 130 to move along a direction away from the base 110. The tactile feedback member 150 has a positioning portion 151 and an extending arm 152. The positioning portion 151 is positioned by the positioning means 111, and the extending arm 152 extends across a moving path of the cam portion 131. The adjusting unit 160 is disposed corresponding to the positioning portion 151. The adjusting unit 160 is movable to drive the positioning portion 151 to shift, so that the tactile feedback member 150 has a first deformation or a second deformation, and a pressing force required for the cam portion 131 to pass the extending arm 152 when the plunger 130 moves toward the base 110 is changed.

From another aspect, the adjusting unit 160 is preferably coupled to the positioning portion 151 and selectively positioned at one of the first portion and the second position. When the adjusting unit 160 is positioned at the first position, the positioning portion 151 is driven by the adjusting unit 160 to make the tactile feedback member have the first deformation, so that the extending arm 152 applies a first resistant force against the cam portion 131. When the adjusting unit 160 is positioned at the second position, the positioning portion 151 is driven by the adjusting unit 160 to make the tactile feedback member have the second deformation, so that the extending arm 152 applies a second resistant force against the cam portion 131, and the first resistant force is different from the second resistant force.

The keyswitch structure 10 may further include an electrode module 170, a light source unit 180, a circuit board, a baseplate as appropriate. For example, the electrode module 170 is disposed in the base 110 corresponding to the plunger 130 to function as a switch component. When the plunger 130 moves toward the base 110, the electrode module 170 is triggered to generate a triggering signal. The light source unit 180 includes a light source 181 and a light guide 182 to provide light and enable the keyswitch structure 10 to be a luminous keyswitch.

Specifically, the base 110 can be disposed on the baseplate or the circuit board. In this embodiment, the base 110 is disposed on the circuit board 190 as an example, but not limited thereto. In another embodiment, when the base 110 is disposed on the baseplate, the circuit board can be optionally disposed above or below the baseplate according to practical applications. In an embodiment, the base 110 and the circuit board 190 are preferably positioned by a positioning mechanism. For example, the base 110 can have a positioning post 112, and the circuit board 190 has a corresponding hole 191, so that the base 110 can be positioned on the circuit board 190 by inserting the positioning post 112 into the hole 191, but not limited thereto. In other embodiments, the locations of the positioning post and the hole can be exchanged, or the base 110 can be positioned on the underlying component (e.g. the circuit board 190 or the baseplate) by other suitable manners, such as screwing, adhering, or leaning on.

The base 110 is preferably a base extending toward the X axis, the Y axis, and the Z axis directions, and the cover 120 is formed corresponding to the base 110. The base 110 is preferably combined with the cover 120 to form a housing with an accommodation space for accommodating the restoring unit 140, the tactile feedback member 150, the electrode module 170, and the light source unit 180 therein. For example, the base 110 may have a hook-like portion 119, and the cover 120 has a slot portion 121, so that the base 110 can be combined with the cover 120 along the Z axis direction by engaging the hook-like portion 119 with the slot portion 121.

The cover 120 has an opening 122 with a shape corresponding to the top portion of the plunger 130, so that the plunger 130 can extend from the bottom of the cover 120 to be movably disposed in the opening 122 of the cover 120 with the top portion of the plunger 130 protruding from the opening 122. The plunger 130 preferably has the cam portion 131, an actuating portion 132, a restricting portion 133, and a coupling portion 134. For example, the plunger 130 is preferably a barrel-like object, and the cam portion 131, the actuating portion 132, and the restricting portion 133 are preferably disposed along the periphery of the lower end of the plunger 130. The coupling portion 134 is preferably disposed on the top of the plunger 130.

Specifically, the cam portion 131 includes a bump extending downward. The bump has a lower surface 1311, an upper surface 1312, and a protrudent point 1313 between the lower surface 1311 and the upper surface 1312. For example, the bump can be an angular block, and the lower surface 1311 and the upper surface 1312 are preferably inclined toward each other and connected at the protrudent point 1313. That is, the protrudent point 1313 protrudes outward (e.g. in the Y-axis direction) with respect to the upper surface 1311 and the lower surface 1312. The actuating portion 132 is disposed corresponding to the electrode module 170, and the actuating portion 132 is preferably a block (e.g. angular block) and configured to selectively trigger the electrode module 170 to generate the triggering signal. The restricting portion 133 is preferably a pillar, and two restricting portions 133 radially extend from two opposite sides of the plunger 130, so that the distance between the two pillars is larger than the size of the opening 122 to prevent the plunger 130 from escaping from the cover 120 when the plunger 130 moves relative to the base 110 upwardly. The coupling portion 134 can a cross-shaped protrusion formed on the top of the plunger 130 and is configured to couple a keycap (not shown), but not limited thereto. In other embodiments, the coupling portion 134 can have other configurations (e.g. a coupling hole) to couple the keycap.

Figure 2A:
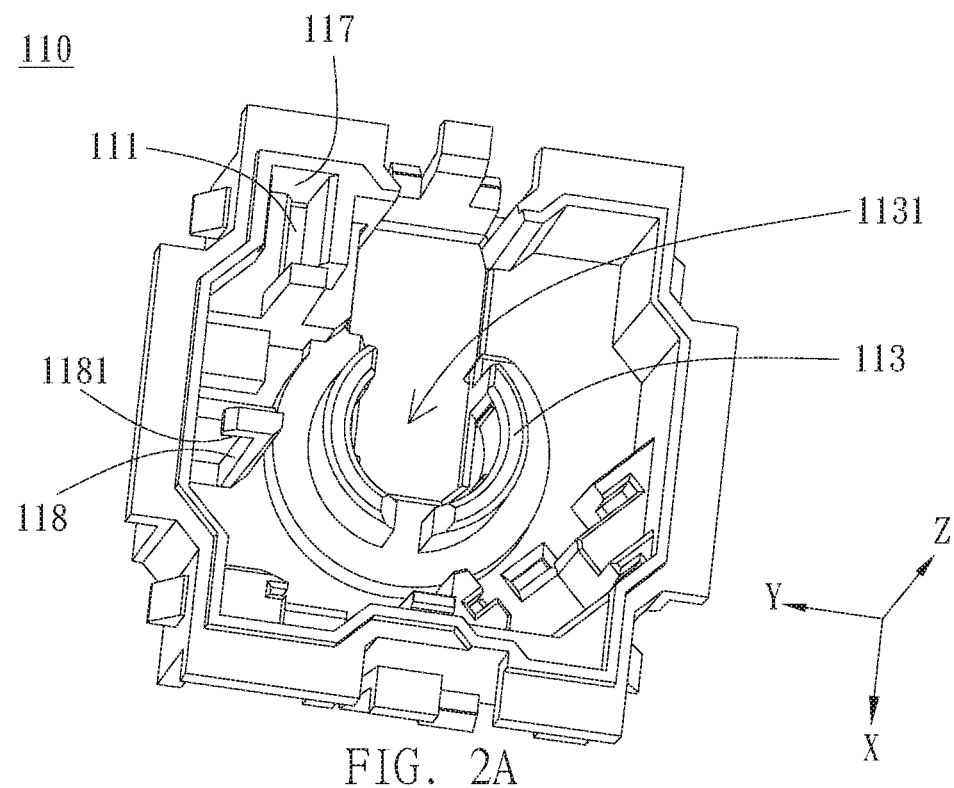
FIGS. 2A to 2C are schematic views of the base of the first embodiment of the invention from different viewing angles.
Figure 2B:
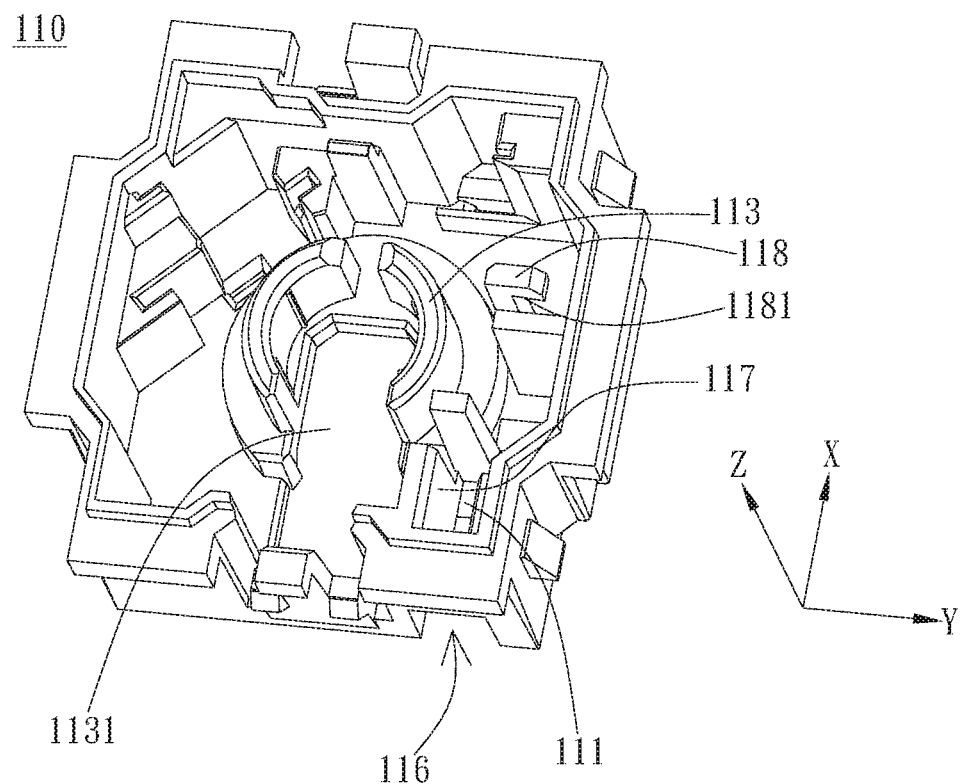
Figure 2C:
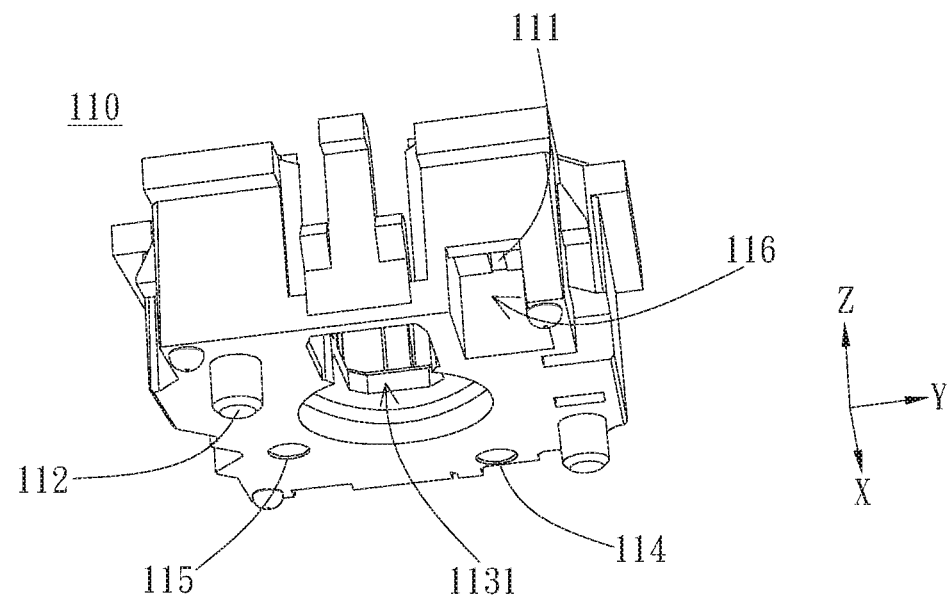

Referring to FIGS. 2A to 2C, the arrangement of components in the base 110 will be described in detail. In this embodiment, the restoring unit 140 is preferably a spring, and the base 110 has a holding portion 113, so the restoring unit 140 can be positioned by the holding portion 113. For example, the holding portion 113 can be a ring-shaped wall extending from the bottom surface of the base 110 toward the cover 120. One and of the spring served as the restoring unit 140 can be sleeved on the ring-shaped wall, and the other end of the spring is against the bottom surface of the plunger 130, so the top portion of the plunger 130 protrudes from the opening 122 of the cover 120. As such, when the keycap is pressed to push the plunger 130 to move toward the base 110, the plunger 130 compresses the spring, and when the pressing force is released, the spring provides the restoring force to enable the plunger 130 to move away from the base 110 to the position before pressing. Moreover, the base 110 preferably has an accommodating portion 1131 corresponding to the light source unit 180. For example, the accommodation portion 1131 can be a space surrounded by the ring-shaped wall to receive the light guide 182 therein. That is, the light guide 182 is positioned in the inner side of the holding portion 113, and the spring is positioned on the outer side of the holding portion 113. The base 110 is preferably formed with an opening at its bottom to communicate with the accommodation portion 1131, so that the light source 181 can be disposed corresponding to the opening under the light guide 182, which is disposed in the accommodation portion 1131, so as to emit light toward the light guide 182. In this embodiment, the light source 181 is preferably a light-emitting diode, but not limited thereto.

In an embodiment, the electrode module 170 includes a first electrode piece 171 and a second electrode piece 172 respectively disposed on the base 110 and electrically connected to the circuit board 190. For example, the base 110 has a first electrode hole 114 and a second electrode hole 115, and the circuit board 190 has a first coupling hole 192 and a second coupling hole 193 corresponding to the first electrode hole 114 and the second electrode hole 115, respectively. Specifically, the first electrode piece 171 and the second electrode piece 172 are preferably inserted into the first electrode hole 114 and the second electrode hole 115 respectively and further protrude out of the base 110 to be electrically connected to the first coupling hole 192 and the second coupling hole 193, but not limited thereto. In other embodiments, the circuit board 190 may not have the coupling holes, and the first electrode piece 171 and the second electrode piece 172 can be electrically connected to surface contact areas of the circuit board 190. In this embodiment, the first electrode piece 171 preferably abuts against the inner wall surface of the base 110, and the second electrode piece 172 is disposed corresponding to the first electrode piece 171. The first electrode piece 171 preferably has a flexible portion 1711 disposed corresponding to the actuating portion 132 of the plunger 130, so in response to the movement of the actuating portion 132, the first electrode piece 171 and the second electrode piece 172 can be selectively contacted to each other and triggered to generate the triggering signal. For example, when the keyswitch structure 10 is at the non-pressed position, the protrudent portion of the actuating portion 132 pushes the flexible portion 1711 outward away from the second electrode piece 172, so the first electrode piece 171 and the second electrode piece 172 are not contacted or conducted, and no triggering signal is generated. When the plunger 130 is pressed and moves toward the base 110, the actuating portion 132 moves downward along with the plunger 130, so the protrudent portion passes over the flexible portion 1711, enabling the flexible portion 1711 to bounce toward the second electrode piece 172. Therefore, the first electrode piece 171 and the second electrode piece 172 are contacted or conducted, and the triggering signal is generated.

It is noted that the electrode module 170 is illustrated as the switch component of the keyswitch structure 10 in the embodiment, but not limited thereto. In another embodiment, the keyswitch structure 10 may have other types of switch component, which selectively generates the triggering signal in response to the movement of the plunger 130. For example, the keyswitch structure 10 can include an emitter and a receiver, which are electrically connected to the circuit board 190 to function as the switch component, i.e. optical switch, so the keyswitch structure 10 can generate the triggering signal by changing the amount of light received by the receiver from the emitter when the plunger 130 moves toward the base 110.

In this embodiment, the tactile feedback member 150 can be implemented as a torsion spring. The positioning portion 151 and the extending arm 152 of the tactile feedback member 150 respectively extend from two opposite ends of the torsion spring. An angle between an extending direction of the positioning portion 151 and an extending direction of the extending arm 152 is preferably equal to or smaller than 120 degrees. For example, the positioning portion 151 and the extending arm 152 are two rods extending from two opposite ends of the spring body 153, and the angle between the extending directions of the two rods is preferably not more than 120 degrees.

As shown in the drawings, the base 110 preferably has a positioning hole or opening to serve as the positioning means 111, which is configured to allow the positioning portion 151 to be inserted therein to position the tactile feedback member 150. In an embodiment, the positioning means 111 is preferably an elongated through hole formed on the bottom of the base 110 along the X-axis direction to allow the positioning portion 151 to shift relative to the positioning means 111. Moreover, corresponding to the positioning means 111, the base 110 preferably further has a receiving portion 116 configured to accommodate the adjusting unit 116. For example, the receiving portion 116 is preferably a notch, which is partially hollowed out from the sidewall adjacent to the positioning means 111 toward the bottom of the base 110. The receiving portion 116 communicates with the positioning means 111, so when the adjusting unit 116 moves in the receiving portion 116, the positioning portion 151 can be pushed to move relative to the positioning means 111, but not limited thereto. In another embodiment, the receiving portion 116 can be an opening, which is formed on the bottom of the base 110 and communicates with the positioning means 111. The base 110 preferably further has an accommodation area 117 configured to accommodate the spring body 153 of the tactile feedback member 150. For example, the accommodation area 117 can be a space defined by a plurality of partition walls to restrict the movement of the tactile feedback member 150. When the adjusting unit 160 pushes the positioning portion 151, the spring body 153 is confined in the accommodation area 117, so the tactile feedback member 150 has a different deformation. The base 110 further includes an impact portion 118, which is configured to be hit by the extending arm 152 to generate a sound. For example, the impact portion 118 can be a wall protruding from the bottom of the base 110 toward the cover 120, and the wall has an impact surface 1181 facing the extending arm 152. When the tactile feedback member 150 is disposed in base 110, the positioning portion 151 is inserted into the positioning means 111, the spring portion 153 is received in the accommodation area 117, and the extending arm 152 extends across the moving path of the cam portion 131 of the plunger 130. That is, the positioning portion 151 is inserted into the positioning means 111 substantially along the Z-axis direction and at least partially located in receiving portion 116, and the extending arm 152 substantially extends along the X-axis direction to pass below the cam portion 131.

In an embodiment, the adjusting unit 160 is preferably disposed corresponding to the tactile feedback member 150. The adjusting unit 160 preferably includes an adjusting bar 161 and a connection portion 162. The connection portion 162 is disposed under the circuit board 190, and the adjusting bar 161 is connected to the connection portion 162 and extends toward the cover 120, e.g. the Z-axis direction. For example, the circuit board 190 has a guiding slot 194 corresponding to the receiving portion 116. The adjusting bar 161 is inserted from bottom of the circuit board 190 into the guiding slot 194 and extends to the receiving portion 116, so the adjusting bar 161 can be coupled to the positioning portion 151, which protrudes from the positioning means 111 to the receiving portion 116. When the adjusting unit 160 moves, the adjusting bar 161 drives the positioning portion 111 to shift, so the tactile feedback member 150 can have a different deformation. In an embodiment, the adjusting bar 161 preferably has a groove 1611. The groove 1611 is preferably disposed along the lengthwise direction of the adjusting bar 161 (e.g. the Z-axis direction) corresponding to the longitudinal direction of the positioning portion 151. For example, the groove 1611 can be an open channel formed on the wall surface of the adjusting bar 161 facing the positioning portion 151 (e.g. parallel to the X-Z plane). Therefore, when the positioning portion 151 is positioned by the positioning means 111, e.g. inserted into the positioning hole, at least a portion of the positioning portion 151 is received in the groove 1611 to enhance the linkage of the adjusting bar 161 and the positioning portion 151, so as to reduce the possibility of the positioning portion 151 escaping from the adjusting bar 161, but not limited thereto. In another embodiment, the groove 1611 can be a hole extending downward from the top surface of the adjusting bar 161 (e.g. parallel to the X-Y plane), so the positioning portion 151 can be inserted into the adjusting bar 161. According to practical applications, the adjusting bar 161 may not have the groove 1611, and the positioning portion 151 is coupled to the adjusting bar 161 by abutting against the wall surface of the adjusting bar 161.

Figure 3A:
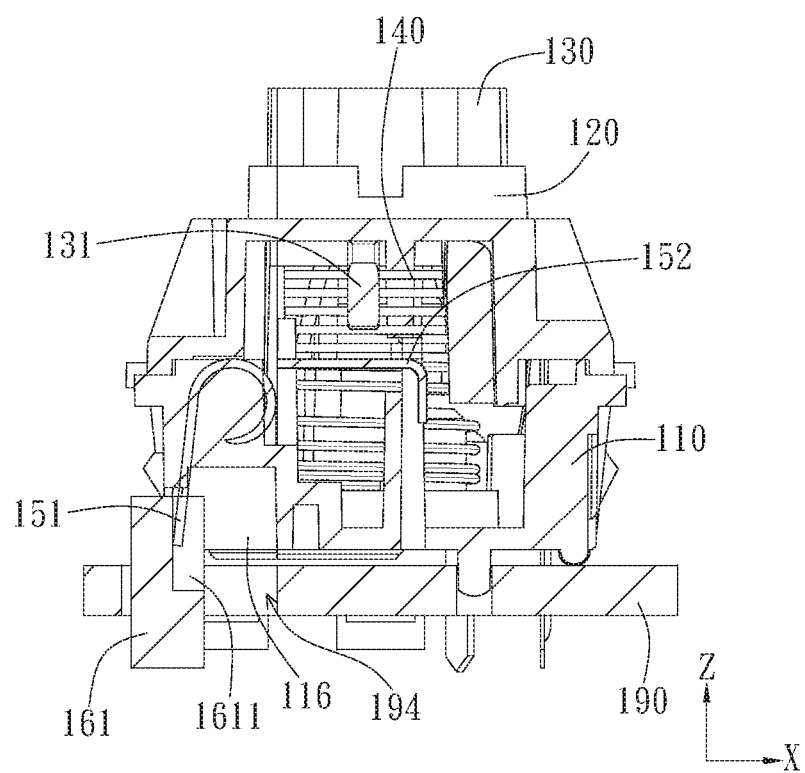
FIGS. 3A and 3B are cross-sectional views of the keyswitch structure of FIG. 1C along the cutting line AA with the adjusting unit at different positions.
Figure 3B:
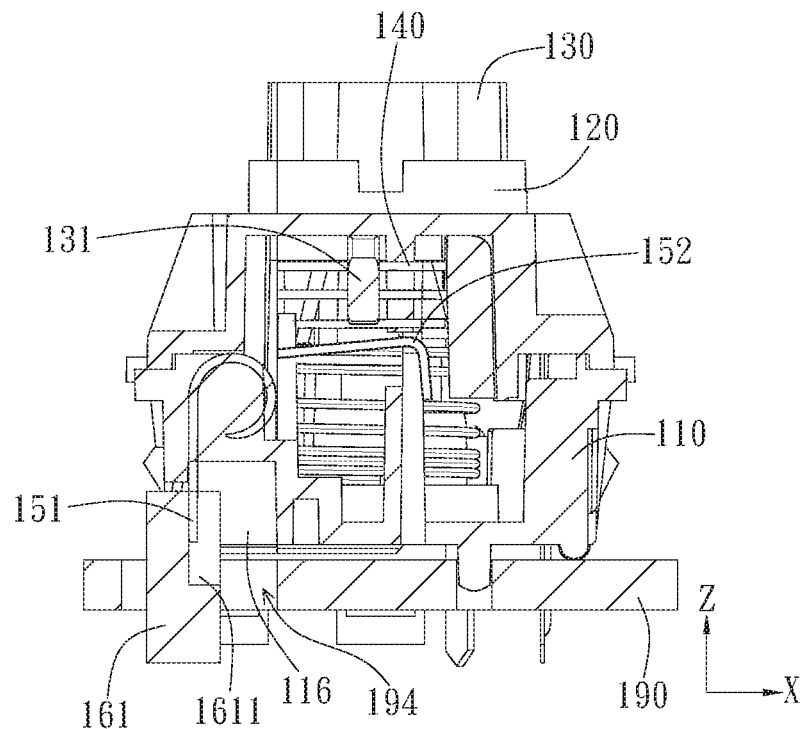

Referring to FIGS. 3A and 3B, the operation of the keyswitch structure 10 adjusting the tactile feedback by using the adjusting unit 160 is illustrated, wherein FIGS. 3A and 3B are cross-sectional views of FIG. 1C along the cutting line AA with the adjusting unit 160 at different positions. As shown in FIG. 3A, when the tactile feedback member 150 is disposed on the base 110, the spring portion 153 is located in the accommodation area 117, the positioning portion 151 is positioned by the positioning means 111, e.g. inserted into the positioning hole, and coupled to the adjusting bar 161, for example at least partially inserted into the groove 1611, and the extending arm 152 extends below the cam portion 131. In this embodiment, the adjusting unit 160 is preferably movable toward the extending direction of the extending arm 152 (e.g. the X-axis direction), so as to change the deformation of the tactile feedback member 150 and in turn to change the default stress of the tactile feedback member 150. As shown in FIG. 3B, when the adjusting unit 161 moves along the X-axis direction, the adjusting bar 161 drives the positioning portion 151 to shift relative to the positioning means 111 along the X-axis direction, so the positioning portion 151 and the extending arm 152 are changed in position relative to the spring portion 153, i.e. the deformation is changed. In other words, the default stress of the spring portion is changed, so that the action of the cam portion 131 and the tactile feedback member 150 is correspondingly changed to provide a different tactile feedback, such as different required pressing forces, dome-collapse-like tactile feedback, or linear feedback. In sum, when the adjusting unit 160 moves by different distances along the X-axis direction, the torsion spring can have different default stresses, or the position of the extending arm 152 relative to the moving path of the cam portion 131 is different, so as to provide different kinds of tactile feedback.

Figure 4A:
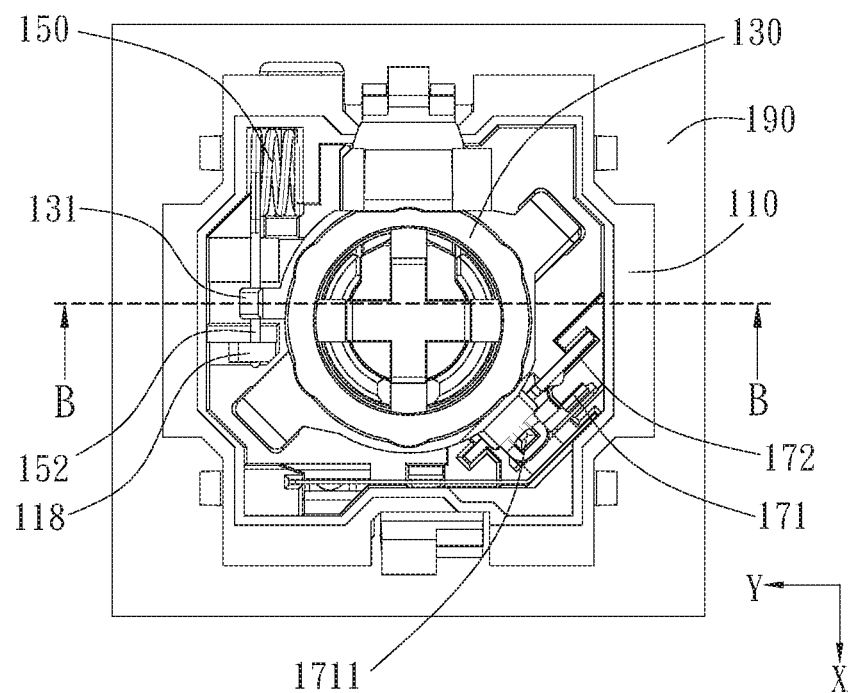
FIGS. 4A and 4B are a top view of the keyswitch structure of FIG. 1A at the first status and a cross-sectional view of the keyswitch structure along the cutting line BB, respectively.
Figure 4B:
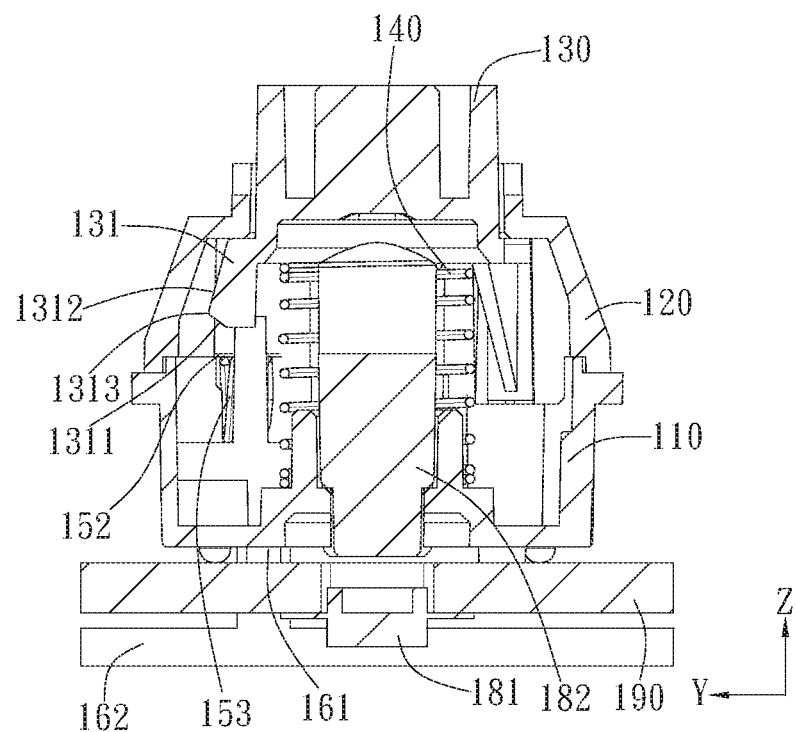

Hereinafter, the moving distance of the adjusting unit 160 along the X-axis direction and the corresponding tactile feedback provided by the keyswitch structure 10 will be described with reference to the drawings. FIGS. 4A and 4B are a top view of the keyswitch structure 10 of FIG. 1A at the first status and a cross-sectional view along the cutting line BB, respectively. As shown in FIGS. 4A and 4B, when the keyswitch structure 10 is at the first status, the adjusting unit 160 is coupled to the positioning portion 151 and is located at a first position in the X-axis direction. In this configuration, the tactile feedback member 150 has a first deformation, and the pressing force required for the cam portion 131 to pass the extending arm 152 is a first pressing force, i.e. the extending arm applies a first resistant force against the cam portion 131. For example, the first position can refer to a position of the adjusting unit 160 when the keyswitch structure 10 is at a default state, so the first pressing force can be the default pressing force. When the adjusting unit 160 is at the first position, the extending arm 152 preferably extends across the moving path of the cam portion 131 when moving downward, i.e. the moving path is parallel to the Z-axis direction, and the extending arm 152 is at a first position relative to the moving path. When the adjusting unit 160 is at the first position, and the first pressing force is exerted to enable the plunger 130 along with the cam portion 131 to move toward the base 110, the extending arm 152 firstly moves downward along the lower surface 1311 to the protrudent point 1313, and then passes the protrudent point 1313 to move upward and hit the base 110 or the cover 120 to generate a sound, such as a first sound. In other words, when the tactile feedback member 150 has the first deformation, and the pressing force exerted to the plunger 130 is large enough, e.g. not less than the first pressing force, to overcome the first resistant force that the extending arm 152 applies against the cam portion 131, the extending arm 152 firstly moves along the lower surface 1311 for a first distance to the protrudent point 1313, and then passes the protrudent point 1313 to move upward away from the bump. It is noted that when the extending arm 152 reaches the protrudent point 1313, the extending arm 152 has a first sound distance from an impact surface of the base 110 or the cover 120, and then the extending arm 152 hits the impact surface to generate the first sound. In this embodiment, the impact surface can be a wall surface of the cover 120 or the base 110 that corresponds to the extending arm 152, such as the impact surface 1181 of the impact wall 118 of the base 110.

Figure 5A:
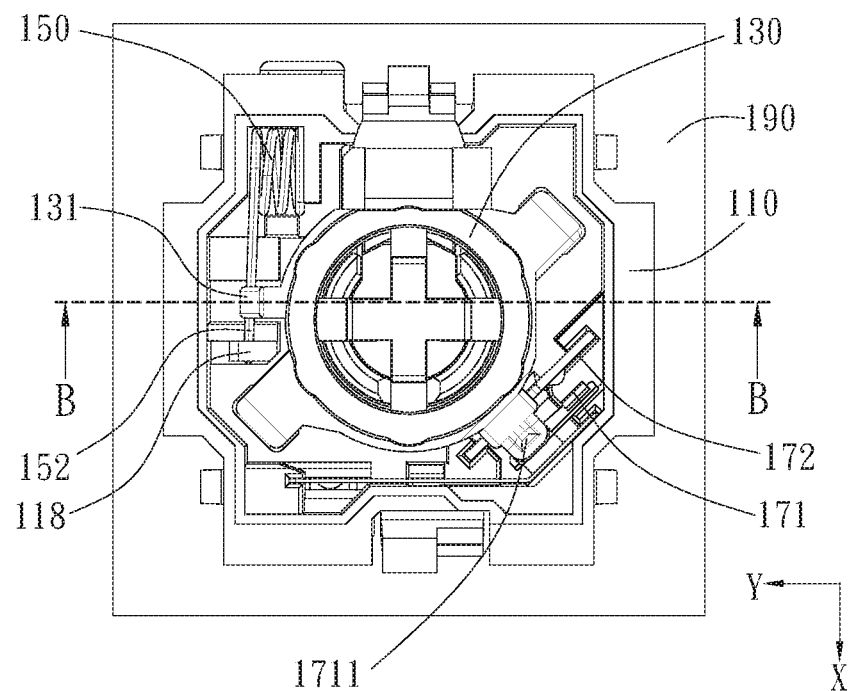
FIGS. 5A and 5B are a top view of the keyswitch structure of FIG. 1A at the second status and a cross-sectional view of the keyswitch structure along the cutting line BB, respectively.
Figure 5B:
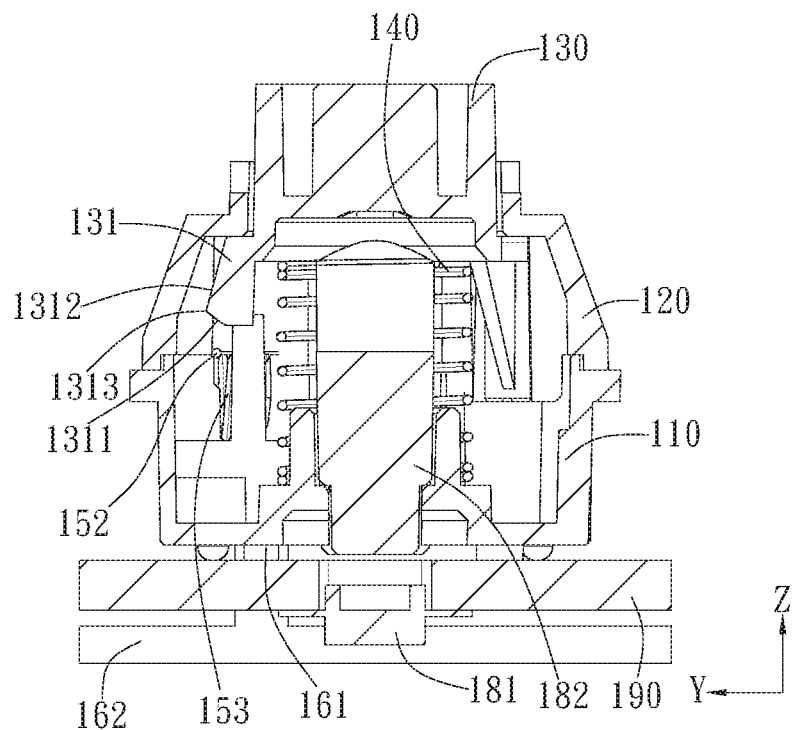

FIGS. 5A and 5B are a top view and a cross-sectional view of the keyswitch structure 10 of FIG. 1A at the second status, respectively. As shown in FIGS. 5A and 5B, when the keyswitch structure 10 is at the second status, the adjusting unit 160 is coupled to the positioning portion 151 and is located at a second position in the X-axis direction. In this configuration, the tactile feedback member 150 has a second deformation, and the pressing force required for the cam portion 131 to pass the extending arm 152 is a second pressing force, i.e. the extending arm 152 applies a second resistant force against the cam portion 131. For example, the second position of the adjusting unit 160 can be closer to the cam portion 131 than the first position. That is, the adjusting bar 161 moves toward the inner side of the base 110 and pushes the positioning portion 151 inwardly in the X-axis direction, so the stress of the tactile feedback member 150 is increased. When the adjusting unit 160 is at the second position, the extending arm 152 preferably extends across the moving path of the cam portion 131 when the cam portion 131 moves downward, and the extending arm 152 is at a second position relative to the moving path. Specifically, the second position of the extending arm 152 is closer to the outer side of the base 110 than the first position of the extending arm 152, i.e. closer to the protrudent point 1313 of the cam portion 131 in the Y-axis direction. When the adjusting unit 160 is at the second position, and the second pressing force is exerted to enable the plunger 130 along with the cam portion 131 to move toward the base 110, the extending arm 152 firstly moves downward along the lower surface 1311 to the protrudent point 1313, and then passes the protrudent point 1313 to move upward and hit the base 110 or the cover 120 to generate a sound, such as a second sound. In other words, when the tactile feedback member 150 has the second deformation, and the pressing force exerted to the plunger 130 is large enough, e.g. not less than the second pressing force, to overcome the second resistant force that the extending arm 152 applies against the cam portion 131, the extending arm 152 firstly moves along the lower surface 1311 for a second distance to the protrudent point 1313, and then passes the protrudent point 1313 to move upward away from the bump. In this embodiment, the second position of the extending arm 152 is closer to the protrudent point 1313 than the first position of the extending arm 152, and accordingly, the first distance is larger than the second distance. It is noted that when the extending arm 152 reaches the protrudent point 1313, the extending arm 152 has a second sound distance from the impact surface, and then the extending arm 152 hits the impact surface to generate the second sound.

Particularly, when the adjusting unit 160 is at the first position or the second position, the default stress of the tactile feedback member 150 is preferably within a range that the cam portion 131 is able to push the extending arm 152 downwardly. Therefore, when a sufficient pressing force, such as the first pressing force or the second pressing force, is exerted to the plunger 130, in response to the downward pushing force of the cam portion 131, the extending arm 152 firstly moves downward along the lower surface 1311 to the protrudent point 1313, and then passes the protrudent point 1313 to move upward because of the rebound force and hit the impact surface of the base 110 or the cover 120 (e.g. the impact surface 1181) to generate the sound. It is noted that the position of the extending arm 152 relative to the moving path when the adjusting unit 160 is at the second position is different from the position of the extending arm 152 relative to the moving path when the adjusting unit 160 is at the first position. That is, the first sound distance between the extending arm 152 and the impact surface 1181 when the adjusting unit 160 is at the first position is different from the second sound distance between the extending arm 152 and the impact surface 1181 when the adjusting unit 160 is at the second position. For example, when the adjusting unit 160 moves from the first position to the second position, the adjusting bar 161 pushes the positioning portion 151 of the tactile feedback member 150 to shift, so the deformation of the tactile feedback member 150 is changed from the first deformation to the second deformation, and the default stress of the tactile feedback member 150 is increased from the first stress to the second stress. As such, the downward moving distance of the extending arm 152 at the first position pushed by the cam portion 131 is larger than that of the extending arm 152 at the second position pushed by the cam portion 131. That is, the first sound distance is larger than the second sound distance, so the first sound is louder than the second sound. In sum, when the default stress caused by the deformation of the tactile feedback member 150 is larger, the displacement of the extending arm 152 relative to the impact surface 1811 is smaller, so the generated sound will be smaller.

Figure 6A:
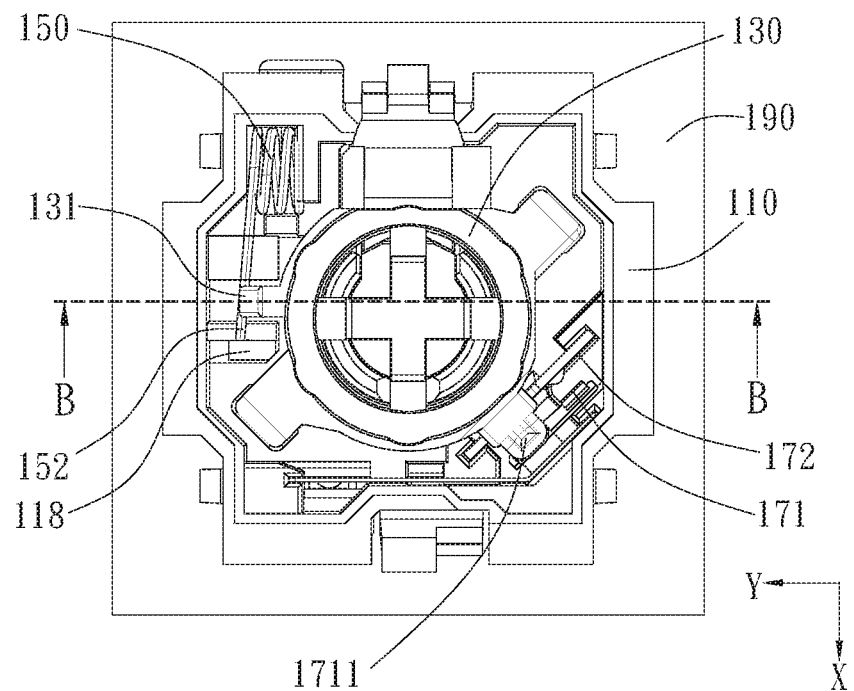
FIGS. 6A and 6B are a top view of the keyswitch structure of FIG. 1A at the third status and a cross-sectional view of the keyswitch structure along the cutting line BB, respectively.
Figure 6B:
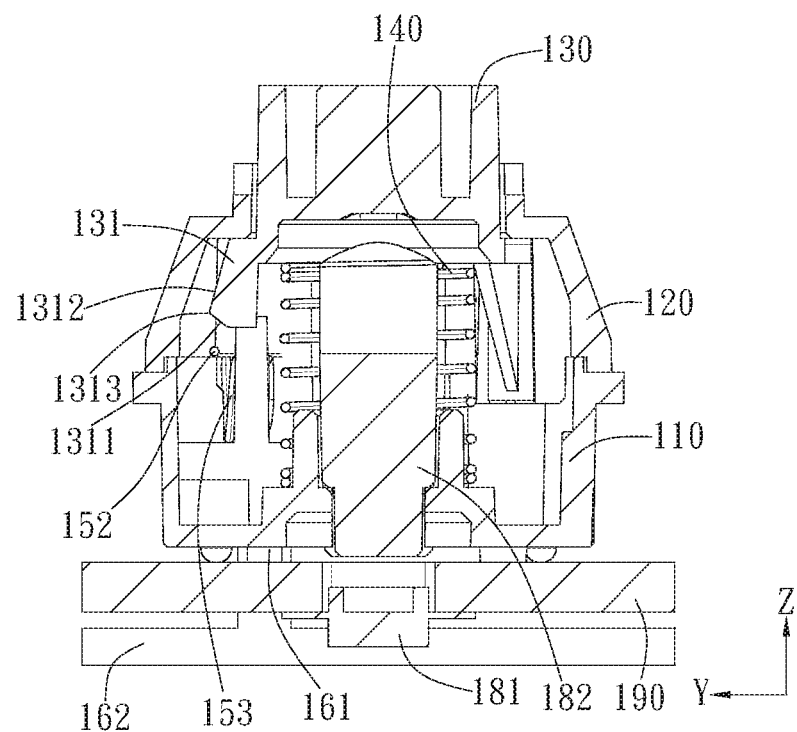

Moreover, when the distance of the adjusting unit 160 moving toward the inner side of the base 110 is larger, the relative displacement of the positioning portion 151 is larger, so the default stress of the torsion spring is larger. When the default stress of the torsion spring is increased to a certain degree, the plunger 130 does not push the extending arm 152 downwardly, but pushes the extending arm 152 laterally to provide a dome-collapse-like tactile feedback. FIGS. 6A and 6B are a top view of the keyswitch structure 10 of FIG. 1A at the third status and a cross-sectional view along the cutting line BB, respectively. As shown in FIGS. 6A and 6B, when the keyswitch structure 10 is at the third status, the adjusting unit 160 is coupled to the positioning portion 151 and is located at a third position in the X-axis direction. In this configuration, the tactile feedback member 150 has a third deformation, and the extending arm 152 is at a third position relative to the moving path of the cam portion 131. Specifically, the third position of the adjusting unit 160 can be closer to the inner side of the base 110 than the second position in the X-axis direction, so the third position of the extending arm 152 preferably substantially corresponds to the protrudent point 1313 of the cam portion 131. That is, the adjusting bar 161 moves farther toward the inner side of the base 110 and pushes the positioning portion 151 farther inwardly in the X-axis direction, so that the stress of the tactile feedback member 150 is further increased, and the cam portion 131 does not push the extending arm 152 downwardly. When the adjusting unit 160 is at the third position and the pressing force is exerted to the plunger 130 to enable the plunger 130 to move toward the base 110, the cam portion 131 pushes the extending arm 152 to move along the Y-axis direction away from the moving path to generate a dome-collapse-like tactile feedback. During the operation, since the cam portion 131 does not push the extending arm 152 downwardly, the extending arm 152 only moves laterally without bouncing upwardly to hit the impact surface 1181, and no impact sound is generated.

Figure 7A:
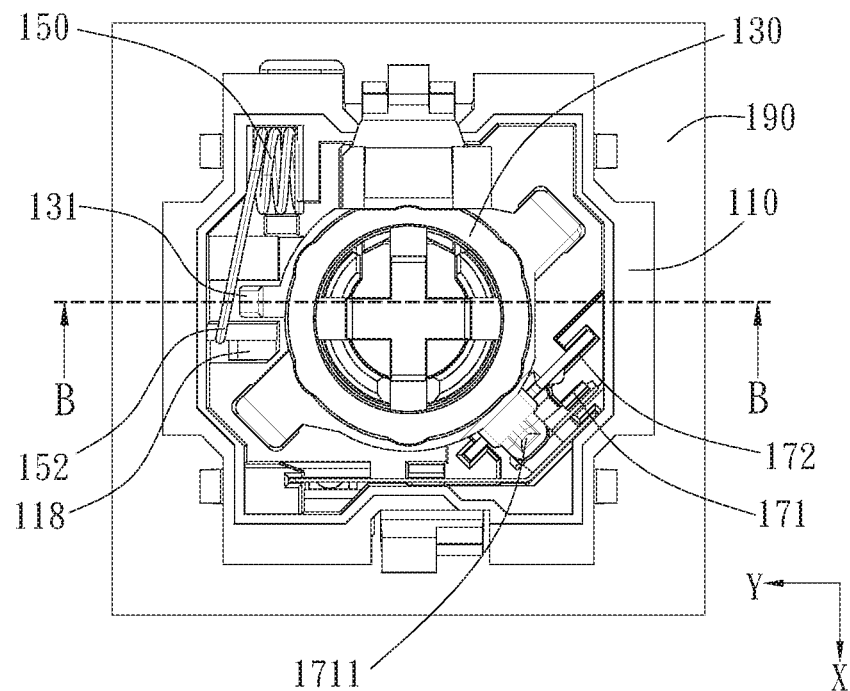
FIGS. 7A and 7B are a top view of the keyswitch structure of FIG. 1A at the fourth status and a cross-sectional view of the keyswitch structure along the cutting line BB, respectively.
Figure 7B:
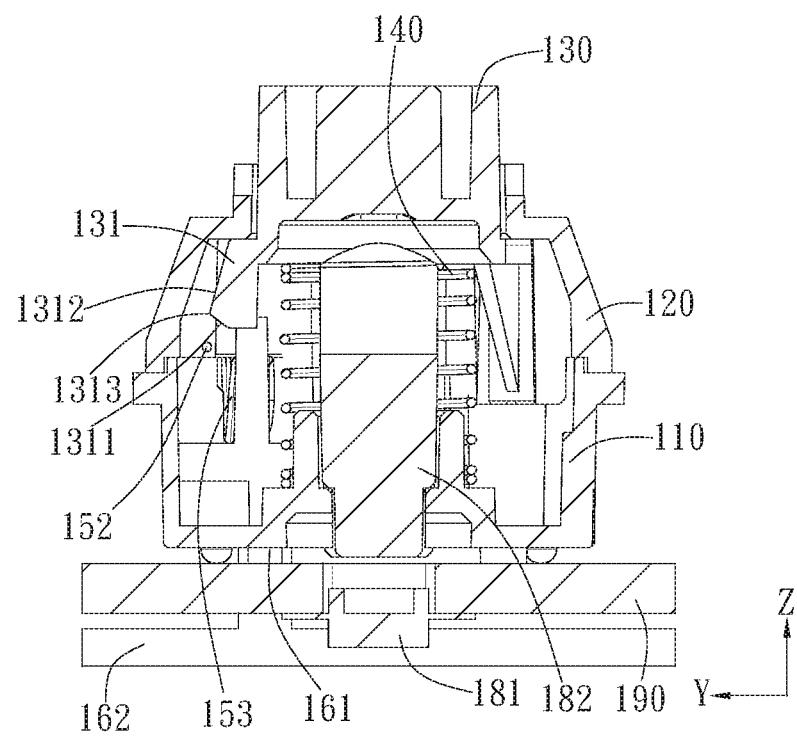

Moreover, when the distance of the adjusting unit 160 moving toward the inner side of the base 110 is large enough to deform the tactile feedback member 150 and shift the position of the extending arm 152 outside the moving path of the cam portion 131, the keyswitch structure 10 can provide a linear feedback. FIGS. 7A and 7B are a top view of the keyswitch structure 10 of FIG. 1A at the fourth status and a cross-sectional view along the cutting line BB, respectively. As shown in FIGS. 7A and 7B, when the keyswitch structure 10 is at the fourth status, the adjusting unit 160 is coupled to the positioning portion 151 and is located at a fourth position in the X-axis direction. In this configuration, the tactile feedback member 150 has a fourth deformation, and the extending arm 152 is located at a fourth position relative to the moving path of the cam portion 131. For example, the fourth position of the adjusting unit 160 can be closer to the inner side of the base 110 than the third position in the X-axis direction. That is, the adjusting bar 161 moves much farther toward the inner side of the base 110 and pushes the positioning portion 151 farther inwardly in the X-axis direction, so the stress of the tactile feedback member 150 is further increased, and the extending arm 152 displaces toward the Y-axis direction to be located outside the moving path of the cam portion 131. Specifically, when the adjusting unit 160 is at the fourth position, the extending arm 152 is located outside the moving path at the fourth position. When the plunger 130 moves toward the base 110, the cam portion 131 moves along the moving path without interfering with the extending arm 152, and a linear feedback is provided.

It is noted that the embodiments of FIGS. 4A to 7B are illustrated according to the positions of the adjusting unit 160 moving sequentially toward the inner side of the base 110 along the X-axis direction, but not limited thereto. In another embodiment, the adjusting unit 160 can move toward the outer side of the base 110 along the X-axis direction to different positions, and the positioning portion 151 can move toward the outer side of the base 110 with the adjusting unit 160 by the elastic restoring force and have deformation varying with the position of the adjusting unit 160 in the X-axis direction to provide a corresponding tactile feedback. Specifically, according to practical applications, the keyswitch structure 10 can selectively provide two or more kinds of tactile feedback by controlling the position of the adjusting unit 160 in the X-axis direction. That is, the adjusting unit 160 can move toward the inner side or the outer side of the base 110 in the X-axis direction to selectively control the adjusting unit 260 located at (1) a position that the deformation (or default stress) of the tactile feedback member 150 can allow the extending arm 152 to generate a displacement in the Z-axis direction and hit the impact surface 1181 to generate a sound when the plunger 130 moves downward, and the cam portion 131 pushes the extending arm 152 downwardly, such as the first position, the second position, or any suitable position before reaching the third position in the X-axis direction, so as to provide tactile feedbacks of different resistant forces with sounds of different volume, (2) a position that the deformation (or default stress) of the tactile feedback member 150 can allow the cam portion 131 to push the extending arm 152 laterally away from the moving path when the plunger 130 moves downward along with the cam portion 131, such as the third position in the X-axis direction, to provide the dome-collapse-like tactile feedback, or (3) a position that the deformation (or default stress) of the tactile feedback member 150 can allow the extending arm 152 to be outside the moving path, so that the cam portion 131 does not interfere with the extending arm 152 when the plunger 130 moves toward the base 110 along with the cam portion 131, such as the fourth direction in the X-axis direction, to provide a soundless linear feedback.

Figure 8A:
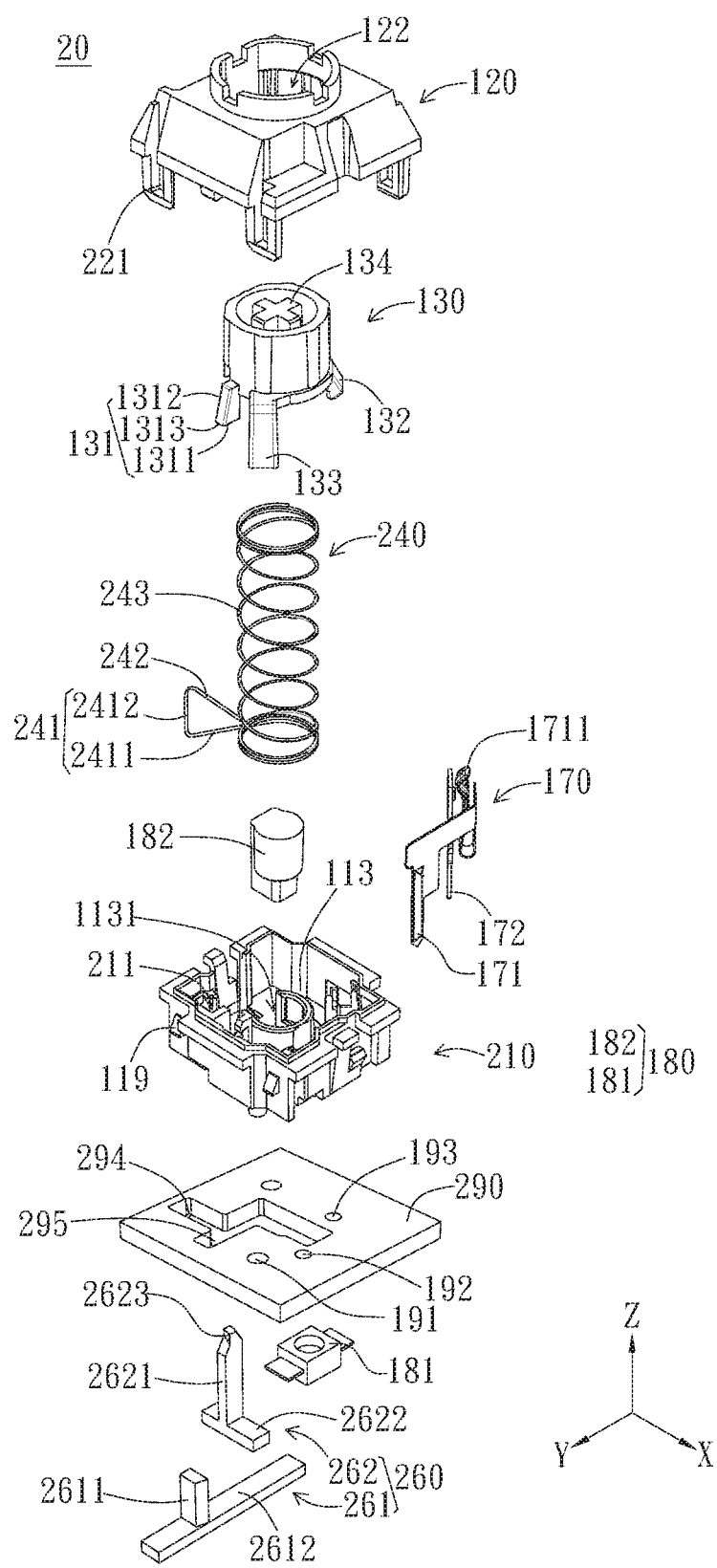
FIGS. 8A and 8B are exploded views of a second embodiment of the keyswitch structure of the invention from different viewing angles.
Figure 8B:
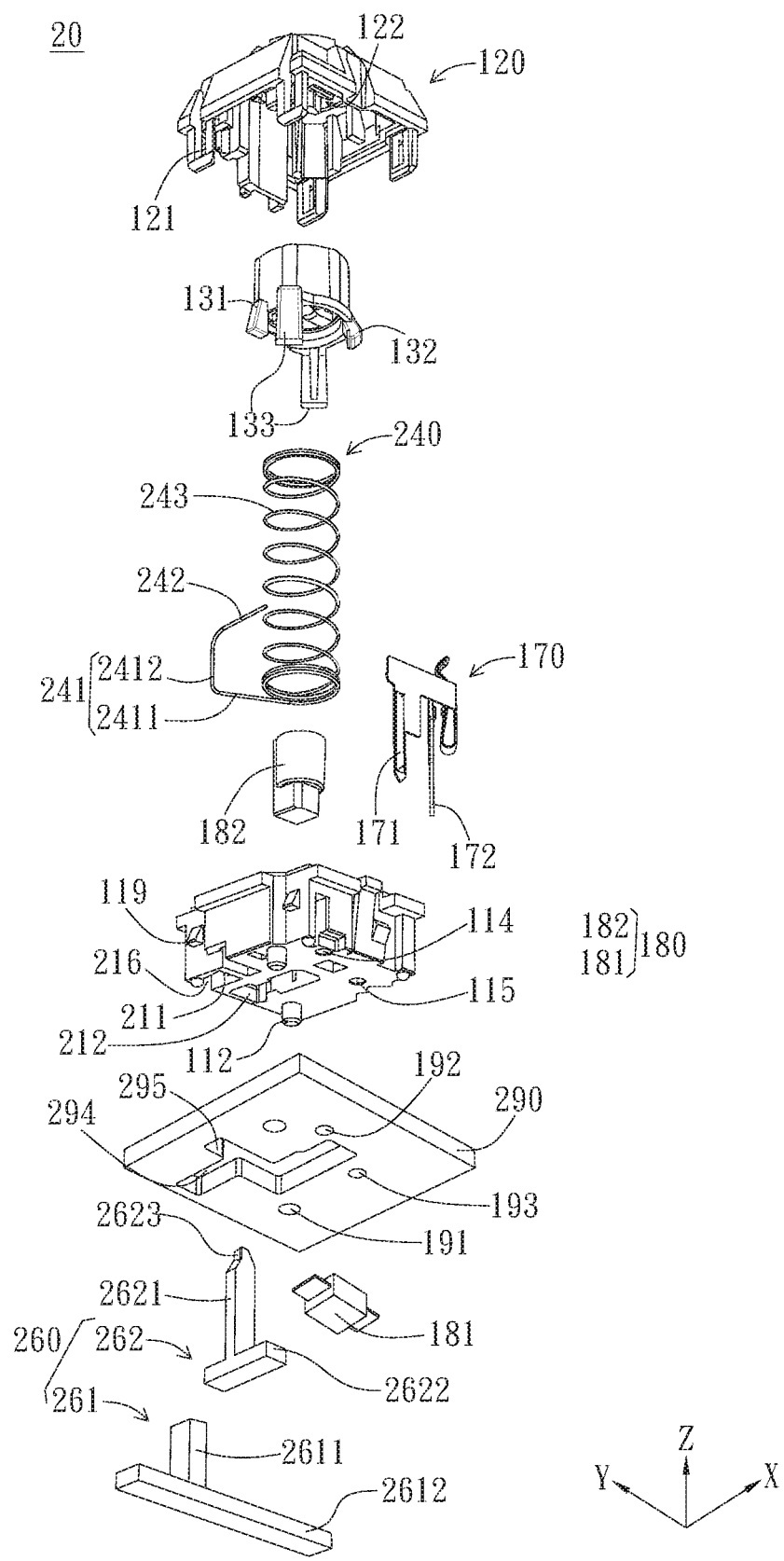
Figure 8C:
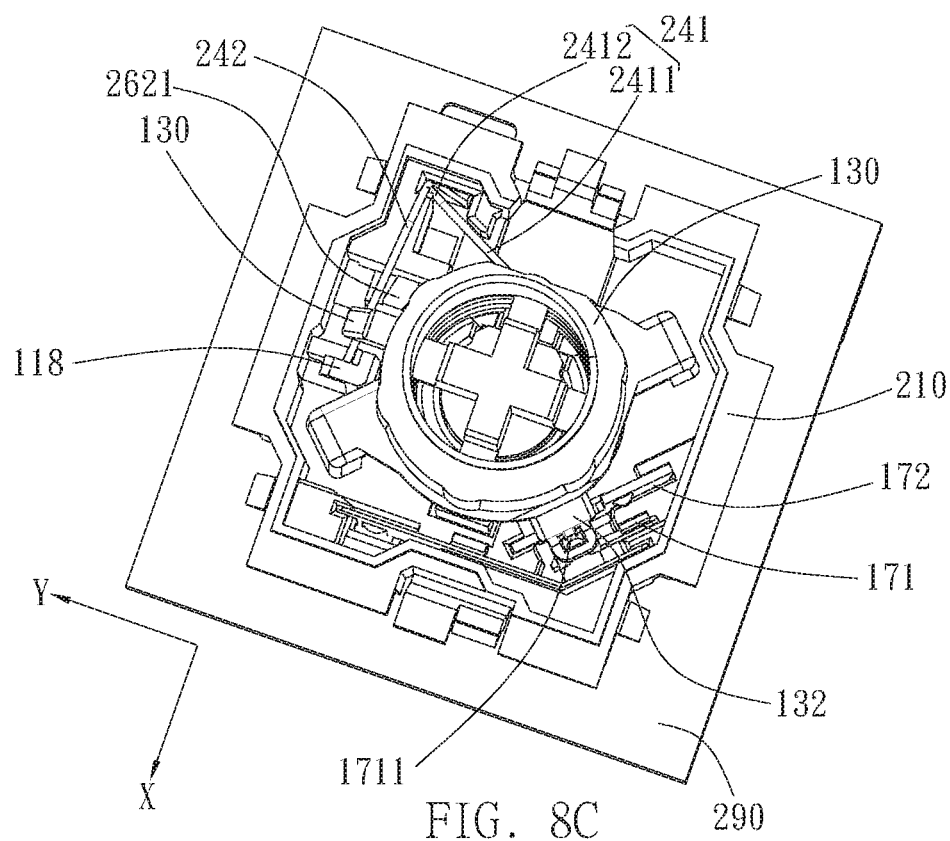
FIG. 8C is an assembly view of FIG. 8A without the cover.
Figure 9A:
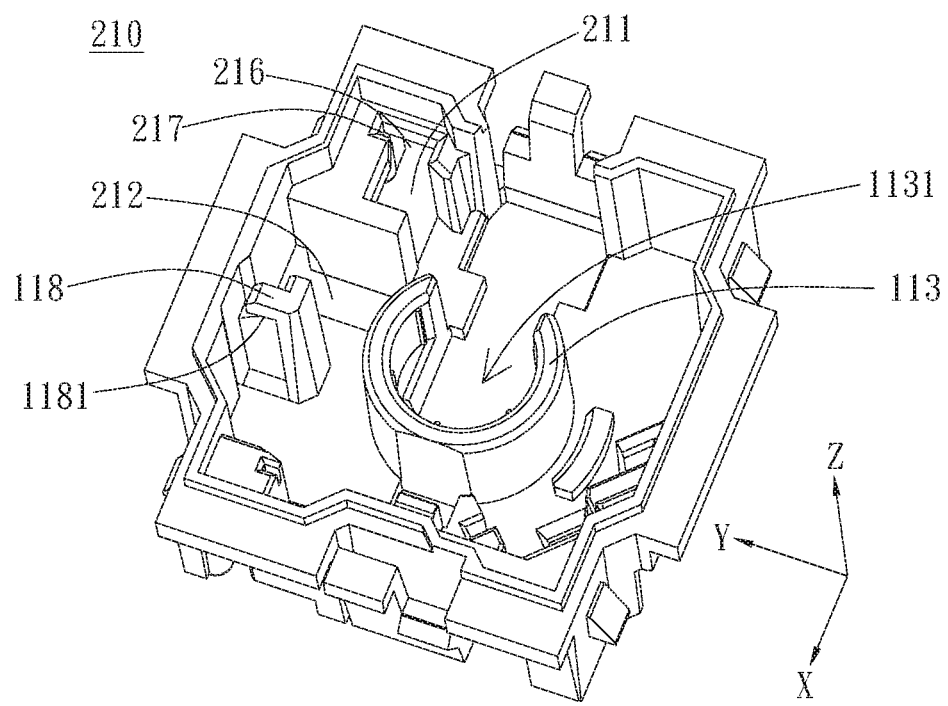
FIGS. 9A to 9C are schematic views of the base of the second embodiment of the invention from different viewing angles.
Figure 9B:
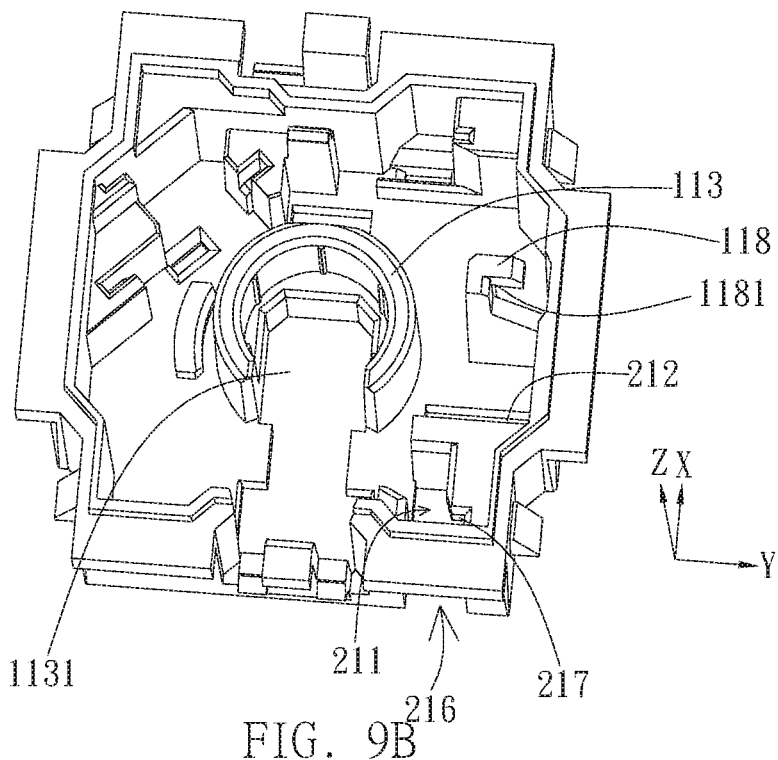
Figure 9C:
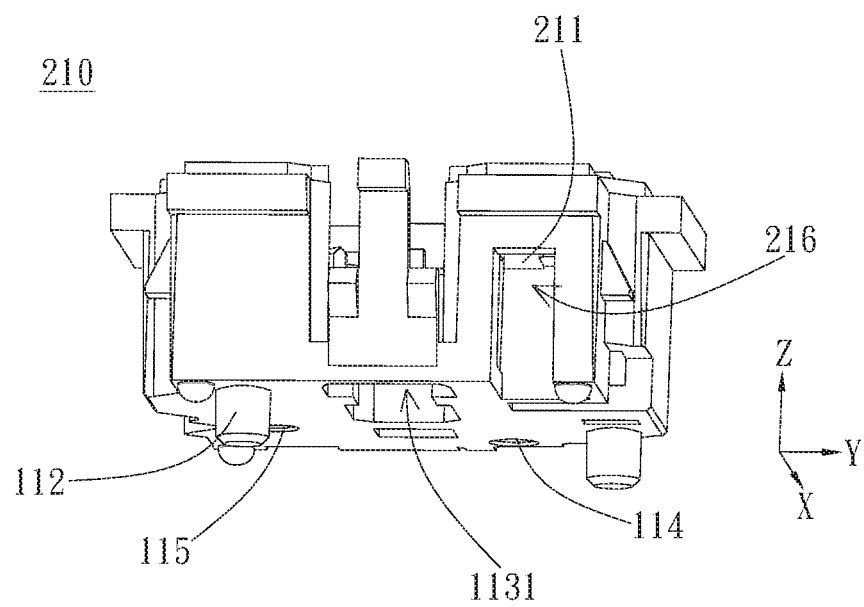

In the above embodiment, the restoring unit and the tactile feedback member are separate components, but not limited thereto. In another embodiment, the restoring unit and the tactile feedback member can be integrated into an integral single component. FIGS. 8A and 8B are exploded views of another embodiment of the keyswitch structure of the disclosure from different viewing angles, and FIG. 8C is an assembly view of FIG. 8A without the cover. As shown in FIGS. 8A to 8C, a keyswitch structure 20 includes a base 210, a cover 120, a plunger 130, a resilient member 240, and an adjusting unit 260. The keyswitch structure 20 may further include an electrode module 170, a light source unit 180, a circuit board (e.g. 290), a baseplate as appropriate. In this embodiment, the cover 120, the plunger 130, the electrode module 170, and the light source unit 180 are identical or similar in structure or connection to the embodiment of FIG. 1A. For example, the cover 120 has a slot portion 121 and an opening 122. The plunger 130 preferably has a cam portion 131, an actuating portion 132, a restricting portion 133, and a coupling portion 134. The electrode module 170 includes a first electrode piece 171 and a second electrode piece 172, and the first electrode piece 171 has a flexible portion 1711. The light source unit 180 includes a light source 181 and a light guide 182. It is noted that the structure and connection of the cover 120, the plunger 130, the electrode module 170, and the light source unit 180 can refer to the related descriptions of the embodiment of FIG. 1A, and will not be elaborated again. In this embodiment, the electrode module 170 can be replaced with other types of switch component, such as optical switch as described above. Moreover, similar to the embodiment of FIG. 1A, the base 210 can have a positioning post 112, a holding portion 113, an accommodating portion 1131, a first electrode hole 114, a second electrode hole 115, an impact portion 118, and a hook-like portion 119 to correspond to the cover 120, the electrode module 170, and the light source 180, and the structure and connection thereof can refer to related descriptions of the embodiment of FIG. 1A. Hereinafter, the differences of the base 210, the resilient member 240, the adjusting unit 260, and the circuit board 190 from the embodiment of FIG. 1A will be illustrated.

In this embodiment, the resilient member 240 includes a spring portion 243, a positioning portion 241, and an extending arm 242. The spring portion 243 is disposed between the base 210 and the plunger 130 to provide a restoring force to enable the plunger 130 to move along a direction away from the base 210. The positioning portion 241 is connected to the spring portion 243 and the extending arm 242. The positioning portion 241 is positioned by the positioning means 211, and the extending arm 242 extends corresponding to the cam portion 131. Moreover, the adjusting unit 260 is preferably disposed corresponding to the tactile feedback member constructed by the positioning portion 241 and the extending arm 242. The adjusting unit 260 includes an X-axis adjusting member 261 and a Y-axis adjusting member 262. The X-axis adjusting member 261 is disposed corresponding to the positioning portion 241, and the Y-axis adjusting member 262 is disposed corresponding to the extending arm 242.

Specifically, the spring portion 243 is similar to the restoring unit 140 of FIG. 1A and can have a spring configuration. The positioning portion 241 and the extending arm 242 are preferably formed by bending a rod body, which extends from one end of the spring portion 243, such as the lower end, so that the positioning portion 241 and the extending arm 242 can function as the tactile feedback member of the keyswitch structure 20. In this embodiment, the positioning portion 241 preferably includes a horizontal section 2411 and a vertical section 2412. The horizontal section 2411 is connected between the vertical section 2412 and the spring portion 243. The horizontal section 2411 preferably extends from the lower end of the spring portion 243 to the positioning means 211 of the base 211. The vertical portion 2412 is bent upward relative to the horizontal section 2411 substantially toward the Z-axis direction, and the extending arm 242 is bent toward the X-axis direction relative to the vertical portion 2412. In this embodiment, the angle between the extending arm 242 and the vertical section 2412 is preferably equal to or less than 120 degrees.

The base 210 has the positioning means 211, a channel potion 212, a receiving portion 216, and a limiting portion 217 corresponding to the resilient member 240 and the adjusting unit 260. In this embodiment, the positioning means 211 is a through hole on the bottom of the base 210, and the receiving portion 216 is preferably a notch, which is partially hollowed out from the sidewall adjacent to the positioning means 211 toward the bottom of the base 210. The receiving portion 216 communicates with the positioning means 211 and configured to allow the positioning portion 241 to shift relative to the positioning means 211 in response to the movement of the adjusting unit 260. The limiting portion 217 preferably corresponds to the upper section of the positioning portion 241, i.e. a portion of the vertical section 2412 that is close to the extending arm 242, and is configured to limit movement of the positioning portion 241. Specifically, when the spring portion 243 is sleeved on the holding portion 113, the horizontal section 2411 of the positioning portion 241 extends to the positioning means 211. A lower portion of the vertical section 2412 is exposed to the receiving portion 216 and corresponds to the X-axis adjusting member 261, and an upper portion of the vertical section 2412 is positioned by the limiting portion 217. The extending arm 242 extends along the X-axis direction below the cam portion 131 and above the channel portion 212. For example, the limiting portion 217 can be a groove formed on the wall of the base 210, or a wall surface against which the connection part of the vertical section 2412 and the extending arm 242 can abut. The channel portion 212 can be a through hole extending along the Y-axis direction. The channel portion 212 is configured to allow the Y-axis adjusting member 262 to move in the channel portion 212, so as to change the position of the extending arm 242 relative to the moving path of the cam portion 131.

In an embodiment, the X-axis adjusting member 261 includes an X-axis adjusting bar 2611 and an X-axis connection portion 2612. The X-axis connection portion 2612 is disposed under the circuit board 290, and the X-axis adjusting bar 2611 is connected to the X-axis connection portion 2612 and extends toward the cover 120, e.g. the Z-axis direction. For example, the circuit board 290 has an X-axis guiding slot 294 corresponding to the receiving portion 216. The X-axis adjusting bar 2611 is inserted from bottom of the circuit board 290 into the X-axis guiding slot 294 and extends into the receiving portion 216, so the X-axis adjusting bar 2611 can be coupled to the positioning portion 241, which protrudes out from the positioning means 211 to the receiving portion 216. For example, the X-axis adjusting bar 2611 is coupled to the lower portion of the vertical section 2412. When the X-axis adjusting unit 261 moves, the X-axis adjusting bar 2611 drives the positioning portion 241 to shift, so as to change the deformation of the positioning portion 241 and the extending arm 242 relative to the spring portion 243, and in turn to change the pressing force required for the cam portion 131 to move relative to the extending arm 242 when the plunger 130 moves toward the base 210. That is, the extending arm 242 applies different resistant force against the cam portion 131.

The Y-axis adjusting member 262 includes a Y-axis adjusting bar 2621 and a Y-axis connection portion 2622. The Y-axis connection portion 2622 is disposed under the circuit board 290, and the Y-axis adjusting bar 2621 is connected to the Y-axis connection portion 2622 and extends toward the cover 120, e.g. the Z-axis direction. For example, the circuit board 290 has a Y-axis guiding slot 295 corresponding to the channel portion 212. The Y-axis adjusting bar 2621 is inserted from bottom of the circuit board 290 into the Y-axis guiding slot 295 and extends into the channel portion 212, so the Y-axis adjusting bar 2621 protrudes from the channel portion 212 to couple with the extending arm 242. When the Y-axis adjusting unit 262 moves, the Y-axis adjusting bar 2621 drives the extending arm 242 to shift along the Y-axis direction, so as to change the position of the extending arm 242 relative to the moving path of the cam portion 131.

In this embodiment, the Y-axis adjusting bar 2621 preferably has a notch 2623. The notch 2623 is preferably recessed from the surface of the Y-axis adjusting bar 2621 that faces the extending arm 242, so as to correspond to the longitudinal direction of the extending arm 242. For example, the notch 2623 can be an L-shaped notch. That is, the Y-axis adjusting bar 2621 preferably has a step on the top surface, so the extending arm 242 can extend across the notch 2623 of the Y-axis adjusting bar 2621 to enhance the linkage of the Y-axis adjusting bar 2621 and the extending arm 242, but not limited thereto. In another embodiment, the Y-axis adjusting bar 2621 may not have the notch 2623, and the extending arm 242 is coupled to the Y-axis adjusting bar 2621 by abutting against the wall surface of the Y-axis adjusting bar 2621. In addition, in another embodiment, the X-axis adjusting bar 2611 may optionally have a design similar to the groove 1611 of the adjusting bar 161 of FIG. 1A, so as to accommodate the lower portion of the vertical section 2412 of the positioning portion 241.

Figure 10A:
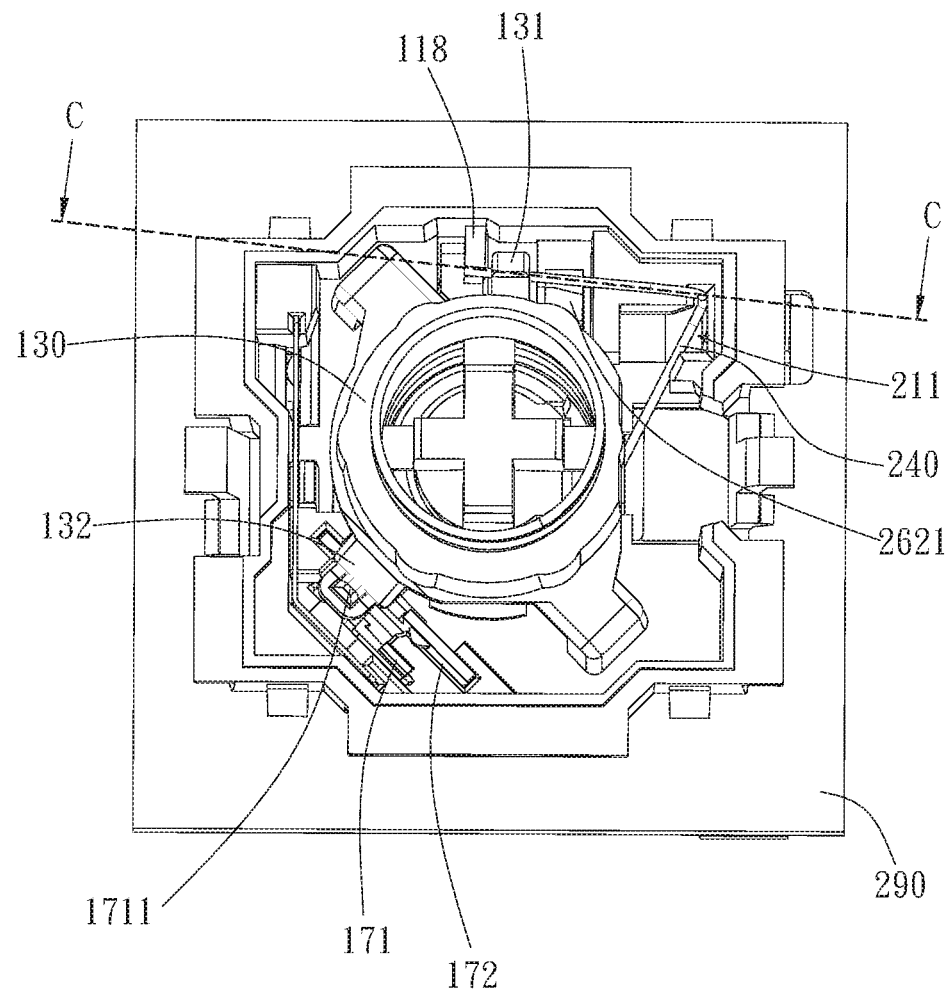
FIG. 10A is a schematic view of the keyswitch structure of FIG. 8A without the cover.
Figure 10B:
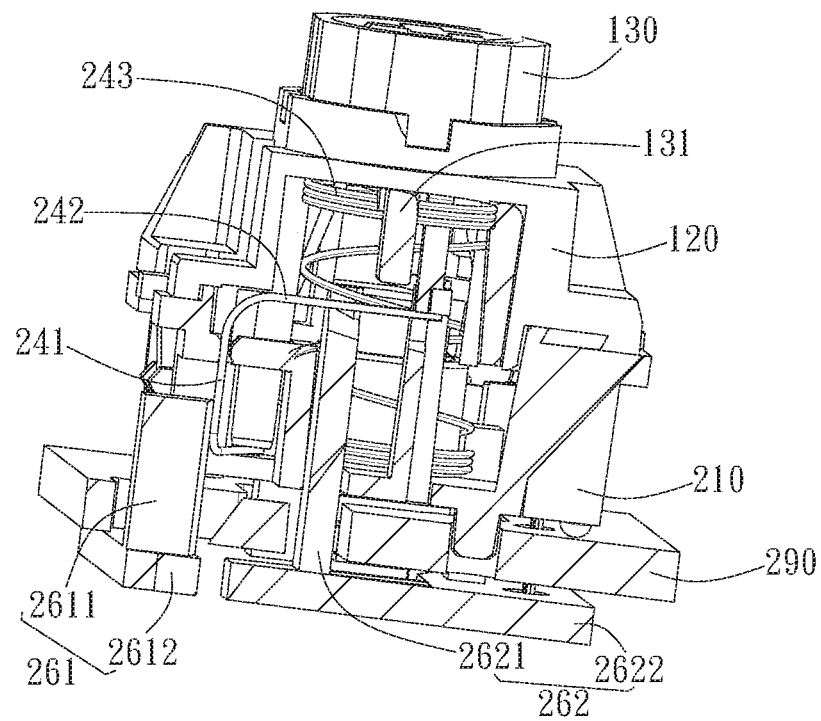
FIGS. 10B and 10C are cross-sectional views of the keyswitch structure of FIG. 10A along the cutting line CC with the X-axis adjusting member at different positions.
Figure 10C:
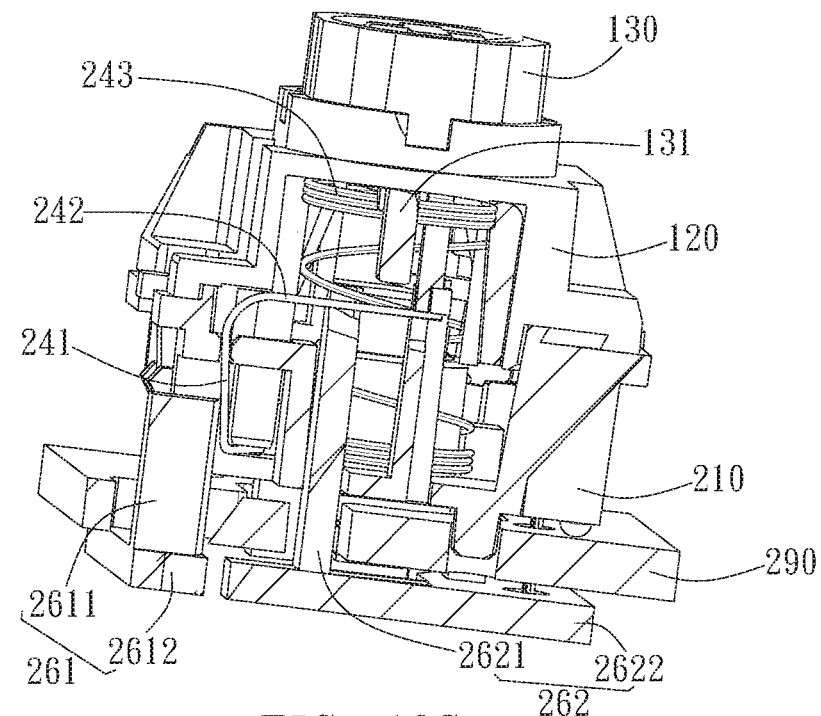

Referring to FIGS. 10A to 10C, the operation of the keyswitch structure 20 adjusting the tactile feedback by using the X-axis adjusting member 261 is illustrated, wherein FIG. 10A is a schematic view of the keyswitch structure of FIG. 8A without the cover, and FIGS. 10B and 10C are cross-sectional views of FIG. 10A along the cutting line CC with the X-axis adjusting member at different positions. As shown in FIG. 10B, when the X-axis adjusting member 261 is at the first position in the X-axis direction, the X-axis adjusting bar 2611 is coupled to the lower portion of the vertical section 2412 of the positioning portion 241, and the positioning portion 241 and the extending arm 242 has a first deformation relative to the spring portion 243. That is, a first stress exists between the positioning portion 241 and the extending arm 242, and the pressing force required for the cam portion 131 to pass the extending arm 242 when the plunger 130 is pressed and moves toward the base 210 is a first pressing force, i.e. the extending arm 242 applies a first resistant force against the cam portion 131. Specifically, when the X-axis adjusting member 261 is at the first position, the extending arm 242 preferably extends across the moving path of the cam portion 131 when moving downward, i.e. the moving path is parallel to the Z-axis direction. When the X-axis adjusting member 261 is at the first position and the first pressing force is exerted to enable the plunger 130 along with the cam portion 131 to move toward the base 210, the extending arm 242 firstly moves downward along the lower surface 1311 to the protrudent point 1313, and then passes the protrudent point 1313 to move upward and hit the base 210 or the cover 120 to generate a sound, such as a first sound. In other words, when the positioning portion 241 and the extending arm 242 have the first deformation (i.e. the tactile feedback member has a first X-axis deformation), and the pressing force exerted to the plunger 130 is large enough, e.g. not less than the first pressing force, to overcome the first resistant force that the extending arm 152 applies against the cam portion 131, the extending arm 242 firstly moves along the lower surface 1311 for a first distance to the protrudent point 1313, and then passes the protrudent point 1313 to move upward away from the bump. It is noted that when the extending arm 242 reaches the protrudent point 1313, the extending arm 242 has a first sound distance from an impact surface of the base 210 or the cover 120, and then the extending arm 242 hits the impact surface to generate the first sound. In this embodiment, the impact surface can be a wall surface of the cover 120 or the base 210 that corresponds to the extending arm 242, such as the impact surface 1181 of the impact wall 118 of the base 210.

As shown in FIG. 10C, when the X-axis adjusting member 261 moves in the X-axis direction, for example, toward the inner side of the base 210 approaching the cam portion 131, the X-axis adjusting bar 2611 pushes the lower end of the positioning portion 241 to shift relative to the positioning means 211 along the X-axis direction, so that the positions of the positioning portion 241 and the extending arm 242 relative to the spring portion 243 are changed, i.e. a different deformation is generated, and the stress is changed. Specifically, when the X-axis adjusting member 261 is at the second position, the X-axis adjusting bar 2611 is coupled to the lower end of the vertical section 2412 of the positioning portion 241, and the positioning portion 241 and the extending arm 242 have a second deformation relative to the spring portion 243. That is, a second stress exists between the positioning portion 241 and the extending arm 242, and the pressing force required for the cam portion 131 to pass the extending arm 242 when the plunger 130 is pressed and moves toward the base 210 is a second pressing force, i.e. the extending arm 242 applies a second resistant force against the cam portion 131. Specifically, when the X-axis adjusting member 261 is at the second position in the X-axis direction, the extending arm 242 preferably extends across the moving path of the cam portion 131 when moving downward, i.e. the moving path is parallel to the Z-axis direction. When the X-axis adjusting member 261 is at the second position and the second pressing force is exerted to enable the plunger 130 along with the cam portion 131 to move toward the base 210, the extending arm 242 firstly moves downward along the lower surface 1311 to the protrudent point 1313, and then passes the protrudent point 1313 to move upward and hit the base 210 or the cover 120 to generate a sound, such as a second sound. In other words, when the positioning portion 241 and the extending arm 242 have the second deformation (i.e. the tactile feedback member has a second X-axis deformation), and the pressing force exerted to the plunger 130 is large enough, e.g. not less than the second pressing force, to overcome the second resistant force that the extending arm 242 applies against the cam portion 131, the extending arm 242 firstly moves along the lower surface 1311 for a second distance to the protrudent point 1313, and then passes the protrudent point 1313 to move upward away from the bump. In this embodiment, the second position of the extending arm 242 is closer to the protrudent point 1313 than the first position, and the first distance is accordingly larger than the second distance. It is noted that when the extending arm 242 reaches the protrudent point 1313, the extending arm 242 has a second sound distance from the impact surface (e.g. 1181) of the base 210 or the cover 120, and then the extending arm 242 hits the impact surface to generate the second sound.

In this embodiment, when the X-axis adjusting member 261 moves in the X-axis direction from the first position to the second position, the positioning portion 241 is shifted by the pushing force of the X-axis adjusting bar 2611, so the first deformation is changed to the second deformation, and the first stress is changed to the second stress. As such, the downward moving distance of the extending arm 242 at the first position pushed by the cam portion 131 is larger than that of the extending arm 242 at the second position pushed by the cam portion 131. That is, the first sound distance is larger than the second sound distance, so the first sound is louder than the second sound. In sum, when the default stress caused by the deformation of the positioning portion 241 and the extending arm 242 is larger, the displacement of the extending arm 242 relative to the impact surface 1811 is smaller, so the generated sound will be smaller.

Figure 11A:
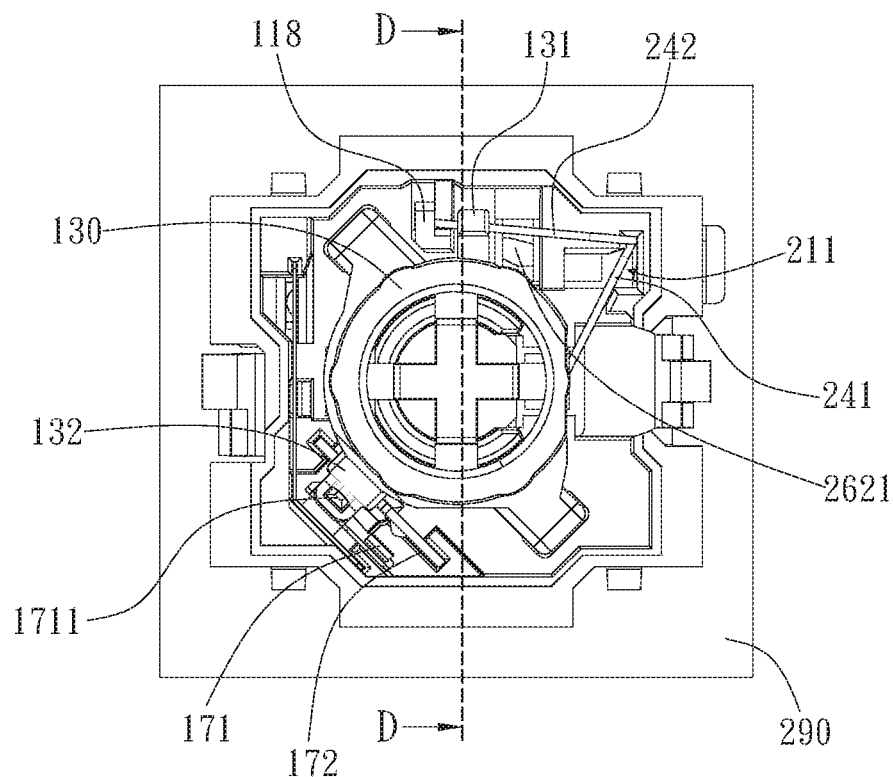
FIGS. 11A and 11B are a top view of the keyswitch structure of FIG. 8A with the Y-axis adjusting member at the first position and a cross-sectional view of the keyswitch structure along the cutting line DD, respectively.
Figure 11B:
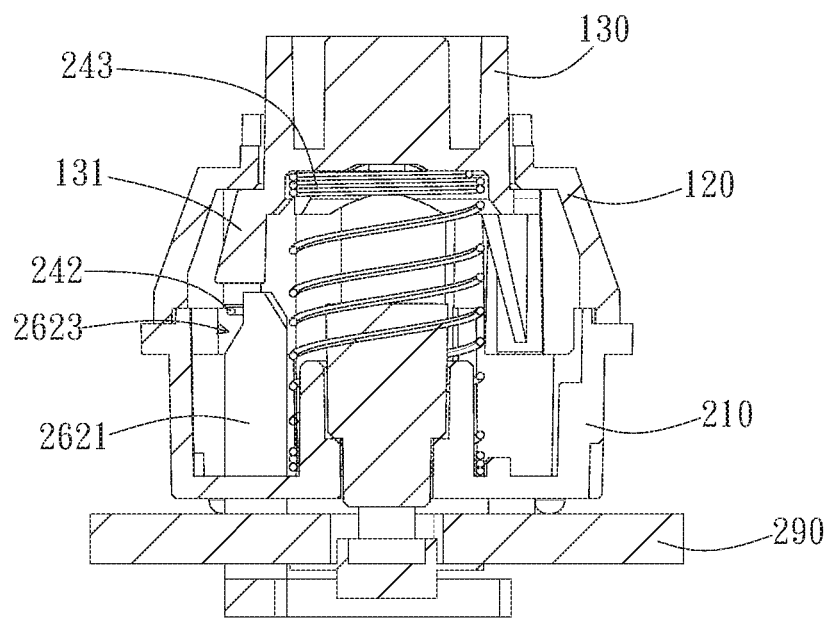

Referring to the drawings, the operation of the keyswitch structure 20 adjusting the tactile feedback by using the Y-axis adjusting member 262 will be illustrated, wherein FIGS. 11A and 11B are a top view of the keyswitch structure 20 of FIG. 8A with the Y-axis adjusting member 262 at the first position and a cross-sectional view along the cutting line DD, respectively. As shown in FIGS. 11A and 11B, when the Y-axis adjusting member 262 is at a first position in the Y-axis direction, the positioning portion 241 and the extending arm 242 have a first deformation relative to the spring portion 243, and the extending arm 242 is located at a first position relative to the cam portion 131 in the Y-axis direction. For example, when the Y-axis adjusting member 262 is at the first position in the Y-axis direction, the extending arm 242 preferably extends across the moving path of the cam portion 131 when moving downward, i.e. the moving path parallel to the Z-axis direction), and the pressing force required for the cam portion 131 to pass the extending arm 242 when the plunger 130 is pressed and moves toward the base 210 is a first pressing force, i.e. the extending arm 242 applies a first resistant force against the cam portion 131. When the Y-axis adjusting member 262 is at the first position and the first pressing force is exerted to enable the plunger 130 along with the cam portion 131 to move toward the base 210, the extending arm 242 firstly moves downward along the lower surface 1311 to the protrudent point 1313, and then passes the protrudent point 1313 to move upward and hit the base 210 or the cover 120 to generate a sound, such as a first sound. In other words, when the positioning portion 241 and the extending arm 242 have the first deformation (i.e. the tactile feedback member has a first Y-axis deformation), and the pressing force exerted to the plunger 130 is large enough, e.g. not less than the first pressing force, to overcome the first resistant force that the extending arm 152 applies against the cam portion 131, the extending arm 242 firstly moves along the lower surface 1311 for a first distance to the protrudent point 1313, and then passes the protrudent point 1313 to move upward away from the bump. It is noted that when the extending arm 242 reaches the protrudent point 1313, the extending arm 242 has a first sound distance from an impact surface of the base 210 or the cover 120, and then the extending arm 242 hits the impact surface to generate the first sound.

Figure 12A:
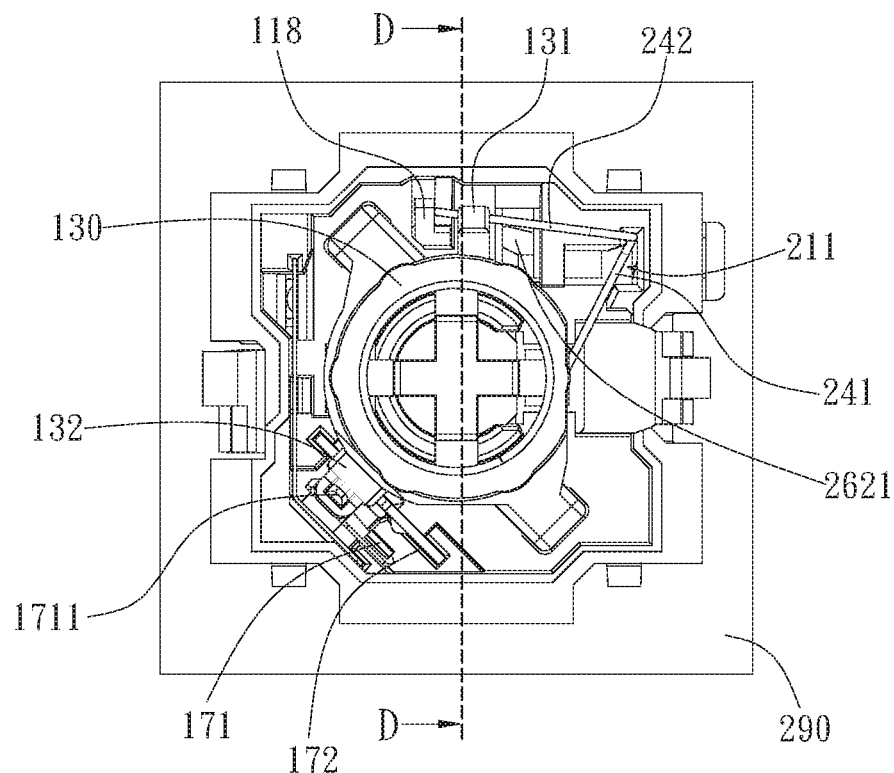
FIGS. 12A and 12B are a top view of the keyswitch structure of FIG. 8A with the Y-axis adjusting member at the second position and a cross-sectional view of the keyswitch structure along the cutting line DD, respectively.
Figure 12B:
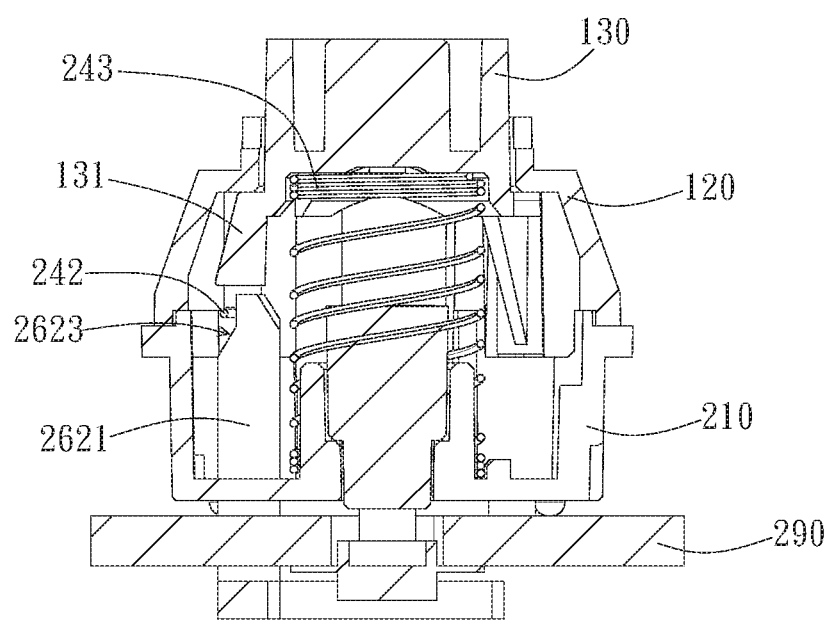

FIGS. 12A and 12B are a top view of the keyswitch structure 20 of FIG. 8A with the Y-axis adjusting member 262 at the second position and a cross-sectional view along the cutting line DD, respectively. As shown in FIGS. 12A and 12B, when the Y-axis adjusting member 262 is at the second position, the positioning portion 241 and the extending arm 242 have a second deformation relative to the spring portion 243, and the extending arm 242 is located at a second position relative to the moving path of the cam portion 131 in the Y-axis direction. For example, when the Y-axis adjusting member 262 is at the second position in the Y-axis direction, the extending arm 242 preferably extends across the moving path of the cam portion 131 when moving downward, i.e. the moving path is parallel to the Z-axis direction, and the pressing force required for the cam portion 131 to pass the extending arm 242 when the plunger 130 is pressed and moves toward the base 210 is a second pressing force, i.e. the extending arm 152 applies a second resistant force against the cam portion 131. In this embodiment, when the Y-axis adjusting member 262 is located at the second position in the Y-axis direction, the second position of the Y-axis adjusting member 262 in the Y-axis direction can be closer to the outer side of the base 210 than the first position, for example closer to the protrudent point 1313 of the cam portion 131. In other words, the Y-axis adjusting bar 2621 pushes the extending arm 242 outwardly in the Y-axis direction toward the outer side of the base 210, so the stress between the extending arm 242 and the positioning portion 241 is increased. When the Y-axis adjusting member 262 is at the second position and the second pressing force is exerted to enable the plunger 130 along with the cam portion 131 to move toward the base 210, the extending arm 242 firstly moves downward along the lower surface 1311 to the protrudent point 1313, and then passes the protrudent point 1313 to move upward and hit the base 210 or the cover 120 to generate a sound, such as a second sound. In other words, when the positioning portion 241 and the extending arm 242 have the second deformation (i.e. the tactile feedback member has a second X-axis deformation), and the pressing force exerted to the plunger 130 is large enough, e.g. not less than the second pressing force, to overcome the second resistant force that the extending arm 152 applies against the cam portion 131, the extending arm 242 firstly moves along the lower surface 1311 for a second distance to the protrudent point 1313, and then passes the protrudent point 1313 to move upward away from the bump. In this embodiment, the second position of the extending arm 242 is closer to the protrudent point 1313 than the first position, and the first distance is accordingly larger than the second distance. It is noted that when the extending arm 242 reaches the protrudent point 1313, the extending arm 242 has a second sound distance from the impact surface (e.g. 1181) of the base 210 or the cover 120, and then the extending arm 242 hits the impact surface to generate the second sound.

Particularly, when the Y-axis adjusting member 262 is located at the first position or the second direction in the Y-axis direction, the stress caused by the deformation of the positioning portion 241 and the extending arm 242 is within in a range that the cam portion 131 can push the extending arm 242 downwardly. Therefore, when a sufficient pressing force, such as the first pressing force or the second pressing force, is exerted to the plunger 130, in response to the downward pushing force of the cam portion 131, the extending arm 242 firstly moves downward along the lower surface 1311 to the protrudent point 1313, and then passes the protrudent point 1313 to move upward because of the rebound force and hit the impact surface of the base 210 or the cover 120 (e.g. the impact surface 1181) to generate the sound. It is noted that when the Y-axis adjusting member 262 moves from the first position to the second position in the Y-axis direction, the Y-axis adjusting bar 2611 pushes the extending arm 242 to shift, and the position of the extending arm 242 relative to the moving path of the cam portion 131 is changed, so the first deformation is changed to the second deformation, and the first stress is increased to the second stress. As such, the downward moving distance of the extending arm 242 at the first position pushed by the cam portion 131 is larger than that of the extending arm 242 at the second position pushed by the cam portion 131. That is, the first sound distance is larger than the second sound distance, so the first sound is louder than the second sound. In sum, when the stress caused by the deformation of the positioning portion 241 and the extending arm 242 is larger, the displacement of the extending arm 242 relative to the impact surface 1811 is smaller, so the generated sound will be smaller.

Figure 13A:
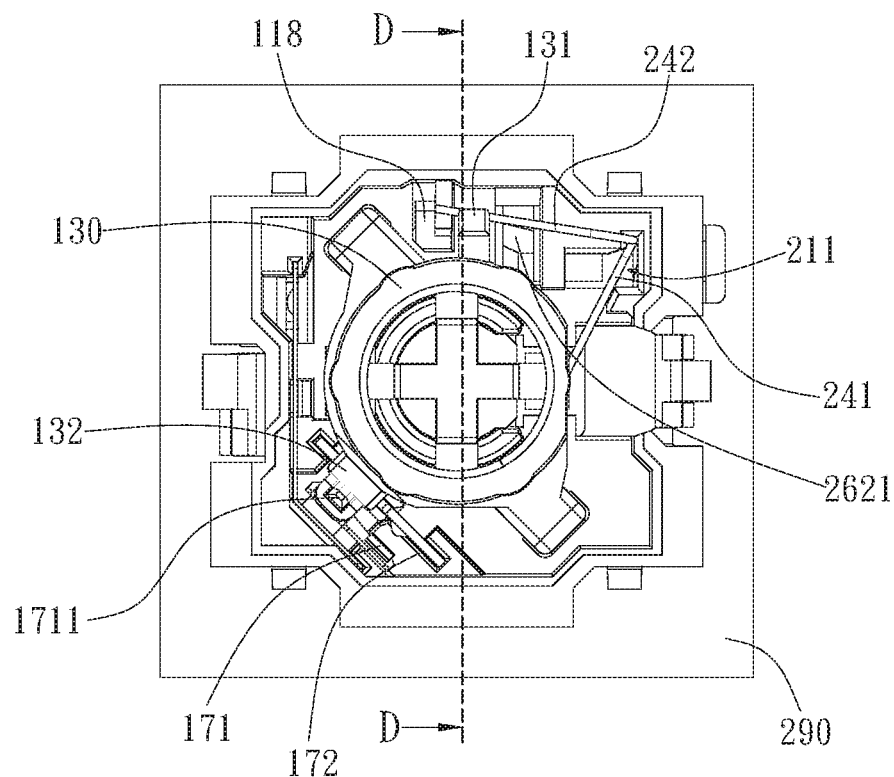
FIGS. 13A and 13B are a top view of the keyswitch structure of FIG. 8A with the Y-axis adjusting member at the third position and a cross-sectional view of the keyswitch structure along the cutting line DD, respectively.
Figure 13B:
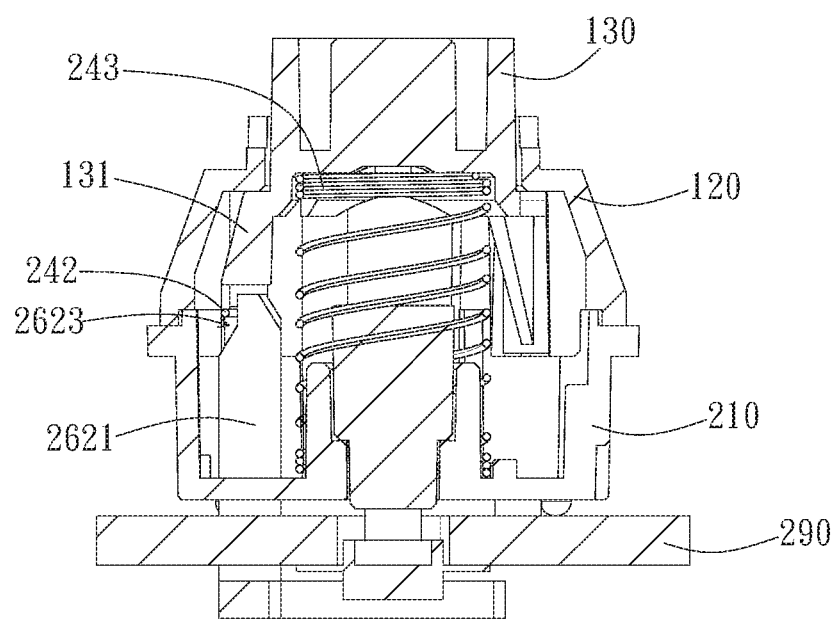

Moreover, when the distance of the Y-axis adjusting member 262 moving toward the outer side of the base 210 is larger, the displacement of the extending arm 242 relative to the moving path of the cam portion 131 is larger. For example, when the extending arm 242 is located at a position relative to the moving path substantially corresponding to the protrudent point 1313 of the cam portion 131, the plunger 130 cannot push the extending arm 242 downwardly, but push the extending arm 242 laterally to provide a dome-collapse-like tactile feedback. FIGS. 13A and 13B are a top view of the keyswitch structure 20 of FIG. 8A with the Y-axis adjusting member 262 at the third position and a cross-sectional view along the cutting line DD, respectively. As shown in FIGS. 13A and 13B, when the Y-axis adjusting member 262 is at the third position in the Y-axis direction, the positioning portion 241 and the extending arm 242 have a third deformation (i.e. the tactile feedback member has a third Y-axis deformation), so the extending arm 242 is at a third position relative to the moving path of the cam portion 131 in the Y-axis direction. Specifically, the third position of the Y-axis adjusting member 262 can be closer to the outer side of the base 210 than the second position, for example, substantially corresponding to the protrudent point 1313 of the cam portion 131. That is, the Y-axis adjusting bar 2611 moves farther toward the outer side of the base 210 and pushes the extending arm 242 farther outwardly, so the stress of the positioning portion 241 and the extending arm 242 is further increased, and the third position of the extending arm 242 preferably substantially corresponds to the protrudent point 1313 of the cam portion 131. When the Y-axis adjusting member 262 is at the third position and the pressing force is exerted to the plunger 130 to enable the plunger 130 to move toward the base 210, the cam portion 131 pushes the extending arm 242 to move along the Y-axis direction away from the moving path outwardly to generate a dome-collapse-like tactile feedback. During the operation, since the cam portion 131 does not push the extending arm 242 downwardly, the extending arm 242 only moves laterally without bouncing upwardly to hit the impact surface 1181, and no impact sound is generated.

Figure 14A:
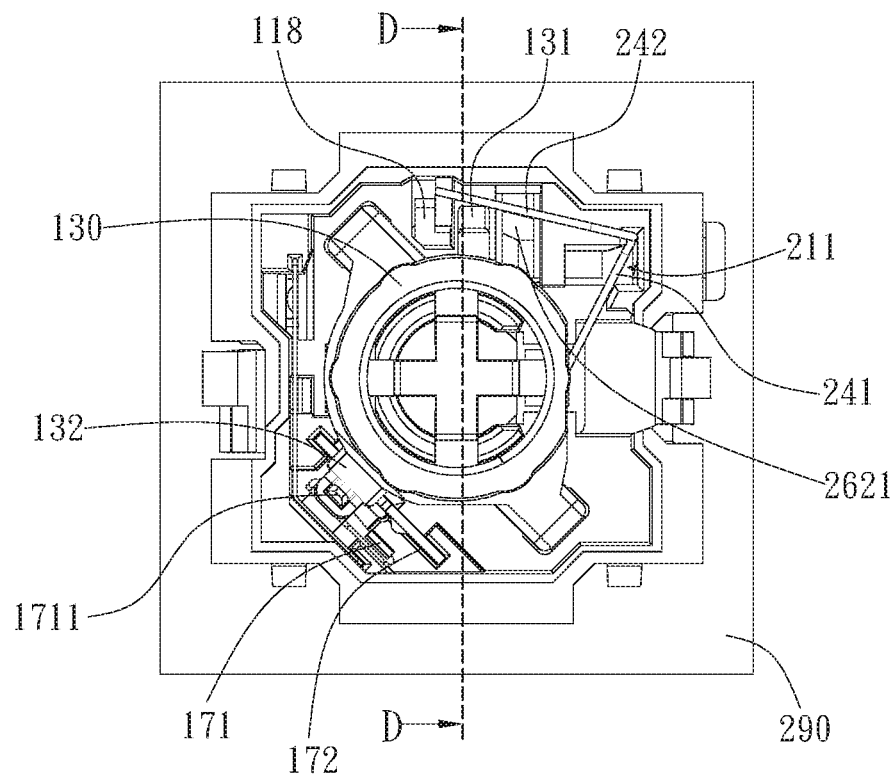
FIGS. 14A and 14B are a top view of the keyswitch structure of FIG. 8A with the Y-axis adjusting member at the fourth position and a cross-sectional view of the keyswitch structure along the cutting line DD, respectively.
Figure 14B:
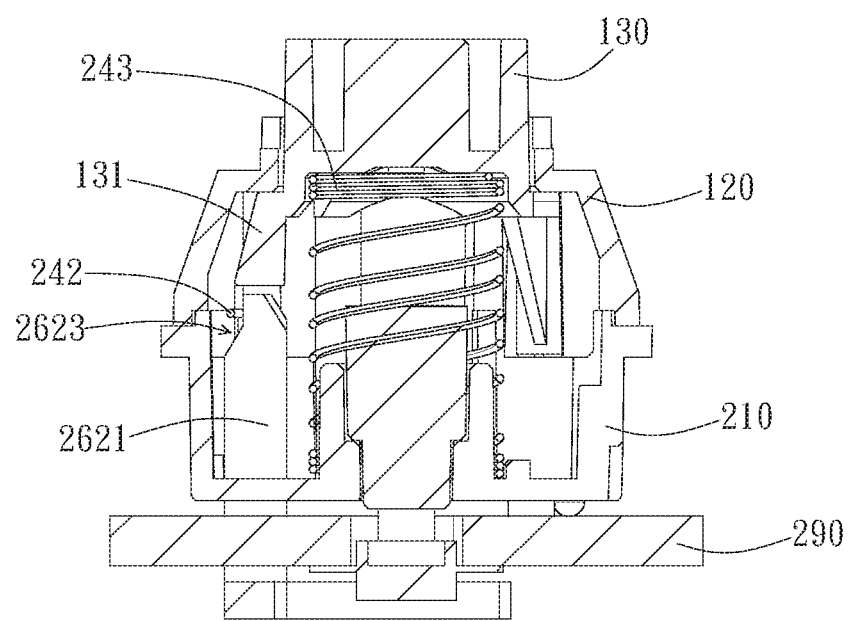

Moreover, when the distance of the Y-axis adjusting member 262 moving toward the outer side of the base 210 is large enough to shift the position of the extending arm 242 outside the moving path of the cam portion 131, the keyswitch structure 20 can provide a linear feedback. FIGS. 14A and 14B are a top view of the keyswitch structure 20 of FIG. 8A with the Y-axis adjusting member 262 at the fourth position and a cross-sectional view along the cutting line DD, respectively. As shown in FIGS. 14A and 14B, when the Y-axis adjusting member 262 is located at the fourth position in the Y-axis direction, the positioning portion 241 and the extending arm 242 have a fourth deformation (i.e. the tactile feedback member has a fourth Y-axis deformation), so the extending arm 242 is located at a fourth position relative to the moving path of the cam portion 131 in the Y-axis direction, i.e. the fourth position of the extending arm 242 is outside the moving path. For example, the fourth position of the Y-axis adjusting member 262 can be closer to the outer side of the base 210 than the third position. That is, the Y-axis adjusting bar 2621 moves much farther toward the outer side of the base 210 and pushes the extending arm 242 farther outwardly, so the stress of the positioning portion 241 and the extending arm 242 is further increased, and the extending arm 242 displaces toward the Y-axis direction to be located outside the moving path of the cam portion 131. Specifically, when the Y-axis adjusting member 262 is at the fourth position, and the pressing force is exerted to enable the plunger 130 along with the cam portion 131 to move downwardly toward the base 210, the cam portion 131 moves along the moving path without interfering with the extending arm 242, and a linear feedback is provided.

It is noted that the embodiments of FIGS. 10B to 10C are illustrated according to the positions of the X-axis adjusting member 261 moving sequentially toward the inner side of the base 210 along the X-axis direction, but not limited thereto. In another embodiment, the X-axis adjusting member 261 can move toward the outer side of the base 210 along the X-axis direction to different positions, and the positioning portion 241 can move toward the outer side of the base 210 with the X-axis adjusting member 261 by the elastic restoring force and have deformation varying with the position of the X-axis adjusting member 261 in the X-axis direction to provide a corresponding tactile feedback. Similarly, the embodiments of FIGS. 11A to 14B are illustrated according to the positions of the Y-axis adjusting member 262 moving sequentially toward the outer side of the base 210 along the Y-axis direction, but not limited thereto. In another embodiment, the Y-axis adjusting member 262 can move toward the inner side of the base 210 along the Y-axis direction to different positions, and the extending arm 242 can move toward the inner side of the base 210 with the Y-axis adjusting member 262 by the elastic restoring force to be located at a desired position relative to the moving path of the cam portion 131 in the Y-axis direction, so as to provide a corresponding tactile feedback. Specifically, according to practical applications, the keyswitch structure 20 can selectively provide two or more kinds of tactile feedback by controlling the position of the X-axis adjusting member 261 in the X-axis direction or the position of the Y-axis adjusting member 262 in the Y-axis direction. That is, the X-axis adjusting member 261 can move toward the inner side or the outer side of the base 210 in the X-axis direction to selectively control the X-axis adjusting member 261 located at (1) a position that the deformation (or default stress) of the positioning portion 241 and the extending arm 242 can allow the extending arm 242 to generate a displacement in the Z-axis direction and hit the impact surface 1181 when the plunger 130 moves downward, and the cam portion 131 pushes the extending arm 242 downwardly, such as the first position or the second position in the X-axis direction, so as to provide tactile feedbacks of different pressing forces with sounds of different volume. Moreover, the Y-axis adjusting member 262 can move toward the outer side or the inner side of the base 210 in the Y-axis direction to selectively control the Y-axis adjusting member 262 located at (1) a position that the extending arm 242 extends across the moving path of the cam portion 131, and the deform (or default stress) of the positioning portion 241 and the extending arm 242 can allow the extending arm 242 to generate a displacement in the Z-axis direction and hit the impact surface 1181 when the plunger 130 moves downward, and the cam portion 131 pushes the extending arm 242 downwardly, such as the first position, the second position, or any suitable position before reaching the third position in the Y-axis direction, so as to provide tactile feedbacks of different pressing forces with sounds of different volume, (2) a position that the extending arm 242 substantially corresponds to the protrudent point 1313 of the cam portion, and the deformation (or default stress) of the positioning portion 241 and the extending arm 242 can allow the cam portion 131 to push the extending arm 242 laterally away from the moving path when the plunger 130 moves downward along with the cam portion 131, such as the third position in the Y-axis direction, to provide the dome-collapse-like tactile feedback, or (3) a position that the extending arm 242 is located outside the moving path of the cam portion 131, so that the cam portion 131 does not interfere with the extending arm 242 when the plunger 130 moves toward the base 210 along with the cam portion 131, such as the fourth direction in the Y-axis direction, to provide a soundless linear feedback.

It is noted that the keyswitch structure 20 of the disclosure can provide a desired tactile feedback by adjusting merely one of the X-axis adjusting member 261 and the Y-axis adjusting member 262, or by adjusting the X-axis adjusting member 261 and the Y-axis adjusting member 262. In other words, in another embodiment, the keyswitch structure 20 can include only one of the X-axis adjusting member 261 and the Y-axis adjusting member 262, not limited to the embodiment of including both of the X-axis adjusting member 261 and the Y-axis adjusting member 262. Moreover, the first position or the second position of the extending arm 242 when the adjustment is achieved by adjusting the X-axis adjusting member 261 can be the same as or different from the first position or the second position of the extending arm 242 when the adjustment is achieved by adjusting the Y-axis adjusting member 262. As such, the pressing force required for the cam portion 131 to pass the extending arm 242 when the X-axis adjusting member 261 is located at the first position or the second position can be the same as or different from the pressing force required for the cam portion 131 to pass the extending arm 242 when the Y-axis adjusting member 262 is located at the first position or the second position.

Figure 15A:
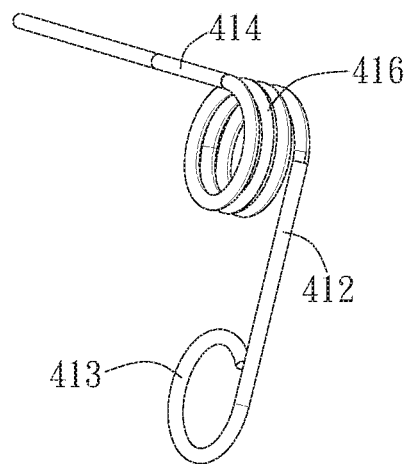
FIGS. 15A to 15C are schematic views of another embodiment of the tactile feedback member and the casing and an assembly schematic view thereof.
Figure 15B:
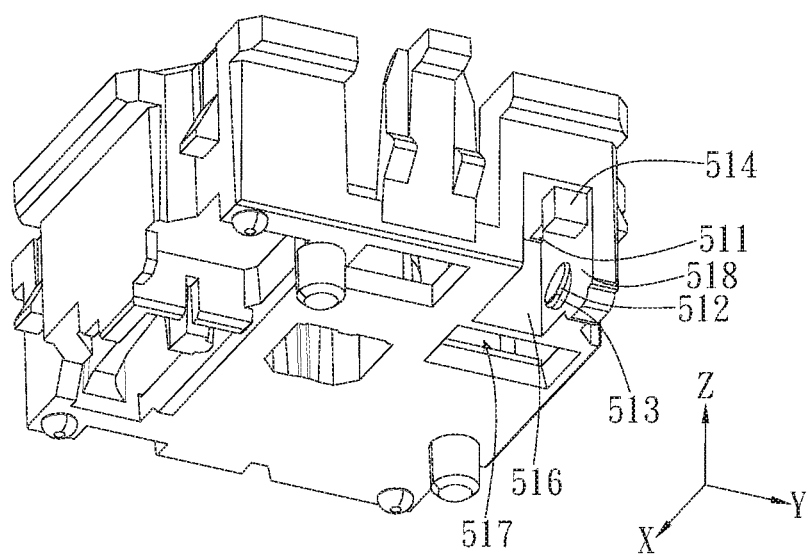
Figure 15C:
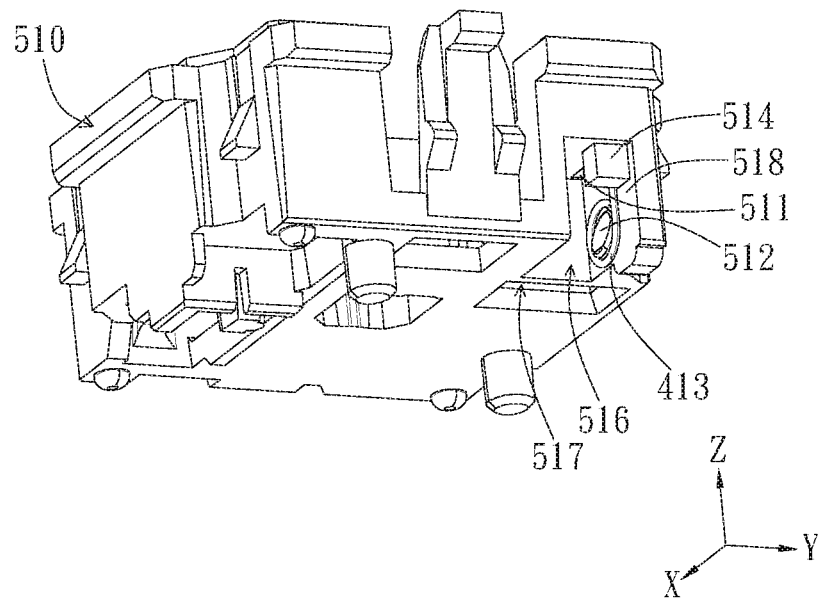
Figure 15D:
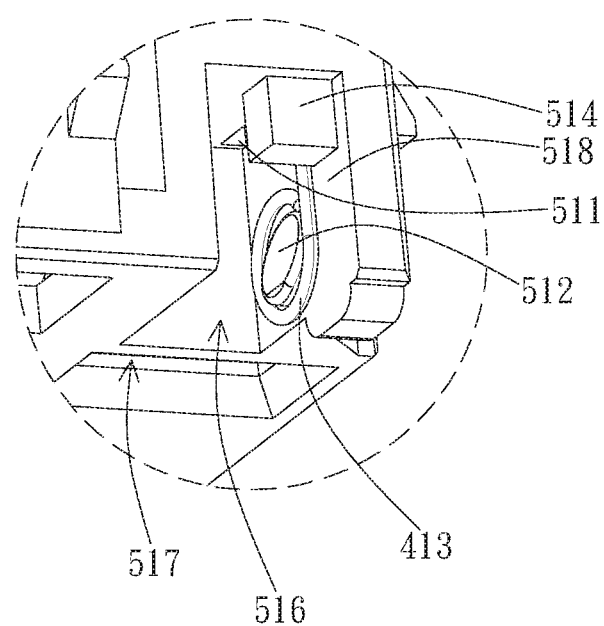
FIG. 15D is a partially enlarged view of FIG. 15C.

Moreover, by modifying the design of the positioning portion and the base, the positioning of the tactile feedback member and the base can be enhanced. In an embodiment, as shown in FIGS. 15A to 15C, the tactile feedback member 410 is implemented as a torsion spring and includes a positioning portion 412, an extending arm 414, and a spring portion 416. The positioning portion 412 and the extending arm 414 respectively extend from two opposite ends of the spring portion 416, and an angle between the extending direction of the positioning portion 412 and the extending direction of the extending arm 414 is preferably equal to or less than 120 degrees. It is noted that the tactile feedback member 410 and the base 510 are similar to the tactile feedback member 150 and the base 110 in the embodiment of FIG. 1A, and the structures thereof and the connections and arrangements with other components of the keyswitch structure can be referred to the related descriptions of the embodiment of FIG. 1A and will not be elaborated again. Hereinafter, the positioning mechanism of the tactile feedback member 410 on the base 510 is described.

In this embodiment, the tactile feedback member 410 is positioned on the base 510 by the positioning portion 412, and the positioning portion 412 has a curved section 413. The curve section 413 preferably abuts against the base 510 to limit the movement of the positioning portion 412 and to improve the assembly efficiency and the accuracy of restoring position during operation. Specifically, the base has a surface 518, and the curved section 413 preferably abuts against the surface 518. In an embodiment, the base 510 preferably has a positioning means 511, an engaging portion 512, and a receiving portion 516. The positioning means 511 can be a positioning hole and the receiving portion 516 can be a notch or an opening communicating with the positioning portion 511, as mentioned in the previous embodiments. The surface 518 is a wall surface in the receiving portion 516 and preferably parallel to the curve path of the curved section 413. As such, when the curved section 413 abuts against the surface 518, the curved section 413 and the surface 518 can have a plane of action, which is a surface area covered by the vertical projection of the curved section 413 on the surface 518. The surface 518 extends in two directions, and one of the directions is preferably parallel to the extending direction of the extending arm 414, such as X-axis direction. For example, in this embodiment, the surface 518 of the base 510 preferably extends along the X-Z plane, and the curved section 413 also extends along the X-Z plane, so that the plane of action is defined by the vertical projection of the curved section 413 on the surface 518. The X-Z plane is parallel to the X-axis and the Z axis, and the X axis, the Y axis, and the Z axis are perpendicular to one another. The engaging portion 512 is disposed in the receiving portion 516 corresponding to the positioning means 511 and configured to engage with the curved section 413. That is, the curved section 413 extends into the positioning means 511 of the base 510 and interferes with the base 510, so as to prevent the positioning portion 412 from escaping from the positioning means 511. For example, the engaging portion 512 is preferably a bolt protruding in the receiving portion 516 from the sidewall of the base 510 (i.e. from the surface 518), which defines the receiving portion 516. The engaging portion 512 preferably has a groove 513 at least partially recessed radially into the engaging portion 512 near the surface 518 of the base 510. The groove 513 is configured to accommodate at least a portion of the curved section 413. In other words, the engaging portion 512 preferably has a profile of a wider head and a narrower neck, wherein the neck is closer to the surface 518 of the base 510 than the head, so that the groove 513 is the recessed space of the neck relative to the head. In an embodiment, the base 510 preferably has a block 514 disposed corresponding to the positioning portion 412, so that the positioning portion 412 can be partially abuts against the block 514. For example, the block 514 is disposed adjacent to the positioning means 511 and preferably disposed on the surface 510 to be located on a side of the engaging portion 512. When the positioning portion 412 is positioned by the positioning means 511, the positioning potion 412 extends in the receiving portion 416 and abuts against the block 514, so that the displacement of the positioning potion 412 is limited by the block 514.

In this embodiment, the curved section 413 preferably has a ring shape, so the curved section 413 can be engaged with the engaging portion 512 to enhance the positioning of the base 510 and the tactile feedback member 410. For example, the positioning portion 412 is a rod body, which extends downward from one end of the spring portion 416 and then is bent to form a ring as the curved section 413. The curved section 413 is preferably an opened ring to provide the deformation flexibility when the curved section 413 is engaged with the engaging portion 512. That is, the distal end of the curved section 413 away from the spring body 416 is preferably a free end. The ring size of the curved section 413 is preferably substantially equal to or smaller than the size of the engaging portion 512. When the curved section 413 is engaged with the engaging portion 512, the curved section 413 can elastically deform to be at least partially received in the groove 513 and abut against the surface 518, so the positioning portion 412 is engaged with the engaging portion 512 of the base 510. As such, the positioning of the tactile feedback member 410 and the base 510 is enhanced, and during the assembly process, the chance of the tactile feedback member 410 detaching from the base 510 is reduced to promote the assembly efficiency. Moreover, during the operation of using the Y-axis adjusting member (e.g. 262), which protrudes upward from the channel portion 517 of the base 510, to adjust the position of the extending arm 414 relative to the moving path of the cam portion 131 along the Y direction, by the engagement of the curved section 413 with the engaging portion 512 to enable the curved section 413 to abut against the surface 518 so as to prevent the positioning portion 412 from rotating about the Z axis, and by the movement limitation of the positioning portion 412 (e.g. the linear section connected to the curved section 413) abutting against the block 514, the displacement of the extending arm 414 relative to the moving path of the cam portion 131 can be effectively controlled, and the accuracy of the tactile feedback member 410 returning to a desired position is increased to provide a desirable tactile feedback.

Figure 16A:
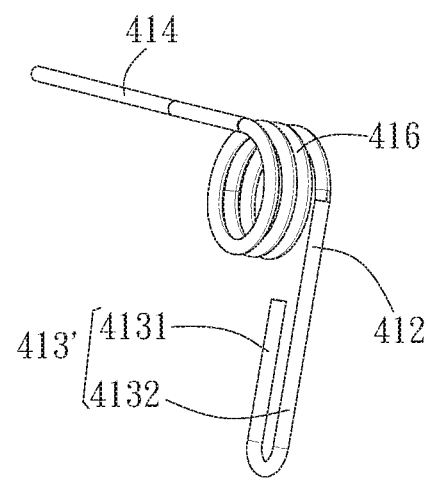
FIGS. 16A and 16B are a schematic view of yet another embodiment of the tactile feedback member and an assembly schematic view of the tactile feedback member and the base.
Figure 16B:
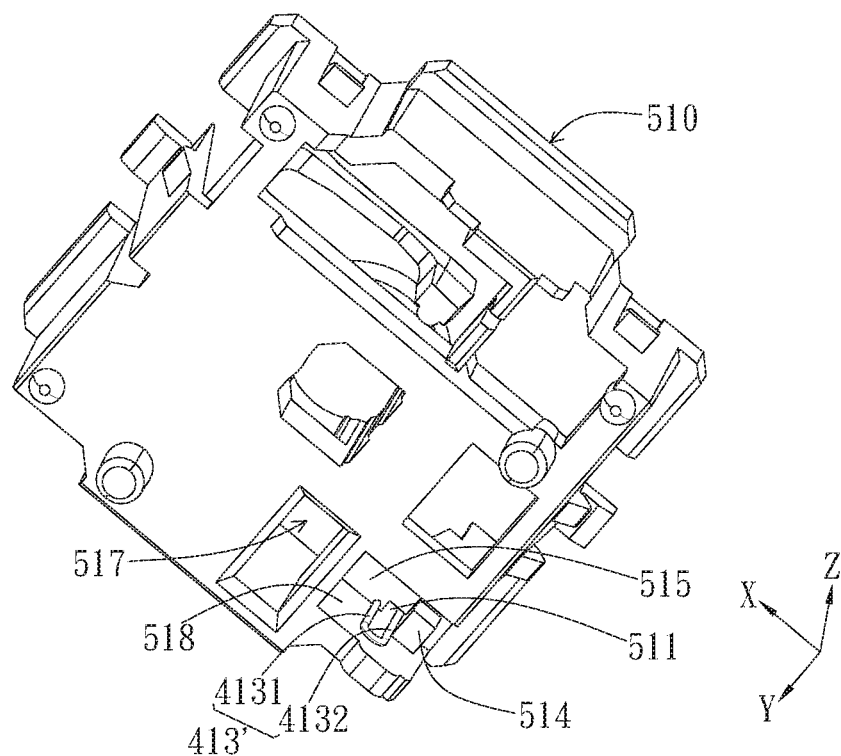
Figure 16C:
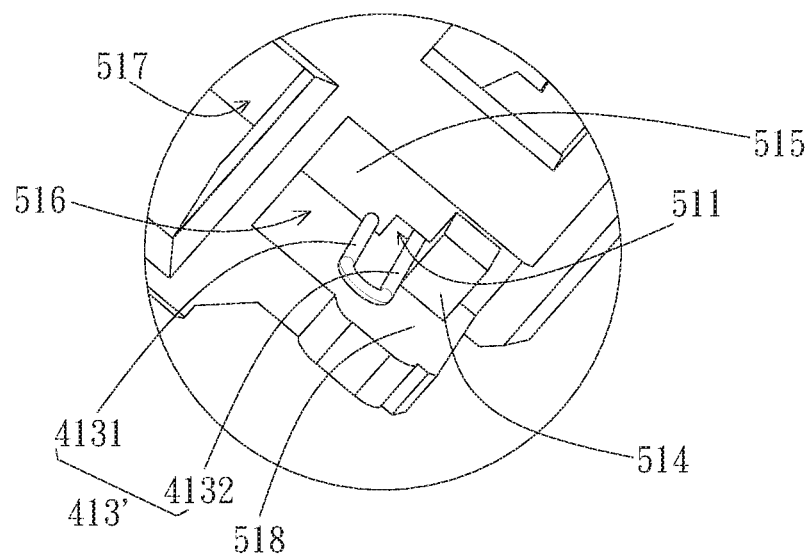
FIG. 16C is a partially enlarged view of FIG. 16B.

In other embodiments, the curved section can have different configurations to enhance the positioning of the tactile feedback member and the base. As shown in FIGS. 16A and 16B, in another embodiment, the curved portion 413' has a U shape. One end (e.g. 4132) of the curved section 413' abuts against the block 514, and the other end of the curved section 413' is a freed end 4131. The free end 4131 contacts a lower surface 515 of the base 510 adjacent to the positioning means 511. In an embodiment, the lower surface 515 can be the top surface of the receiving portion 516. Specifically, the positioning portion 412 is a rod body, which extends downward from one end of the spring portion 416 and is then bent along the extending direction of the extending arm 414 (e.g. the X axis direction) upward to form a U-shaped section as the curved section 413', wherein the opening of the U-shaped section opens toward the Z-axis direction, e.g. upward. In other words, one end 4132 of the curved section 413' is connected to the spring portion 416, and the other end of the curved section 413' is a free end 4131. When the positioning portion 412 extends to the positioning means 511 of the base 510, the end 4132 of the curved section 413' connected to the spring portion 416 abuts against the block 514, and the free end 4131 of the curved section 413' is bent upward to touch against the lower surface 515 of the base 510. As such, since the curve path of the curved section 413' is parallel to the surface 518, the positioning portion 412 and the base 510 have a plane limitation (e.g. in X-Z plane) with respect to the linear positioning portion 151 of FIG. 1A. During the assembly process and the operation, the chance of tactile feedback member 410 detaching from the base 510 is reduced to promote the assembly efficiency, and the accuracy of the tactile feedback member 410 returning to a desired position is increased to provide a desirable tactile feedback.

Figure 17A:
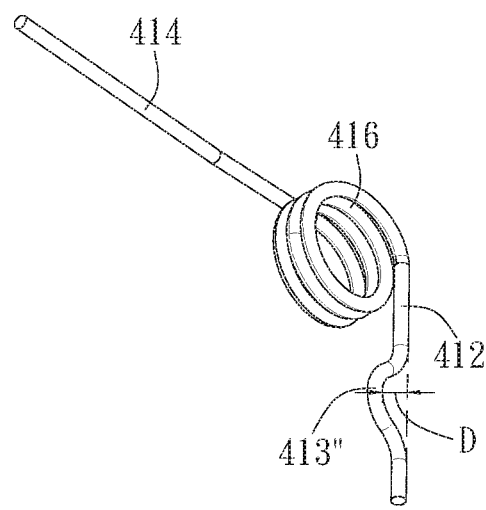
FIGS. 17A and 17B are a schematic view of a further embodiment of the tactile feedback member and an assembly schematic view of the tactile feedback member and the base.
Figure 17B:
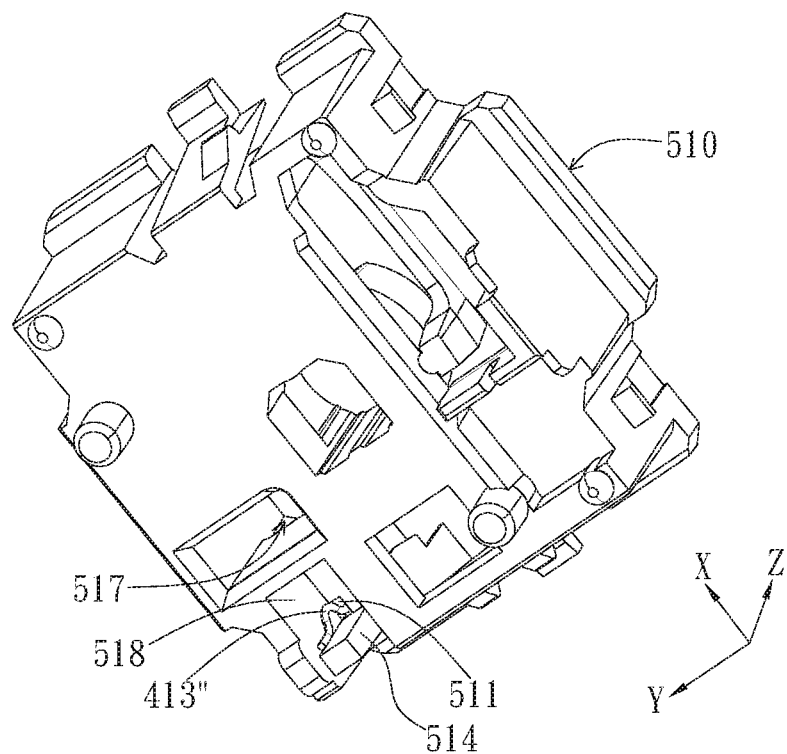
Figure 17C:
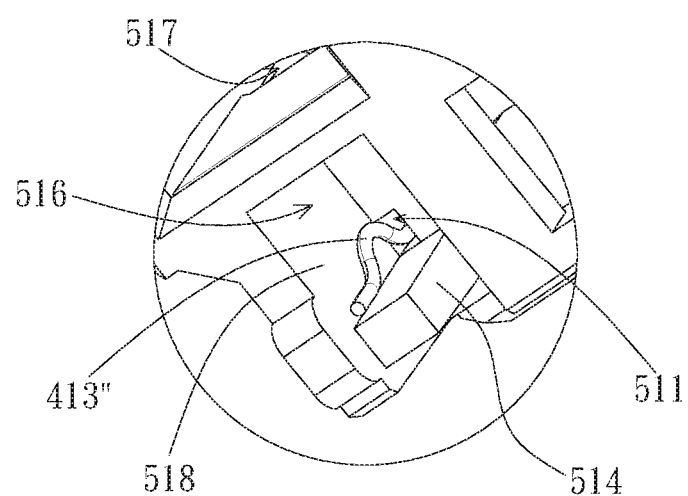
FIG. 17C is a partially enlarged view of FIG. 17B.

In another embodiment, as shown in FIGS. 17A and 17B, the curved section 413" has a U shape, wherein the opening of the U-shaped section opens laterally, e.g. toward the X-axis direction or the Y-axis direction. In this embodiment, the opening of the curved section 413" preferably opens toward the X-axis direction. Specifically, compared to the embodiment of FIG. 16A, one end of the curved section 413" is connected to the spring portion 416, and the other end of the curved section 413" is a free end extending away from the positioning means 511. In this embodiment, the curved section 413" has a curve depth D, and the curve depth D is preferably larger than the width of the positioning means 511 in the opening direction of the U-shape section, e.g. the X-axis direction or the Y-axis direction. In other words, the lateral size of the curved section 413" is larger than the width of the positioning means 511, so when the positioning portion 412 is positioned by the positioning means 511, the linear section of the positioning portion 412, which is connected to the curved section 413", abuts against the block 514 of the base 510, and the curved section 413" abuts against the surface 518, so that the curved section 413" interferes with the base 510 adjacent to the positioning means 511 to prevent the positioning portion 412 from escaping from the positioning means 511 since the curve depth D is larger than the width of the positioning means 511. As such, the positioning portion 412 and the base 510 have a plane limitation (e.g. in X-Z plane) with respect to the linear positioning portion 151 of FIG. 1A. During the assembly process and the operation, the chance of the tactile feedback member 410 detaching from the base 510 is reduced to promote the assembly efficiency, and the accuracy of the tactile feedback member 410 returning to a desired position is increased to provide a desirable tactile feedback.

It is noted that the design of the curved section to enhance the positioning of the positioning portion and the base can be applied not only to the keyswitch structure (e.g. 10) with the adjusting unit in the previous embodiment, but also to a keyswitch structure without the adjusting unit in other embodiments (not shown). Therefore, during the assembly process, the positioning portion can be inserted into the positioning hole, which serves as the positioning means, by elastically deforming the curved section. By the positioning enhancement of the positioning portion and the base, e.g. the curved section interfering with the base or the width of the positioning means 511 (e.g. hole) being smaller than the size of the curved section 413, 313', or 413" in the X-axis direction, the chance of the tactile feedback member detaching from the base can be reduced to facilitate the assembly efficiency.

Figure 18:
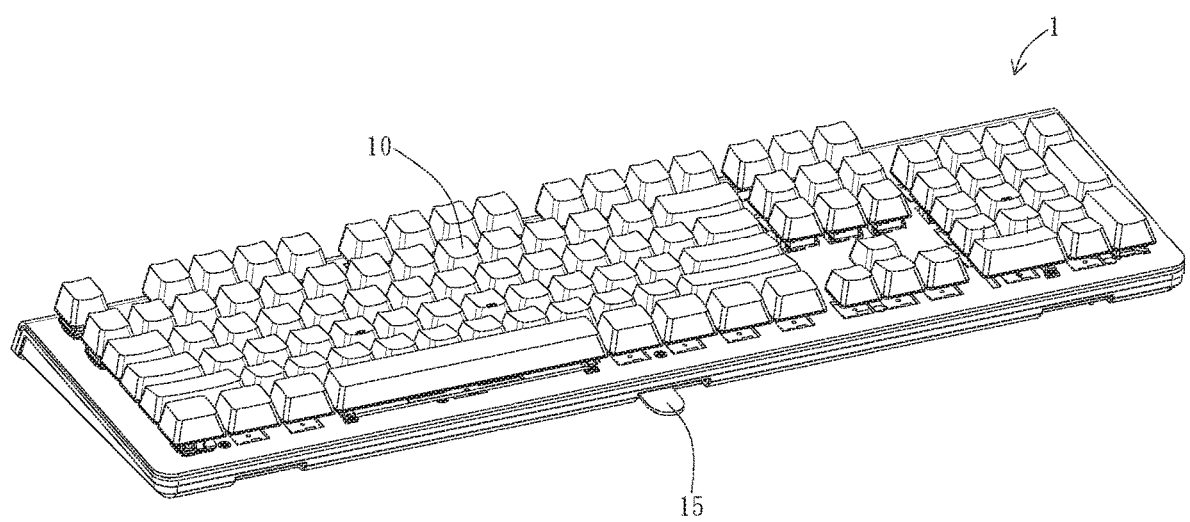
FIG. 18 is a schematic view of the keyboard of an embodiment of the disclosure.

In addition, when a plurality of keyswitch structures such as 10, 20 are integrated into a keyboard, the adjusting units of the keyswitch structures can be integrated into a single component by connecting the connection portions of the keyswitch structures. As shown in FIG. 18, in an embodiment, when a plurality of keyswitch structures 10 are integrated into a keyboard 1, the connection portions 162 of the adjusting units 160 can be connected to each other to form a sheet-like or net-like connection portion. The keyboard 1 can further include a control member 15, which is configured to control the movement of the sheet-like or net-like connection portion, so that the adjusting bar 161 can be controlled to adjust the tactile feedback of the multiple keyswitch structures 10 at the same time. In this embodiment, the control member 15 can be a control bar connected to the connection portion and can be controlled manually or automatically.

It is noted when a plurality of keyswitch structures 20 are integrated into a keyboard, the connection portion 2612 of the X-axis adjusting member 261 of each keyswitch structure 20 can be connected together to form a sheet-like or net-like connection portion, and the connection portion 2622 of the Y-axis adjusting member 262 of each keyswitch structure 20 can be connected together to form another sheet-like or net-like connection portion. The keyboard may further include an X-axis control member and a Y-axis control member to control the X-axis adjusting members 261 and the Y-axis adjusting member 262, separately, but not limited thereto. In another embodiment, according to practical applications, when the plurality of keyswitch structures 20 including merely one of the X-axis adjusting members 261 and the Y-axis adjusting member 262 are integrated into a keyboard, the keyboard can include only one of the X-axis control member and the Y-axis control member to control a corresponding one of the X-axis adjusting members 261 and the Y-axis adjusting member 262.

Figure 19A:
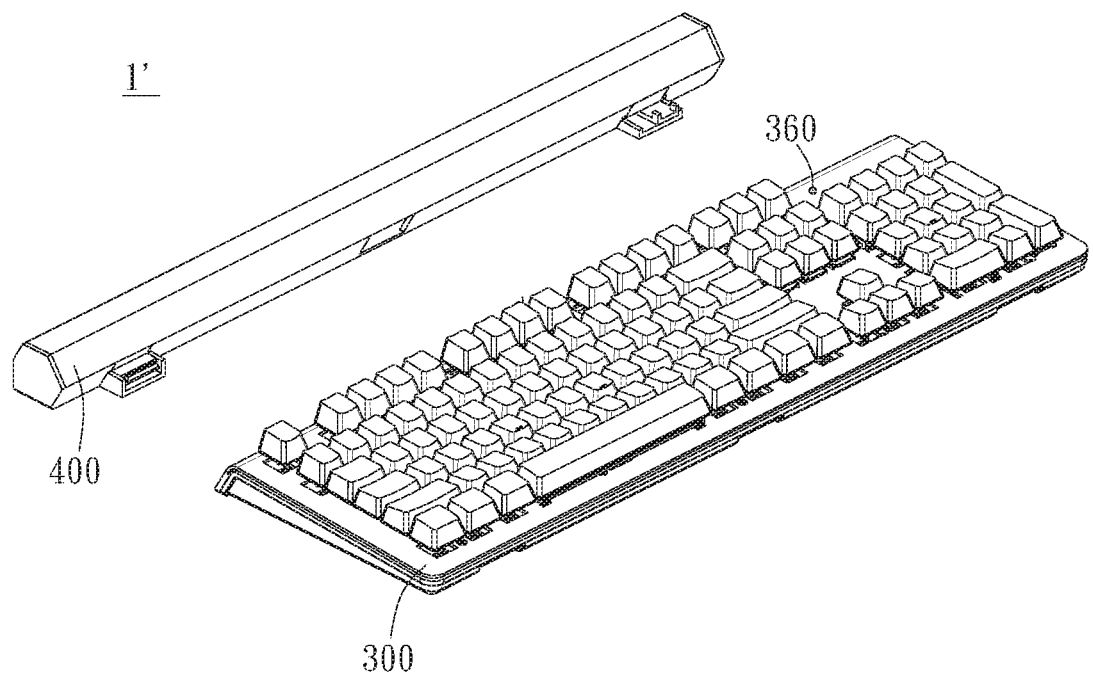
FIGS. 19A and 19C are an exploded view and assembly views from top and bottom of another embodiment of the keyboard of the invention, respectively.
Figure 19B:
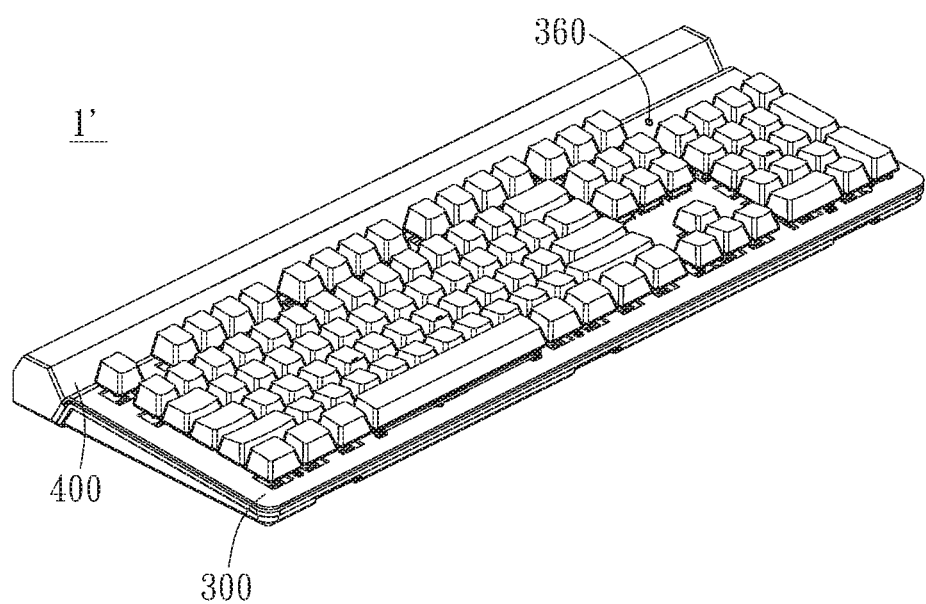
Figure 19C:
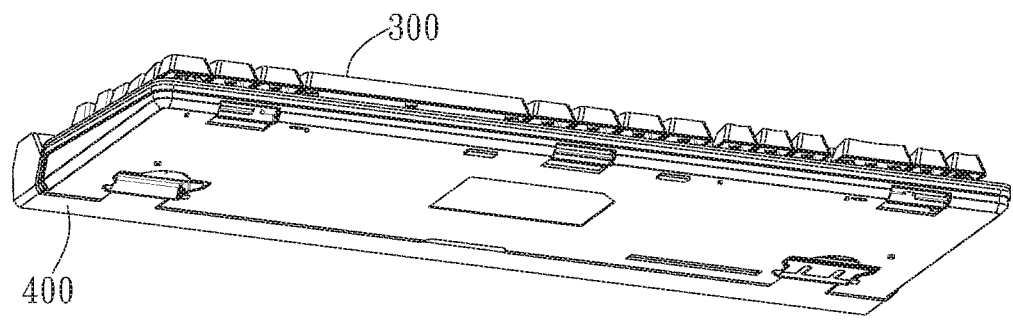

As shown in FIGS. 19A to 19C, in another embodiment, the keyboard 1' of the disclosure includes a keyswitch module 300 and an auxiliary module 400. In this embodiment, the keyswitch module 300 can be an independent keyboard device, and the auxiliary module 400 is a functional auxiliary module, which is preferably detachably connected to the keyswitch module 300, but not limited thereto. In another embodiment, the keyswitch module 300 and the auxiliary module 400 can be integrated into an integral keyboard or to an electronic product, such as a portable information processing device. With reference to the drawings, the keyswitch module 300 and the auxiliary module 400 of the keyboard 1' will be described in detail.

Figure 20A:
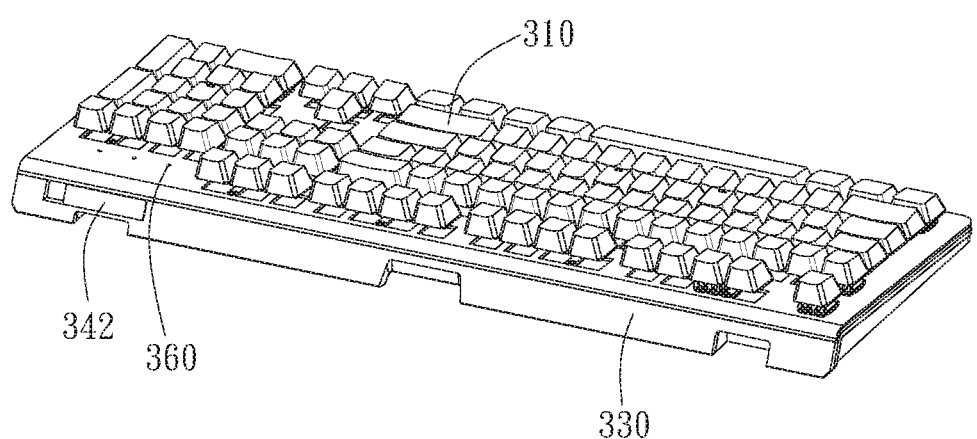
FIGS. 20A and 20B are a perspective view and an exploded view of the keyswitch module of FIG. 19A, respectively.
Figure 20B:
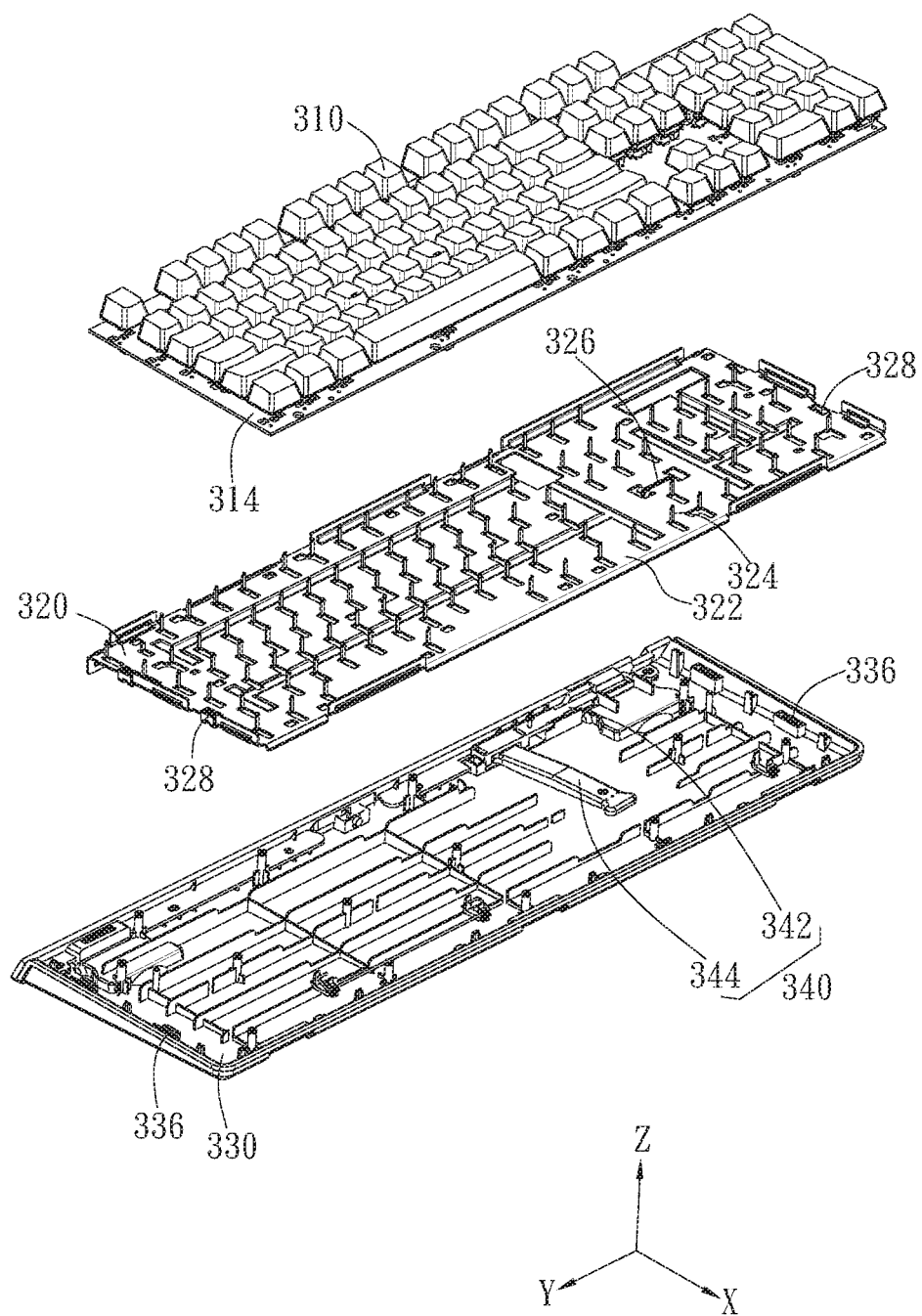

As shown in FIGS. 20A and 20B, in an embodiment, the keyswitch module 300 includes a plurality of keyswitch structures 310, an adjusting plate 320, a bottom housing 330, and a linking mechanism 340. Each of the keyswitch structures 310 includes a tactile feedback member 312. The adjusting plate 320 is disposed under the keyswitch structures 310. The adjusting plate 320 includes a plate body 322 and a plurality of adjusting bars 324. The adjusting bars 324 protrude from the plate body 322 toward the keyswitch structures 310 to respectively correspond to the tactile feedback members 312 (shown in FIG. 21) of the keyswitch structures 310. The bottom housing 330 is disposed under the adjusting plate 320. The linking mechanism 340 is movably disposed on the bottom housing 330 and couples with the adjusting plate 320. When the linking mechanism 340 moves relative to the bottom housing 330, the adjusting plate 320 moves along with the linking mechanism 340, so the adjusting bars 324 drive the tactile feedback members 312 to shift to change the tactile feedback of the keyswitch structures 310 at the same time.

Specifically, the keyswitch structure 310 can be a keyswitch structure similar to those described above, such as the keyswitch structure 10 or 20, and the plurality of keyswitch structures 310 are disposed on a same circuit board 314 or baseplate. That is, the circuit board 190 or 290 (or baseplate) of the keyswitch structures 10 or 20 are preferably integrated into a single circuit board to decrease the number of components and simplify the assembly process. When the keyswitch structure 310 has a structure similar to the keyswitch structure 10, the tactile feedback member 312 can be identical in structure to the tactile feedback member 150. In other words, the positioning portion and the extending arm of the tactile feedback member 312 are the positioning portion 151 and the extending arm 152 extending from the spring body 153. When the keyswitch structure 310 has a structure similar to the keyswitch structure 20, the positioning portion and the extending arm of the tactile feedback member 312 can be identical in structure to the positioning portion 241 and the extending arm 242 of the resilient member 240 of FIG. 8A or the positioning portion 412 and the extending arm 414 of the tactile feedback member 410 of FIG. 15A, 16A, or 17A. The detail of the keyswitch structure 310 can refer to related descriptions of the keyswitch structure 10 or 20 in the previous embodiments, and will not be elaborated again.

In an embodiment, the adjusting plate 320 can be a metal plate, and the adjusting bars 324 are plungers bent upward from the plate body 322, but not limited thereto. In another embodiment, the adjusting plate 320 can be a plastic plate made by molding. That is, the adjusting plate 320 is a single component with the plurality of adjusting bars 324 connected to each other by the plate body 322. In this embodiment, the plate body 322 is preferably a sheet-like body extending in the XY plane and has a size substantially corresponding to the circuit board 314 (or baseplate) of the keyswitch structures 310, but not limited thereto. In another embodiment, the plate body 322 can be a net-like or grid-like body. Moreover, according to the adjusting operation of the keyswitch structure 310, the adjusting bar 324 may have a structure similar to the adjusting bar 161, the X-axis adjusting bar 2611, or the Y-axis adjusting bar 2621 and is disposed corresponding to the positioning portion or the extending arm of the tactile feedback member 312. For example, when the keyswitch structure 310 is similar to the keyswitch structure 10, the adjusting bar 324 is disposed corresponding to the positioning portion and has the connection and operation similar to those of the adjusting bar 161. When the keyswitch structure 310 is similar to the keyswitch structure 20, the adjusting bar 324 can be disposed corresponding to the positioning portion and have the connection and operation similar to those of the X-axis adjusting bar 2611 and the positioning portion 241. Alternatively, the adjusting bar 324 can be disposed corresponding to the extending arm and have the connection and operation similar to those of the Y-axis adjusting bar 2621 and the extending arm 242. That is, the tactile feedback of the keyswitch structure 310 may be adjusted in a manner similar to the keyswitch structure 10 in FIGS. 4A to 7B or the keyswitch structure 20 in FIGS. 11A to 14B. In sum, the adjusting bar 324 of the adjusting plate 320 can be disposed corresponding to the positioning portion or the extending arm to change the tactile feedback of the keyswitch structure 310, such as different required pressing forces, dome-collapse-like tactile feedback, linear feedback, by controlling the movement of the adjusting bar to change the deformation of the tactile feedback member or the position of the extending arm relative to the moving path of the cam portion.

Figure 21:
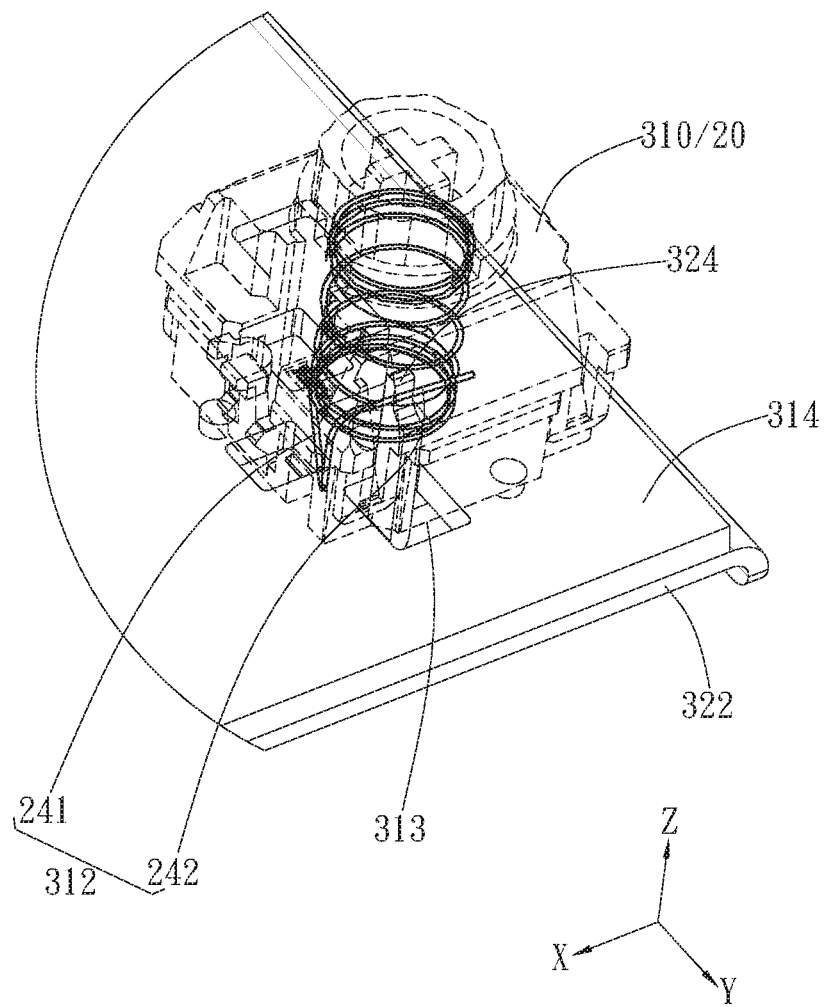
FIG. 21 is a partially enlarged view of the keyswitch module.

As shown in FIG. 21, in this embodiment, the keyswitch structure 310 is similar to the keyswitch structure 20. The adjusting bar 324 is inserted into the Y-axis slot 313 and protrudes upward corresponding to the extending arm 242. That is, the adjusting bar 324 functions as the Y-axis adjusting bar 2621 in the previous embodiment, but not limited thereto. In another embodiment (not shown), by modifying the relative position of the adjusting bar 324 to the tactile feedback member 312, the adjusting bar 324 can function as the adjusting bar 161 or the X-axis adjusting bar 2611. In another embodiment (not shown), the keyboard 1' can include two adjusting plates and corresponding linking mechanism, wherein one adjusting plate has the adjusting bars functioning as the Y-axis adjusting bar 2621, and the other adjusting plate has the adjusting bars functioning as the X-axis adjusting bar 2611, so that the tactile feedback of the keyswitch structure 310 can be adjusted in two directions, such as the X-axis direction and the Y-axis direction.

As shown in FIG. 20B, the linking mechanism 340 preferably includes a first linking bar 342 and a second linking bar 344. The first linking bar 342 is movably disposed on the bottom housing 330, and the second linking bar 344 is rotatably disposed on the bottom housing 330. A first end 3441 of the second linking bar 344 couples with the first linking bar 342, and a second end 3442 of the second linking bar 344 couples with the plate body 322. Referring to FIGS. 22A-22B and FIGS. 23A-23B, in an embodiment, the first linking bar 342 has an accommodation portion 3421, and the first end 3441 of the second linking bar344 is accommodated in the accommodation portion 3421. Specifically, the first linking bar 342 extends along the Y-axis direction and is disposed at one side of the bottom housing 330 along the Y-axis direction. For example, the first linking bar 342 is disposed on the side of the bottom housing 330 near the auxiliary module 400. The bottom housing 330 preferably has a positioning portion 331, which is configured to position the first linking bar 342. For example, the positioning portion 331 is preferably a blocking wall or post, which can be disposed along the Y-axis direction and spaced apart from the outer wall of the bottom housing 330. As such, the disposing location of the first linking bar 342 on the bottom housing 330 is defined, and the movement of the first linking bar 342 in the X-axis direction is restricted. In other words, the distance between the positioning portion 331 and the corresponding outer wall of the bottom housing 330 in the X-axis direction is preferably substantially equal to or larger than the width of the first linking bar 342 in the X-axis direction. As such, the first lining bar 342 is allowed to move along the Y-axis direction relative to the bottom housing 330, and the displacement of the first linking bar 342 in the X-axis direction is limited. In this embodiment, the positioning portion 331 is implemented as the blocking wall, but not limited thereto. In another embodiment, in response to the design of the first linking bar 342, the positioning portion 331 can be a groove or a rail.

The first linking bar 342 further has a protrusion 3423 protruding downward to define the accommodation portion 3421. For example, the first linking bar 342 has a plurality of protrusions 3423. When the first linking bar 342 is movably disposed on the bottom housing 330 corresponding to the positioning portion 331, the space defined by two adjacent protrusions 3423 and the surface of the bottom housing 330 serves as the accommodation portion 3421 to allow the first end 3441 of the second linking bar 344 to be accommodated therein, but not limited thereto. In another embodiment, the accommodation portion 3421 can be an opening opened into or a recessed space recessed from the surface of the first linking bar 342.

The first linking bar 342 preferably further has a control member 3422, and the base has a notch 332 corresponding to the control member 3422. As such, similar to the keyboard 1, the keyswitch module 300 can adjust the relative position of the adjusting plate 320 (e.g. the adjusting bars 324) to the tactile feedback members 312 by controlling the control member 3422, so as to manually change the tactile feedback. For example, when the first linking bar 342 is disposed on the bottom housing 330, the control member 3422 of the first linking bar 342 preferably extends outside the bottom housing 330 from the notch 332, so the user can move the first linking bar 342 by the control member 3422, but not limited thereto. In another embodiment, the first linking bar 342 can have a coupling portion 3426, which is coupled to a driving device, so the tactile feedback of the keyswitch module 300 can be changed by electric or signal control (will be described later). In this embodiment, the coupling portion 3426 can be a coupling slot formed in the bottom of the first linking bar 342, but not limited thereto.

Figure 22A:
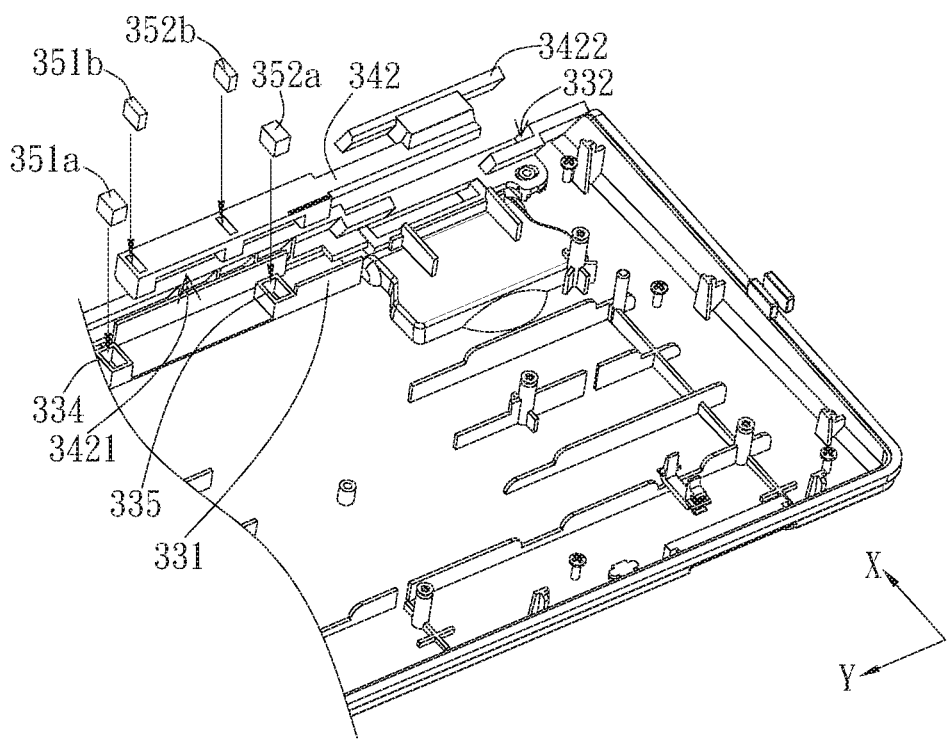
FIGS. 22A and 22B are an exploded view and an assembly view of the first linking bar and the base, respectively.
Figure 22B:
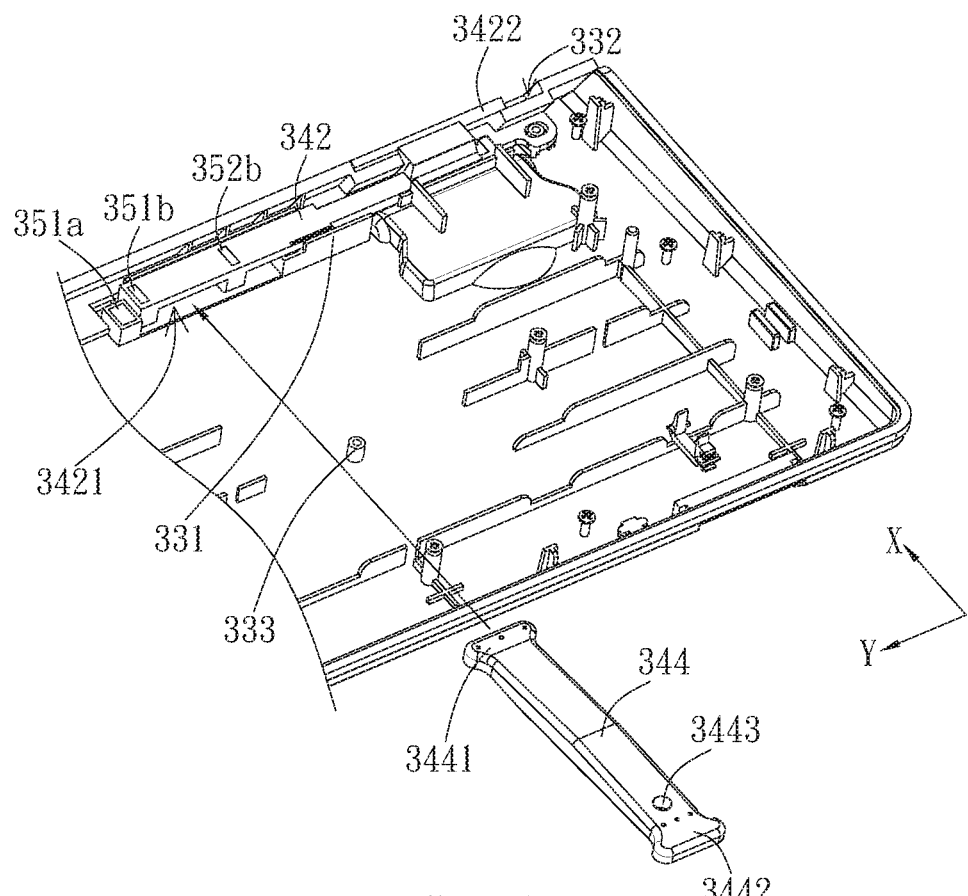
Figure 23A:
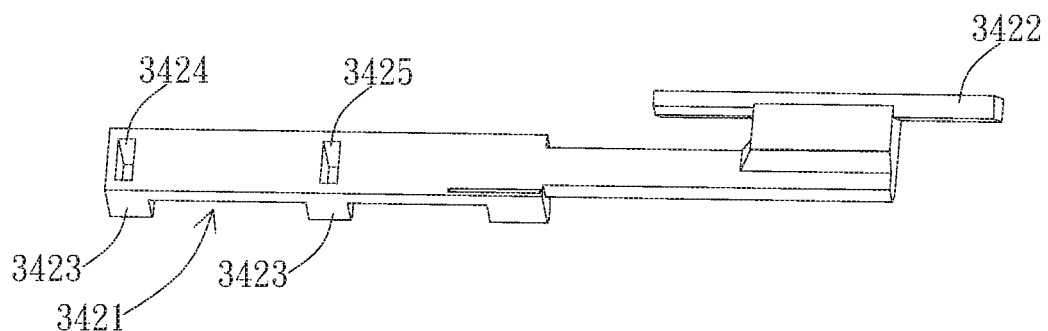
FIGS. 23A and 23B are schematic views of the first linking bar from different viewing angles.
Figure 23B:
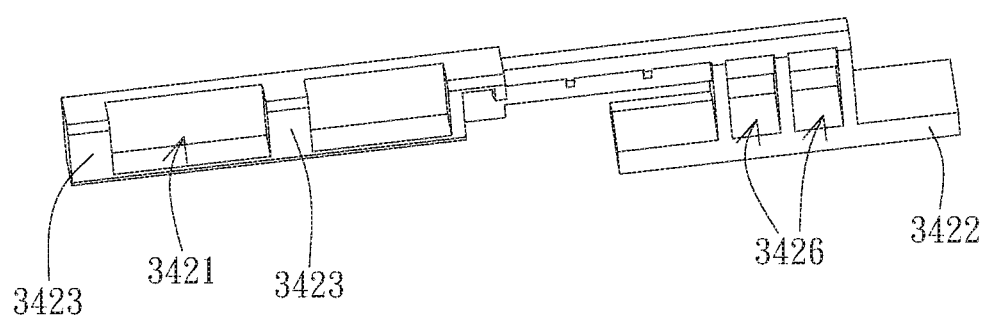

As shown in FIGS. 22A and 22B, the keyboard 1' preferably further includes a set of magnetic members 351a, 351b. The set of magnetic members 351a, 351b are disposed corresponding to the bottom housing 330 and the first linking bar 342. When the linking mechanism 340 moves, the set of magnetic members 351a, 351b are selectively close to or away from each other. In this embodiment, the keyboard 1' preferably has two sets of magnetic members, such as one set of magnetic members 351a, 351b and the other set of magnetic members 352a, 352b, which are disposed along the moving direction of the first linking bar 342, such as the Y-axis direction. When the linking mechanism 340 moves, for example, the first linking bar 342 moving to the left side, one set of the magnetic members 351a, 351b are getting close to each other, and the other set of the magnetic members 352a, 352b are getting away from each other. Alternatively, when the first linking bar 342 moves to the right side, one set of the magnetic members 352a, 352b are getting close to each other, and the other set of the magnetic members 351a, 351b are getting away from each other. Each set of the magnetic members preferably has magnetic attraction force therebetween. Therefore, the set of magnetic members 351a, 351b can enhance the positioning effect toward the left side, and the set of magnetic members 352a, 352b can enhance the positioning effect toward the right side.

Corresponding to the deposition of the magnetic members 351b, 352b, the first linking bar 342 preferably has slots 3424, 3425, which are configured to accommodate the magnetic members 351b, 352b. For example, the slots 3424, 3425 are disposed corresponding to the protrusions 3423. In this embodiment, the slots 3424, 3425 are holes formed in the protrusions 3423 from the surface of the first linking bar 342, i.e. the protrusion 3423 can be a hollow column, and the magnetic members 351b, 352b are disposed in the slots 3424, 3425, respectively, but not limited thereto. In another embodiment, the slots 3424, 3425 can be holes recessing from the bottom of the protrusions 3423 toward the first linking bar 342. The bottom housing 330 preferably has corresponding slots 334, 335, which are configured to accommodate the magnetic members 351a, 352a, but not limited thereto. In another embodiment, the magnetic members 351a, 352a and 351b, 352b can be respectively adhered to the bottom housing 330 and the first linking bar 342 to eliminate the formation of the slots 334, 335 or 3424, 3425.

The second linking bar 344 is preferably disposed along the X-axis direction, so that the first end 3441 of the second linking bar 344 is accommodated in the accommodation portion 3421, and the second end 3442 of the second linking bar 344 is pivotally connected to the bottom housing 330. For example, the bottom housing 330 has pivotal portion 333, and the second linking bar 344 has a pivotal hole 3443 near the second end 3442. When the second linking bar 344 is disposed on the bottom housing 330, the first end 3441 of the second linking bar 344 extends into the accommodation potion 3421, and the pivotal portion 333 couples with the pivotal hole 3443 at the second end 3442 of the second linking bar 344 by a pin or a bolt to form a pivot, so that the second linking bar 344 is rotatable relative to the bottom housing 330. When the first linking bar 342 moves along the Y-axis direction, the first linking bar 342 drives the first end 3441 of the second linking bar 344 to rotate in the same direction along the Y-axis, and the second end 3442 of the second linking bar 344 correspondingly moves oppositely in the Y-axis direction. The end portion of the second lining bar 344, such as the first end 3441, preferably has a curved profile, so the protrusion 3423 of the first linking bar 342 is contacted with the curved surface to enhance the linkage of the first linking bar 342 and the second linking bar 344.

Figure 24A:
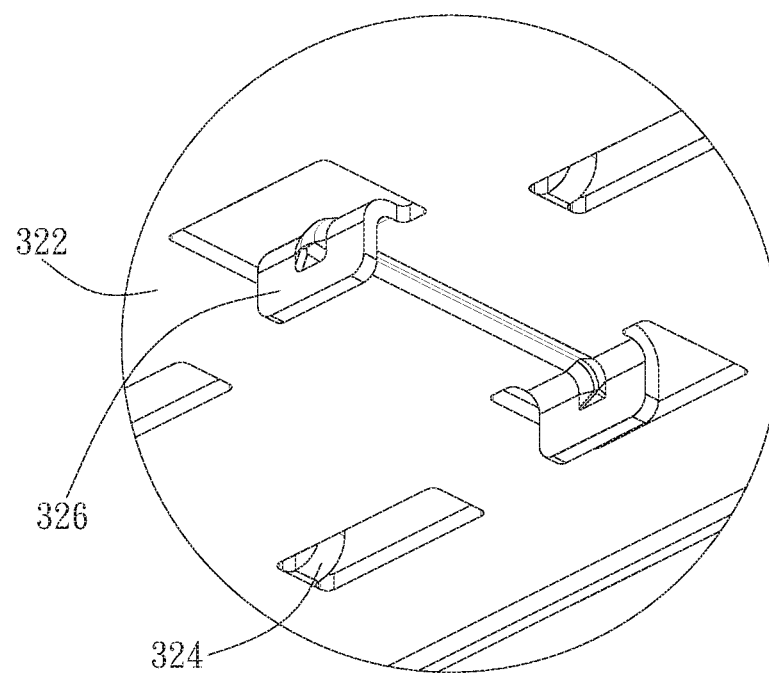
FIGS. 24A and 24B are a schematic view of the coupling portion of the adjusting plate and a cross-sectional view of the connection with the second linking bar.
Figure 24B:
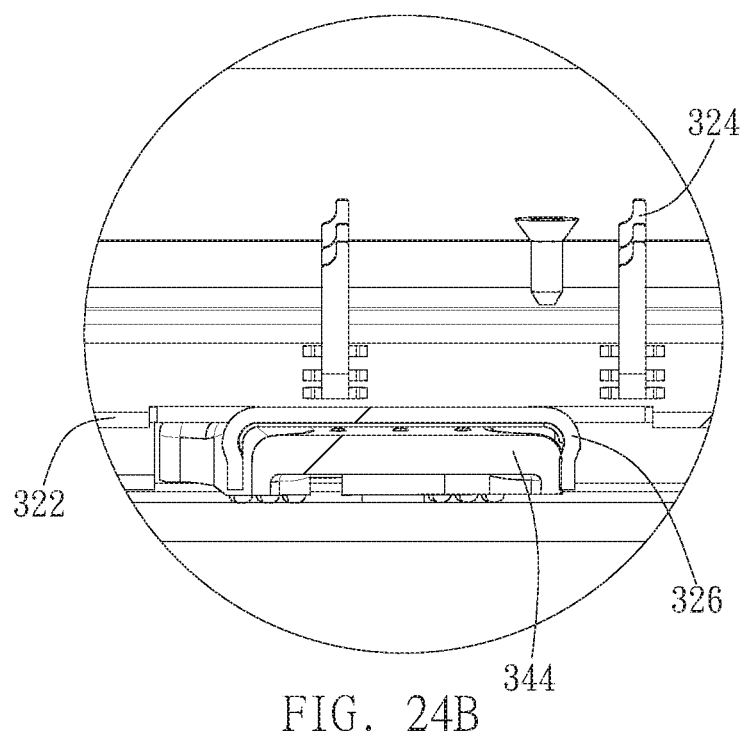
Figure 25A:
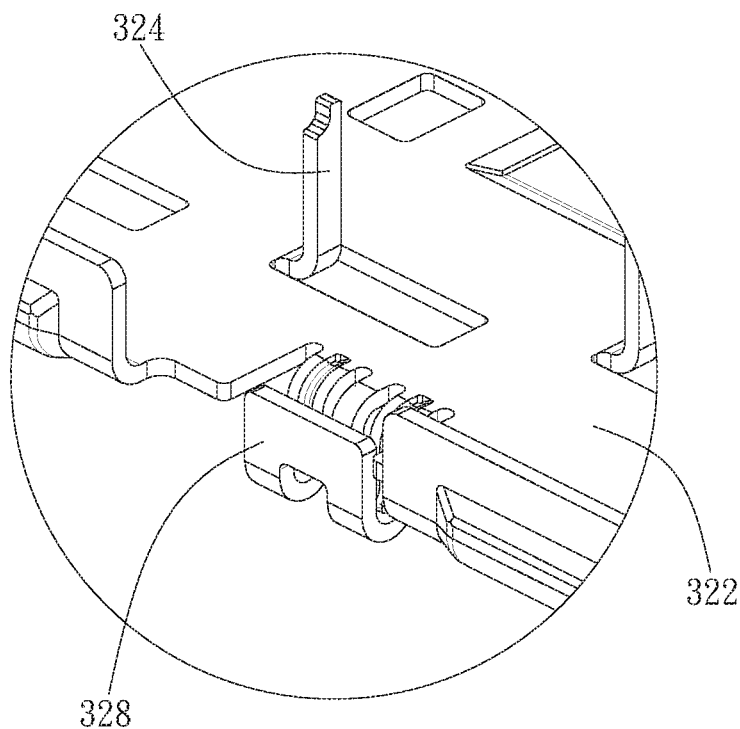
FIGS. 25A and 25B are schematic views of the receiving portion of the adjusting plate from different viewing angles.
Figure 25B:
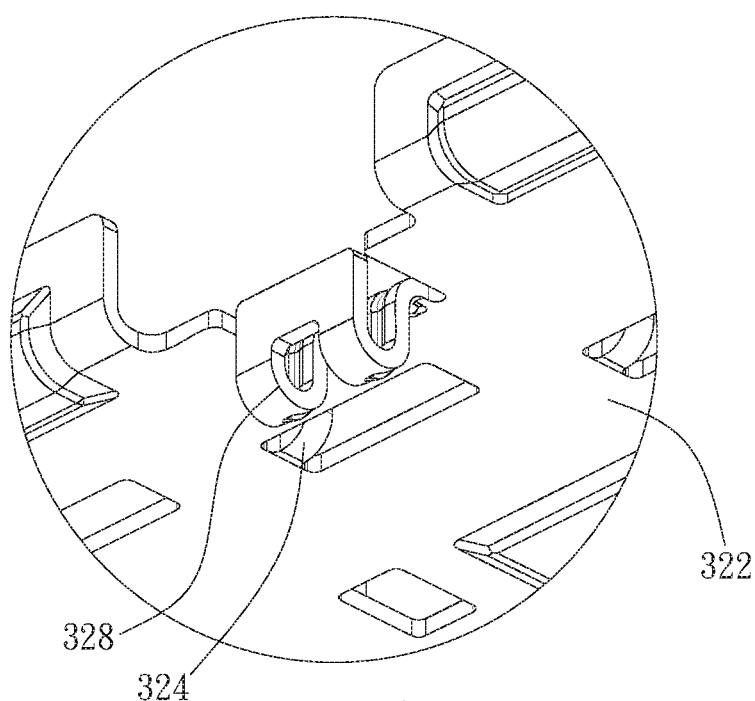
Figure 26:
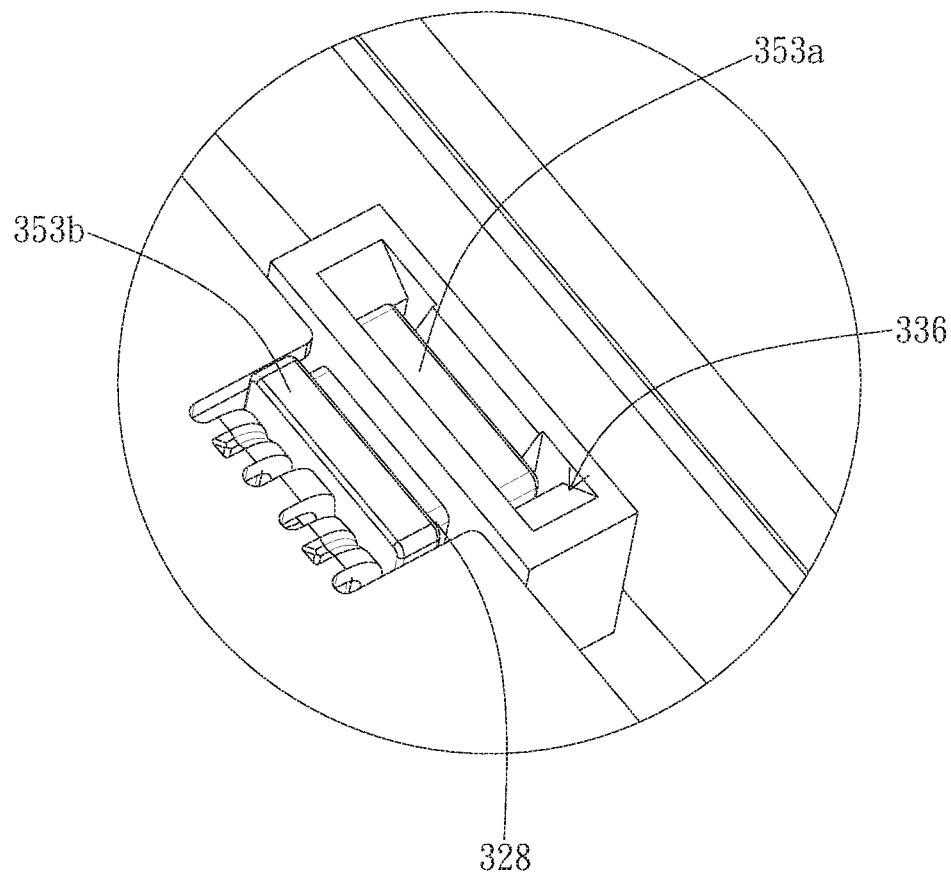
FIG. 26 is a schematic view of the magnetic members in the adjusting plate and the base.

As shown in FIG. 20B and FIG. 24A-24B, the plate body 322 of the adjusting plate 320 has a coupling portion 326, which is configured to couple with the second end 3442 of the second linking bar 344. The coupling portion 326 is preferably bent downward from the plate body 322 to couple with the second end 3442 of the second linking bar 344. For example, the coupling portion 326 and the adjusting bars 324 protrude away from the plate body 322 toward opposite directions, e.g. downward and upward, respectively. The coupling portion 326 can be a structure with an engaging groove, so that the coupling portion 326 can engage with the second end 3442 of the second linking bar 344. When the first linking bar 342 moves along the Y-axis direction, the first linking bar 342 drives the first end 3441 of the second linking bar 344 to rotate in the same direction along the Y-axis direction, and the second end 3442 of the second linking bar 344 correspondingly moves oppositely in the Y-axis direction, so that the adjusting bars 324 drive the corresponding tactile feedback members 312 to shift. It is noted that the adjusting plate 320 can be connected to the second end 3442 of the second linking bar 344 by other methods, such as screwing, adhering, and not limited to the embodiments.

As shown in FIG. 20B and FIGS. 25A-25B and 26, the keyboard 1' further includes a set of magnetic members 353a, 353b, which are disposed corresponding to the bottom housing 330 and the adjusting plate 320. When the linking mechanism 340 moves, the set of magnetic members 353a, 353b are selectively close to or away from each other. In this embodiment, the keyboard 1' preferably has two sets of magnetic members 353a, 353b, which are disposed along the moving direction of the adjusting plate 320, such as the Y-axis direction, at two opposite sides of the bottom housing 330. When the linking mechanism 340 moves, for example, the first linking bar 342 moving to the left side, one set of the magnetic members 353a, 353b at the left side are getting close to each other, and the other set of the magnetic members 353a, 353b at the right side are getting away from each other. Alternatively, when the first linking bar 342 moves to the right side, one set of the magnetic members 353a, 353b at the right side are getting close to each other, and the other set of the magnetic members 353a, 353b at the left side are getting away from each other. Each set of the magnetic members 353a, 353b preferably has magnetic attraction force therebetween. Therefore, the set of magnetic members 353a, 353b can enhance the positioning effect from left to right, or from right to left.

Corresponding to the deposition of the magnetic members 353a, 353b, the adjusting plate 320 preferably has a receiving portion 328, which is configured to receive the magnetic member 353b. In this embodiment, the receiving portion 328 is preferably a bearing structure with a groove formed by bending the plate body 322 from the side of the plate body 322, and the magnetic member 353b can be disposed in the groove. The bottom housing 330 preferably has a corresponding slot 336, which is configured to accommodate the magnetic members 353a, but not limited thereto. In another embodiment, the magnetic members 353a, 353b can be respectively adhered to the bottom housing 330 and the adjusting plate 320 to eliminate the use of the receiving portion 328 or the slot 336.

It is noted that the set of magnetic members 351a and 351b, 352a and 352b, or 353a and 353b can be implemented as magnets, or a combination of magnet and magnetic material. The magnetic members are disposed in set in the above embodiment to enhance the positioning effect of the adjusting plate (or the first linking bar) and the base, but not limited thereto. When one of the adjusting plate (or the first linking bar) and the base is made of magnetic material, such as iron, one magnetic member (such as magnet) can be used to correspondingly enhance the positioning effect.

Figure 27A:
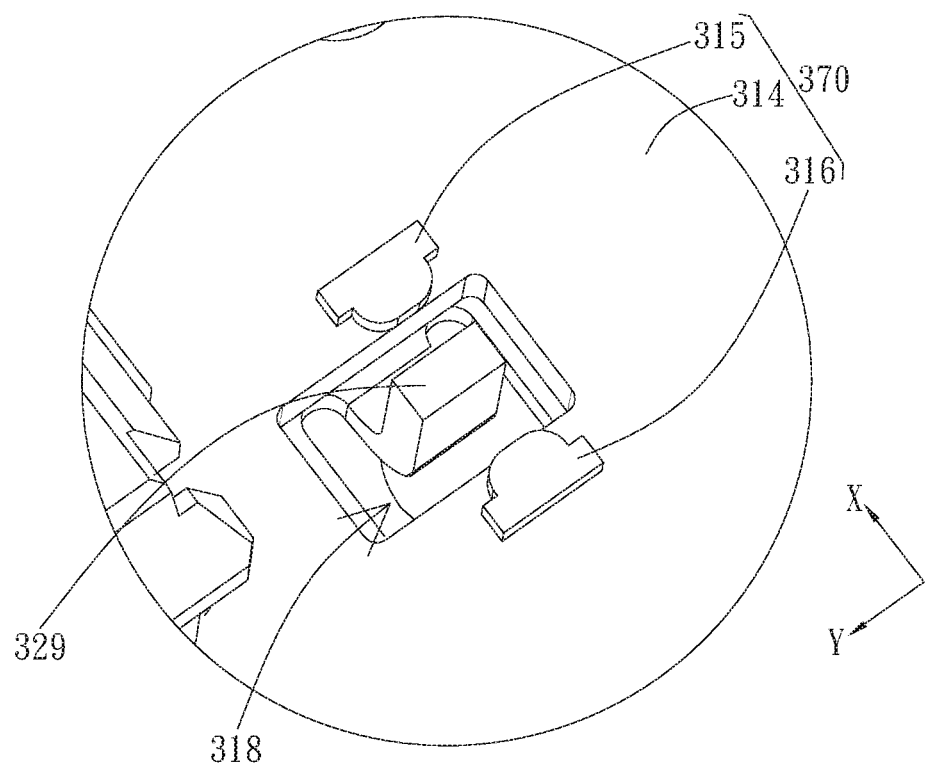
FIGS. 27A and 27B are schematic views of the switch unit and the indicator bar at different relative positions.
Figure 27B:
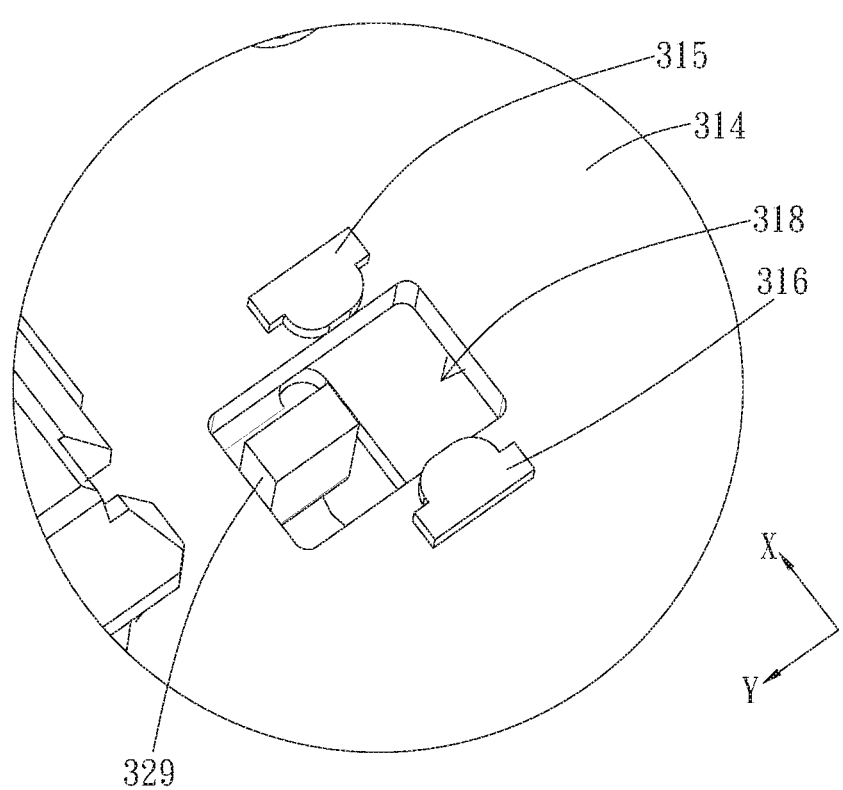

As shown in FIGS. 27A and 27B, the keyboard 1' further includes a switch unit 370 and an indicator 360 (shown in FIG. 19). The indicator 360 is electrically connected to the switch unit 370. The adjusting plate 320 further includes an indicator bar 329 disposed corresponding to the switch unit 370. When the linking mechanism 340 moves, the indicator bar 329 selectively triggers the switch unit 370 to change an indicating status of the indicator 360 to indicate whether the tactile feedback of the keyswitch structures 310 is changed. Specifically, the indicator bar 329 is a bar or rod, which extends from the plate body 322 toward the circuit board 314 and passes the opening 318 of the circuit board 314 from the bottom to protrude upward corresponding to the switch unit 370. In this embodiment, the switch unit 370 can be an optical switch and include an emitter 315 and a receiver 316, which are disposed on the circuit board 314. The circuit board 314 includes a switch circuit. The emitter 315 and the receiver 316 are electrically connected to the switch circuit of the circuit board 314 and located at two sides of the opening 318. The indicator 360 can be a light source and electrically connected to the switch circuit of the circuit board 314. The indicator 360 can change the indicating status in response to the triggering status of the switch unit 370, such as lighting or not lighting. For example, as shown in FIG. 27A, when the linking mechanism 340 drives the adjusting plate 320 to move to the first position relative to the bottom housing 330, e.g. the adjusting plate 320 moving to the right side relative to the bottom housing 330, the indicator bar 329 moves to the light path between the emitter 315 and the receiver 316 to at least partially block or substantially completely block the light signal from the emitter 315 to the receiver 316, and the indicator 360 is at the first indicating status, such as not lighting. As shown in FIG. 27B, when the linking mechanism 340 drives the adjusting plate 320 to move to the second position relative to the bottom housing 330, e.g. the adjusting plate 320 moving to the left side relative to the bottom housing 330, the indicator bar 329 moves away from the light path between the emitter 315 and the receiver 316 without blocking the light signal or less blocking the light signal from the emitter 315 to the receiver 316, and the indicator 360 is at the second indicating status, such as lighting. As such, the user can identify the tactile feedback provided by the keyswitch structures 310 by identifying the indicating status of the indicator 360, but not limited thereto. In another embodiment, the indicator 360 can be a sound-generating device, which provides an audio signal based on whether the switch unit 370 is triggered to notify the user of the current tactile feedback provided by the keyswitch structures 310. It is noted that the switch unit 370 is implemented as an optical switch, but not limited thereto. In another embodiment, the switch unit 370 can be a mechanical switch. When the linking mechanism 340 drives the adjusting plate 320 to move, the indicator bar 329 moves to selectively trigger the mechanical switch, so that the indicator 360 can indicate the current tactile feedback provided by the keyswitch structures 310.

Figure 28A:
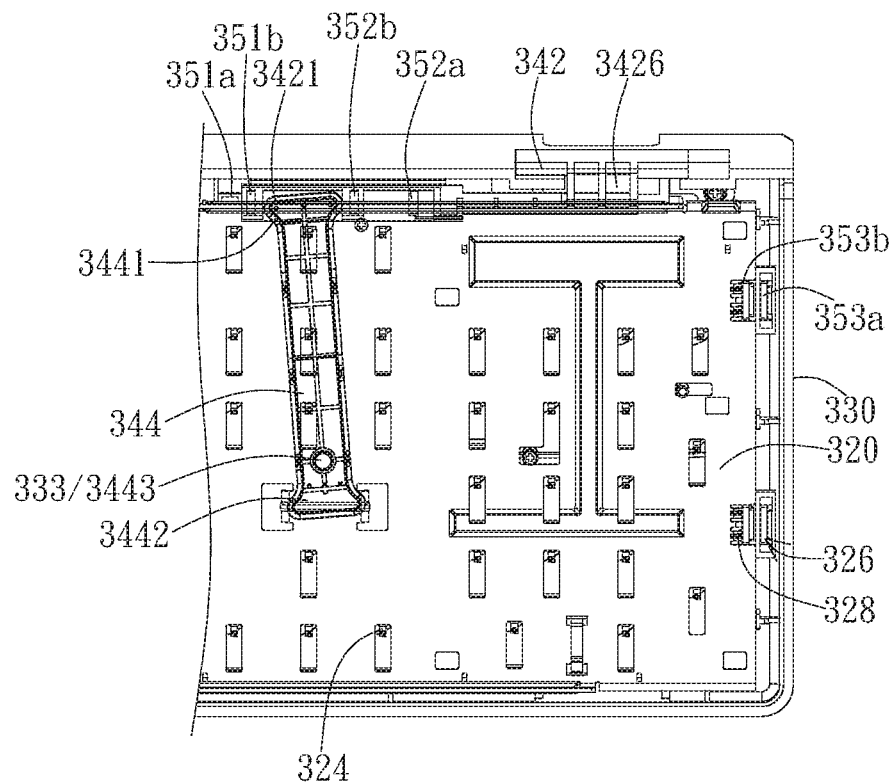
FIGS. 28A and 28B are schematic operation views of the keyboard of the invention.
Figure 28B:
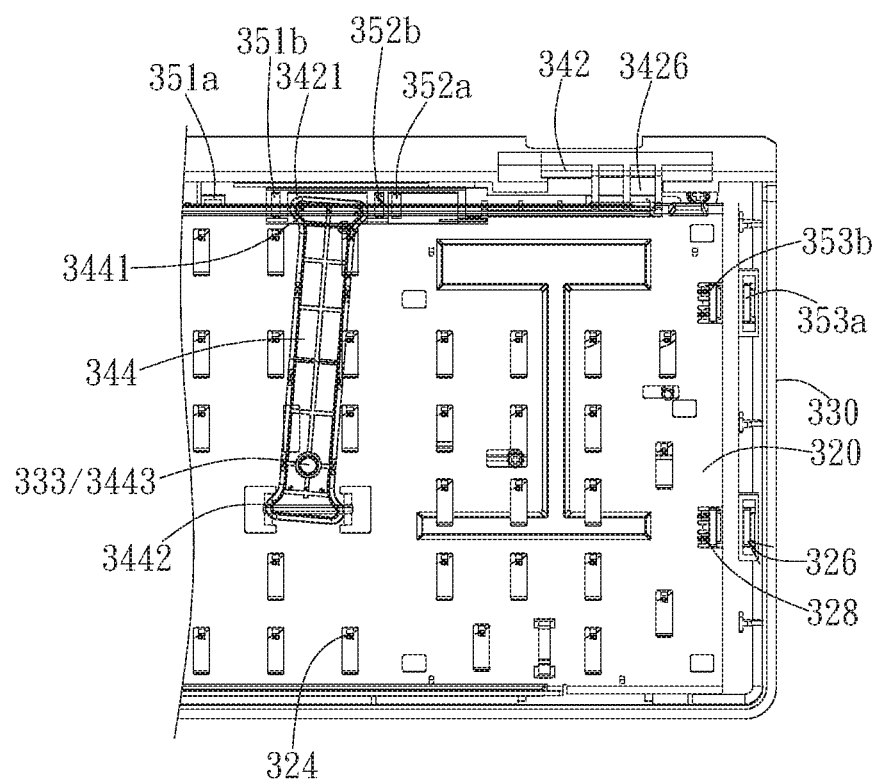

Referring to FIGS. 28A and 28B, the operation of the linking mechanism 340 and the adjusting plate 320 will be described. The keyboard 1' (or the keyswitch module 300) can change the tactile feedback of the keyswitch structures 310 at the same time by controlling the movement of the linking mechanism 340 to drive the adjusting plate 320 to move, so the operation of changing the tactile feedback of the keyswitch structures 310 is convenient and simple. As shown in FIG. 28A, when the linking mechanism 340 and the adjusting plate 320 are located at the first position relative to the bottom housing 330, the adjusting bar 324 is located at a position relative to the extending arm of the tactile feedback member 312 similar to that in FIG. 11B, 12B, or 13B, e.g. the position of FIG. 11B in this embodiment, so the plurality of keyswitch structures 310 provide a first tactile feedback. In this configuration, the adjusting plate 320 is closer to the right side of the bottom housing 330, wherein the magnetic member 353a at the right side of the bottom housing 330 and the magnetic member 353b at the right side of the adjusting plate 320 are close to each other due to attraction force, and the magnetic member 351a of the bottom housing 330 and the magnetic member 351b of the adjusting plate 320 are close to each other due to attraction force, so as to enhance the positioning effect of the adjusting plate 320 at the first position.

As shown in FIG. 28B, when the linking mechanism 340 drives the adjusting plate 320 to move to the second position relative to the bottom housing 330, the adjusting bar 324 is located at a position relative to the extending arm of the tactile feedback member 312 similar to that in FIG. 12B, 13B, or 14B, e.g. the position of FIG. 12B in this embodiment, so the plurality of keyswitch structures 310 provide a tactile feedback different the first tactile feedback. Specifically, when the first linking bar 342 moves along the Y-axis direction to the right side, the first linking bar 342 drives the first end 3441 of the first linking bar 344 rotates clockwise along the Y-axis direction, and the second end 3442 of the second linking bar 344 correspondingly drives the adjusting plate 320 to move in the Y-axis direction toward the left side. As such, the plurality of adjusting bars 324 drive the corresponding extending arms of the tactile feedback members 312 to move along the Y-axis direction toward the left side, e.g. moving in a direction away from the moving path of the cam portion 131, so as to change the tactile feedback provided by the keyswitch structures 310, such as a different pressing force, a dome-collapse-like tactile feedback, or a linear feedback. In this configuration, the adjusting plate 320 is closer to the left side of the bottom housing 330, wherein the magnetic member 353a at the left side of the bottom housing 330 and the magnetic member 353b at the left side of the adjusting plate 320 are close to each other due to attraction force, and the magnetic member 352a of the bottom housing 330 and the magnetic member 352b of the adjusting plate 320 are close to each other due to attraction force, so as to enhance the positioning effect of the adjusting plate 320 at the second position.

Figure 29A:
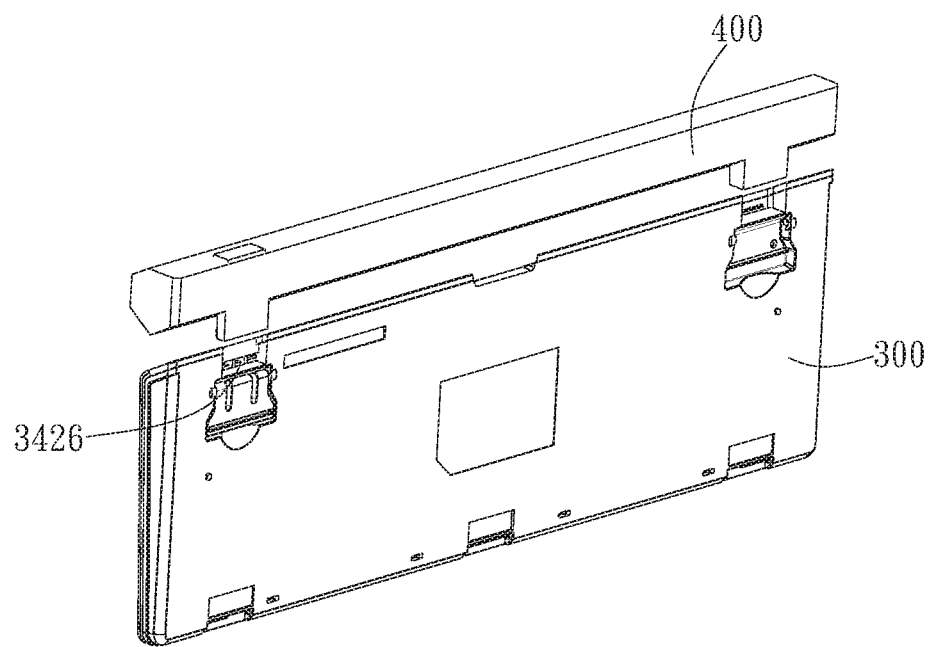
FIGS. 29A and 29B are a schematic view of the auxiliary module and the keyswitch module and a partial enlarged view showing the connection thereof.
Figure 29B:
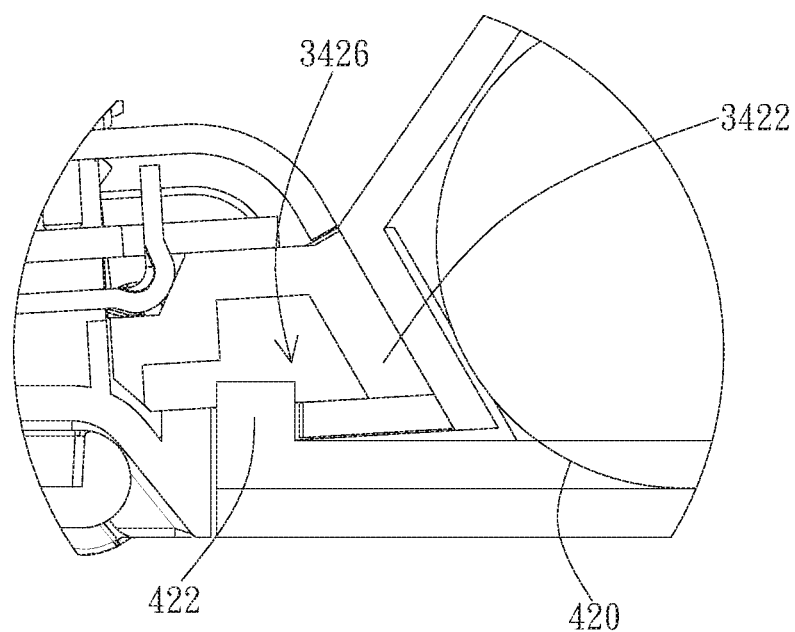
Figure 30:
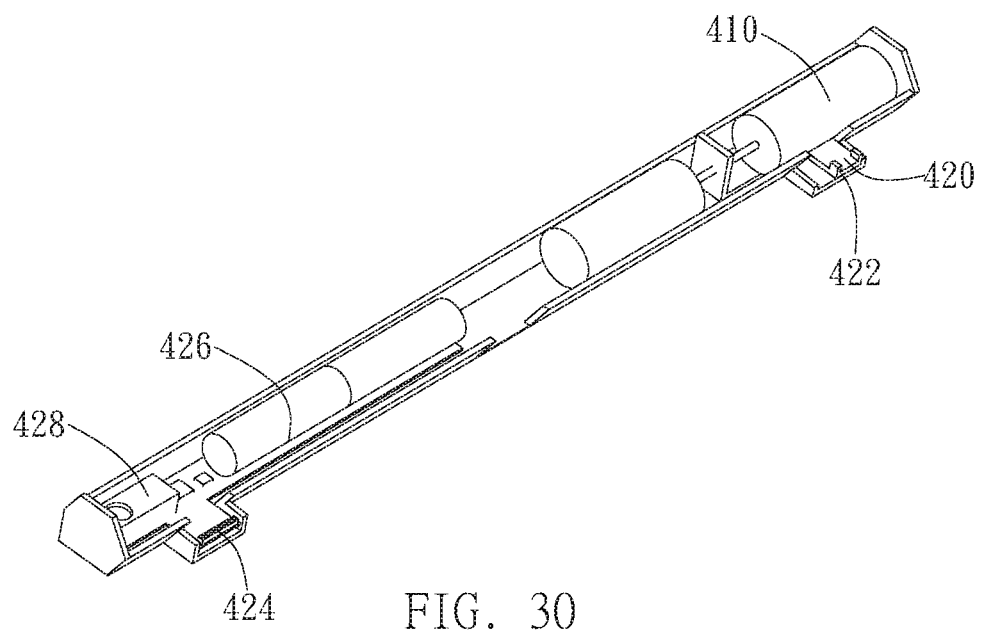
FIG. 30 is a schematic view showing the internal arrangement of the auxiliary module of FIG. 19A.

As shown in FIGS. 29A-29B and FIG. 30, in an embodiment, the auxiliary module 400 includes a driving device 410 and a coupling member 420. The coupling member 420 couples the driving device 410 and the linking mechanism 340. The driving device 410 drives the coupling member 420 to move to drive the linking mechanism 340 to move relative to the bottom housing 330, so that the adjusting plate 320 moves along with the linking mechanism 340, and the adjusting bars 324 drive the tactile feedback members 312 to change tactile feedback of the keyswitch structures 310. Specifically, the driving unit 410 can include a step motor or an electromagnetic driver. When the keyswitch structures 310 are intended to provide more than two kinds of tactile feedback, the driving device 410 is preferably implemented as the step motor. By controlling the step motor with the electrical signal, the moving distance of the coupling portion 420 and the adjusting plate 320 can be controlled, so that the relative position of the adjusting bars 324 and the corresponding extending arms of the tactile feedback members is similar to one of the positions in FIGS. 11B, 12B, 13B, and 14B, to achieve the adjustment of the tactile feedback, such as different required pressing forces, dome-collapse-like tactile feedback, linear feedback. When the keyswitch structures 310 are intended to provide only two kinds of tactile feedback, the driving device 410 can be implemented as the electromagnetic driver. By controlling the electromagnetic driver with the electrical signal, the coupling portion 420 switches between the first position and the second position, so that the relative position of the adjusting bars 324 and the corresponding extending arms of the tactile feedback members is similar to one of any two positions in FIGS. 11B, 12B, 13B, and 14B, to achieve the adjustment between two kinds of tactile feedbacks including different required pressing forces, dome-collapse-like tactile feedback, linear feedback.

As shown in FIGS. 29A and 29B, the coupling portion 420 preferably has a hook portion 422 corresponding to the coupling portion 3426 of the first linking bar 342. When the auxiliary module 400 is connected to the keyswitch module 300, the hook portion 422 extends into the slot of the coupling portion 3426 to couple with the first linking bar 342, but not limited thereto. In another embodiment, the coupling portion 3426 of the first linking bar 324 can have a hook shape, and the coupling portion 420 is a corresponding slot, so the coupling portion 420 can be coupled to the first linking bar 342 by a combination of hook and slot. Moreover, when the auxiliary module 400 and the keyswitch module 300 are combined together, the coupling portion 420 and the first linking bar 342 can be coupled as an integral component in outer appearance. In addition, the auxiliary module 400 and the keyswitch module 300 are preferably electrically connected through pogo pins. As shown in the drawings, the auxiliary module 400 (or the keyswitch module 300) is preferably disposed with pogo pin connector 424 to promote the reliability and convenience of electrical connection of the auxiliary module 400 and the keyswitch module 300. In this embodiment, the pogo pin connector 424 and the coupling portion 420 are preferably disposed on two sides of the auxiliary module 400, but not limited thereto.

Figure 31:
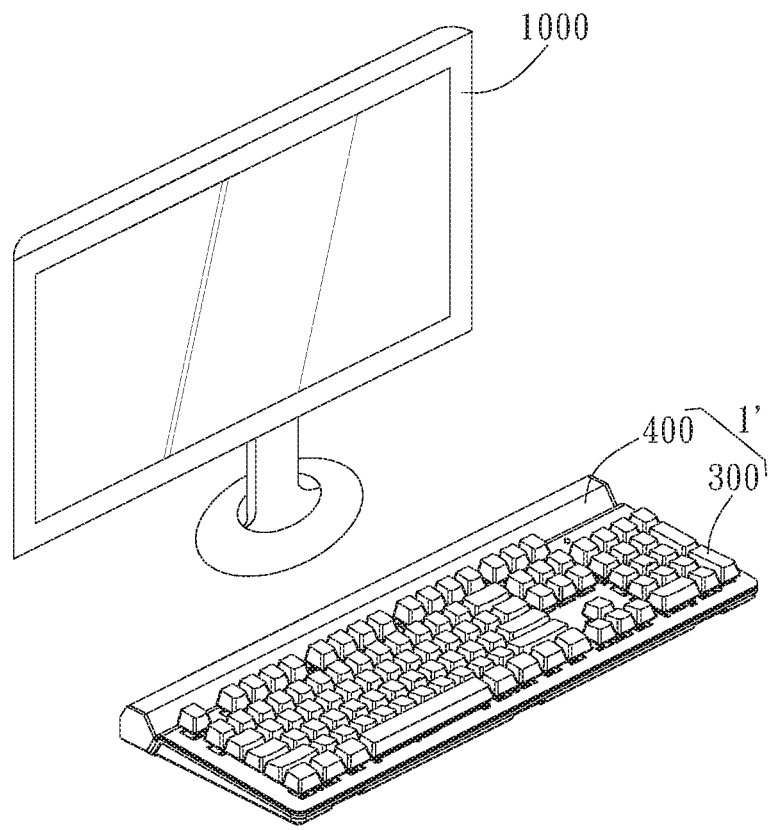
FIG. 31 is a schematic view of the keyboard of FIG. 19B applied to the information processing device.

As shown in FIGS. 30 and 31, the auxiliary module 400 further includes a wireless module 426. The keyswitch module 300 can be wirelessly connected to an information processing device 1000 by the wireless module 426 to promote the functionality of the keyswitch module 300. The wireless module 426 can be a Bluetooth communication module, but not limited thereto. In another embodiment, the keyswitch module 300 can be electrically connected to the information processing device 1000 by the auxiliary module 400 in a wireless manner or a wired manner. The information processing device 100 can be any suitable electronic devices, for example but not limited to, computer, tablet computer. The auxiliary module 400 can further include a speaker 428, and the information processing device 1000 provides an audio signal by the speaker 428 to improve the functionality of the keyswitch module 300. The keyboard 1' of the disclosure can improve the functionality of the keyswitch module 300 by the auxiliary module 400, such as automatically changing the tactile feedback of the keyswitch structures, providing wireless connection with other electronic devices, or providing the audio signal.

In the above embodiments, the first linking bar 342 can be manually controlled by the control member 3422 or automatically controlled by the auxiliary module 400 to move along the Y-axis direction, so that the first linking bar 342 drives the second linking bar 344 to rotate, and the adjusting plate 320 correspondingly moves oppositely in the Y-axis direction to shift the tactile feedback by the adjusting bars 324 and to change the tactile feedback, but not limited thereto. In other embodiments, the keyswitch module 300 can have linking mechanisms of different configurations to move the adjusting plate. Hereinafter, referring to the drawings, the descriptions focus on the details of the movement of the adjusting plate driven by the linking mechanism. The operation of the adjusting plate to drive the adjusting bars and the tactile feedback members to change the tactile feedback can be referred to related descriptions of the above embodiments, and will not be elaborated again.

Figure 32A:
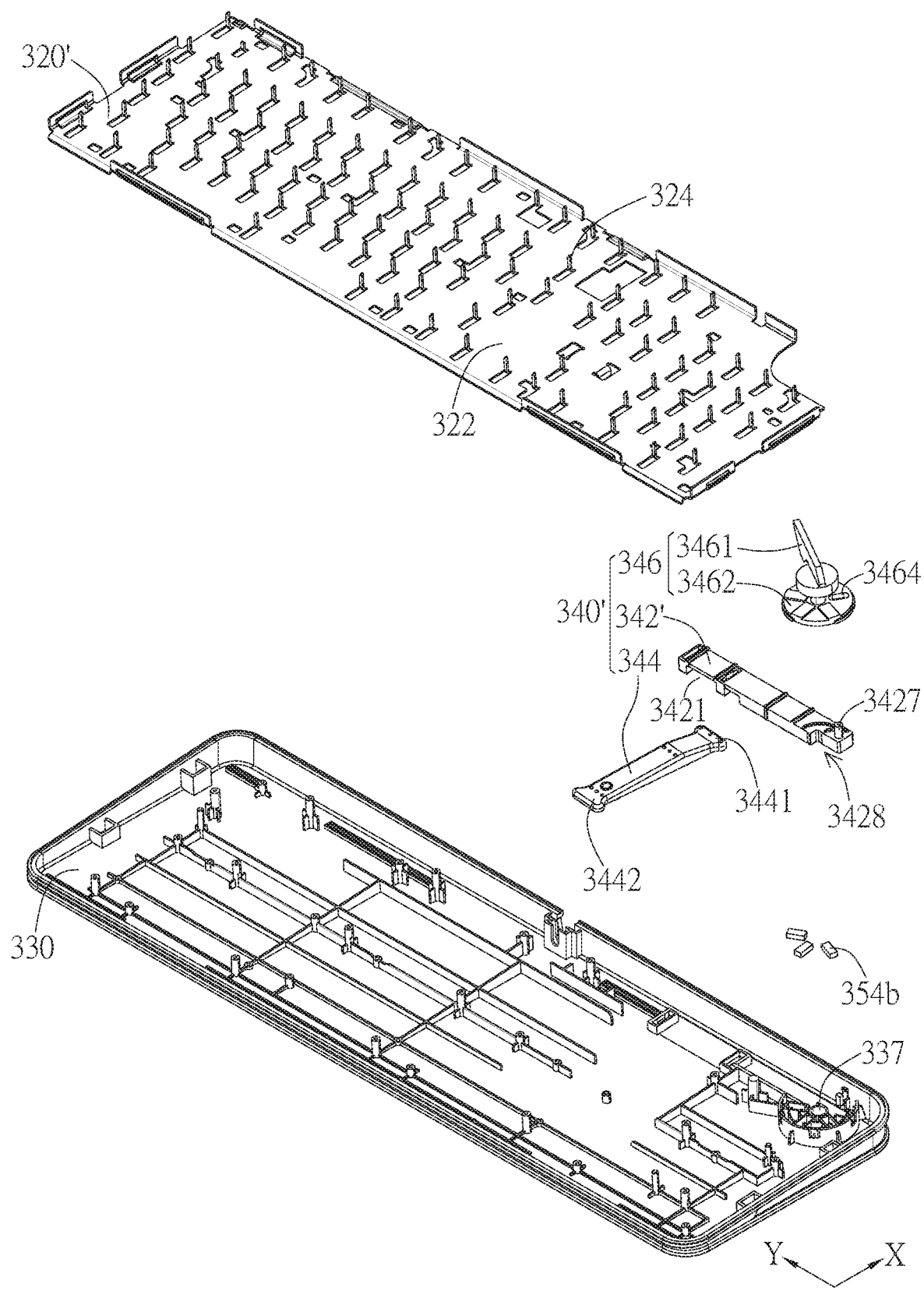
FIGS. 32A to 32C are an exploded view, a partially assembled view, and a partially assembled bottom view of another embodiment of the linking mechanism.
Figure 32B:
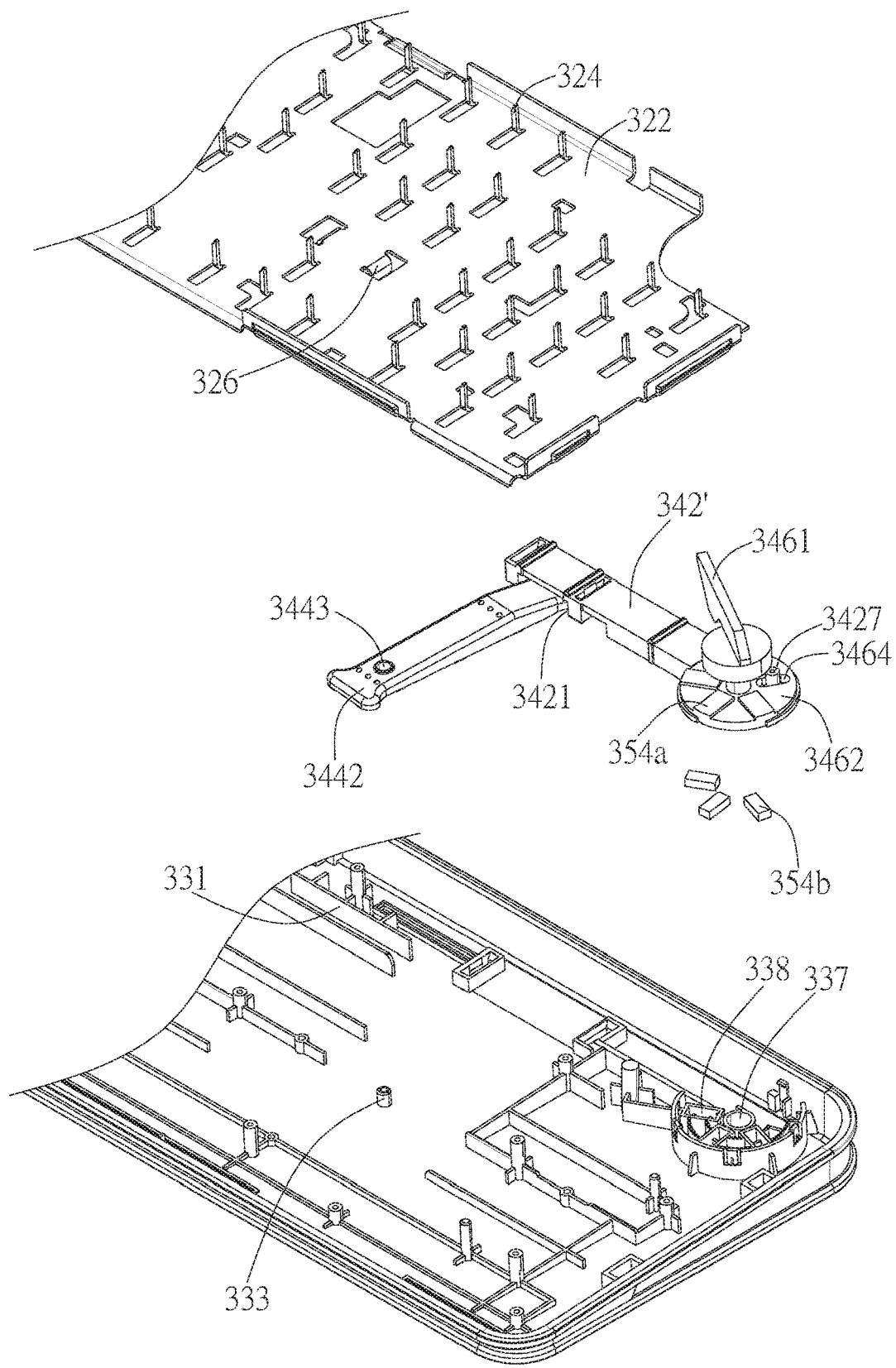
Figure 32C:
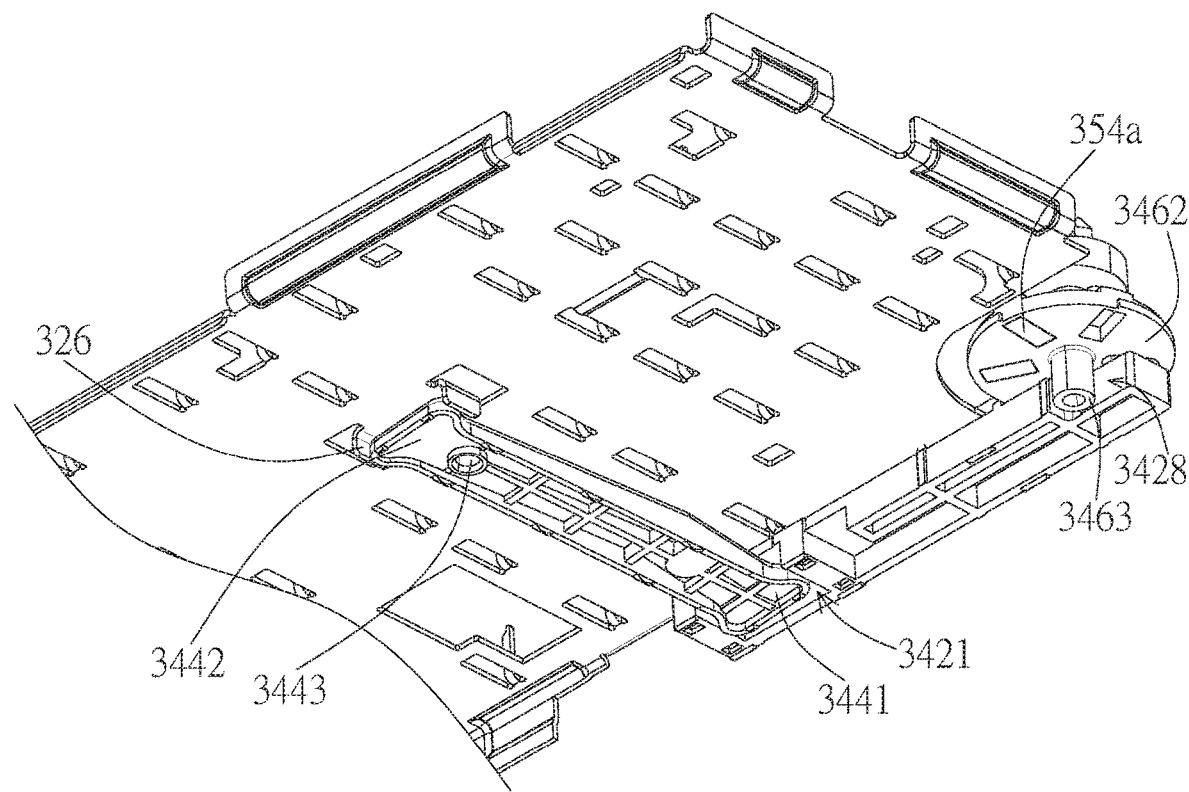

As shown in FIGS. 32A to 32C, in this embodiment, the linking mechanism 340' includes a rotatable unit 346, a first linking bar 342', and a second linking bar 344. The rotatable unit 346 is rotatably disposed on the bottom housing 330 and couples with the first linking bar 342'. The second linking bar 344 is rotatably disposed on the bottom housing 330 with the first end 3411 coupling with the first linking bar 342' and the second end 3442 coupling with the plate body 322. Specifically, the rotatable unit 346 includes a handle 3461 and a rotatable body 3462. The handle 3461 is connected to the rotatable body 3462 and is exposed outside the keyboard to allow the user to operate. For example, the user can apply a force on the handle 3461 to rotate the rotatable body 3462. The rotatable body 3462 has a pivotal portion 3463, and the bottom housing 330 has a pivotal hole 337. When the rotatable unit 346 is disposed on the bottom housing 330, the pivotal portion 3463 couples with the pivotal hole 337 by a pin or a bolt to form a pivot, so the rotatable unit 346 is rotatable relative to the bottom housing 330. Moreover, the first linking bar 342' preferably has a breach 3428 for accommodating the pivotal portion 3463 of the rotatable body 3462. The breach 3428 preferably extends along the moving direction of the first linking bar 342', such as Y-axis direction. When the rotatable unit 346 moves relative to the bottom housing 330, the pivotal portion 3463 moves relative to the breach 3428.

The rotatable body 3462 further has a first coupling portion 3464, and the first linking bar 342' has a second coupling portion 3427. The rotatable body 3462 and the first linking bar 342' form a linking structure by coupling the first coupling portion 3464 with the second coupling portion 3427. For example, the first coupling portion 3464 is preferably a hole, and the second coupling portion 3427 is a corresponding rod. By inserting the rod into the hole, the first linking bar 342' is driven to move linearly when the rotatable body 3462 rotates, but not limited thereto. In another embodiment, the first coupling portion 3464 can be a rod, and the second coupling portion 3427 is a corresponding hole. The second coupling portion 3427 is preferably disposed adjacent to the breach 3428. When the rotatable unit 346 is disposed on the bottom housing 330, the first linking bar 342' is partially sandwiched between the rotatable body 3462 and the bottom housing 330, and the first coupling portion 3464 couples with the second coupling portion 3427.

The keyboard further includes a set of magnetic members, such as 354a, 354b, disposed corresponding to the rotatable unit 346 and the bottom housing 330. When the rotatable unit 346 rotates, the set of magnetic members 345a, 354b are selectively close to or away from each other to position the rotatable unit 346. For example, the magnetic member 354a can be disposed on the bottom of the rotatable body 3462, and the bottom housing 330 has a plurality of slots 338 for receiving multiple magnetic members 354b, which are disposed along the rotation direction of the rotatable body 3462. When the rotatable unit 346 rotates from the first position to the second position, the magnetic member 354a can move away from one of the multiple magnetic members 354b and move closer to another one of the multiple magnetic members 354b, so that the rotatable unit 346 can be positioned by the attraction force between the magnetic members 354a and 354b. The set of magnetic members 354a and 354b can be implemented as magnets, or a combination of magnet and magnetic material.

The connection and structural details of the first linking bar 342', the second linking bar 344, and the bottom housing 330 can be referred to the related descriptions of the above embodiments, such as those related to FIGS. 20A and 20B. For example, the bottom housing 330 preferably has a positioning portion 331, which is configured to position the first linking bar 342'. The first linking bar 342' has an accommodation portion 3421. The accommodation portion 3421 and the second coupling portion 3427 are preferably disposed on two opposite ends along the moving direction of the first linking bar 342'. The first end 3441 of the second linking bar 344 is accommodated in the accommodation portion 3421. The bottom housing 330 has a pivotal portion 333, and the second linking bar 344 has a pivotal hole 3443 near the second end 3442. When the second linking bar 344 is disposed on the bottom housing 330, the first end 3441 of the second linking bar 344 extends into the accommodation potion 3421, and the pivotal portion 333 couples with the pivotal hole 3443 at the second end 3442 of the second linking bar 344 by a pin or a bolt to form a pivot, so that the second linking bar 344 is rotatable relative to the bottom housing 330. The plate body 322 of the adjusting plate 320' preferably has a coupling portion 326, which is configured to couple with the second end 3442 of the second linking bar 344. As such, when the first linking bar 342' moves along the Y-axis direction, the first linking bar 342' drives the first end 3441 of the second linking bar 344 to rotate in the same direction along the Y-axis direction, and the second end 3442 of the second linking bar 344 correspondingly moves oppositely in the Y-axis direction, so that the adjusting bars 324 drive the corresponding tactile feedback members 312 to change the tactile feedback.

Figure 33A:
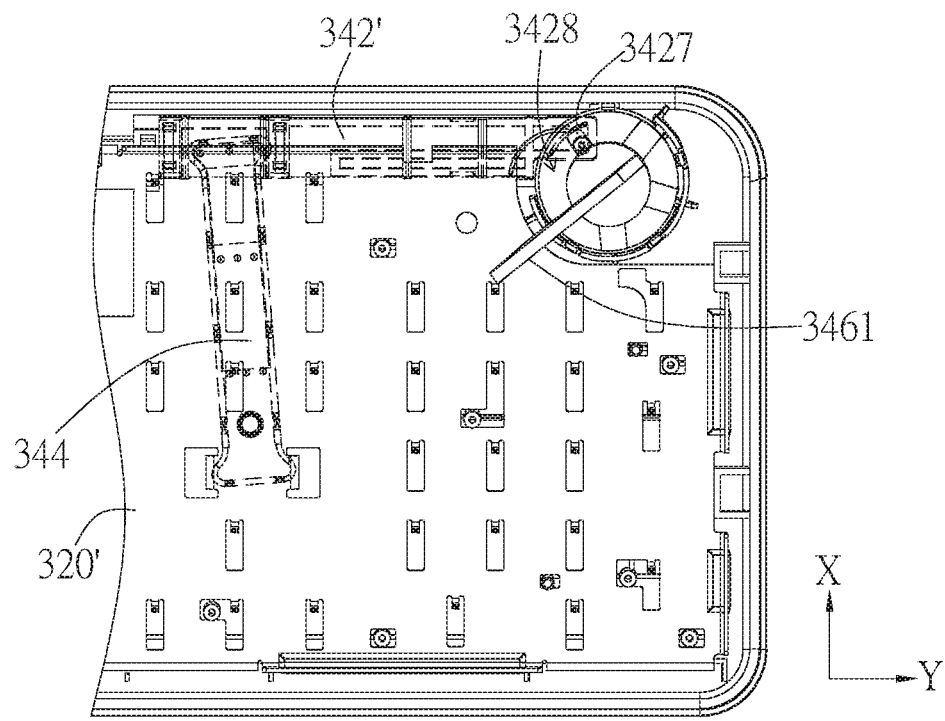
FIGS. 33A and 33B are schematic operation views of another embodiment of the keyboard.
Figure 33B:
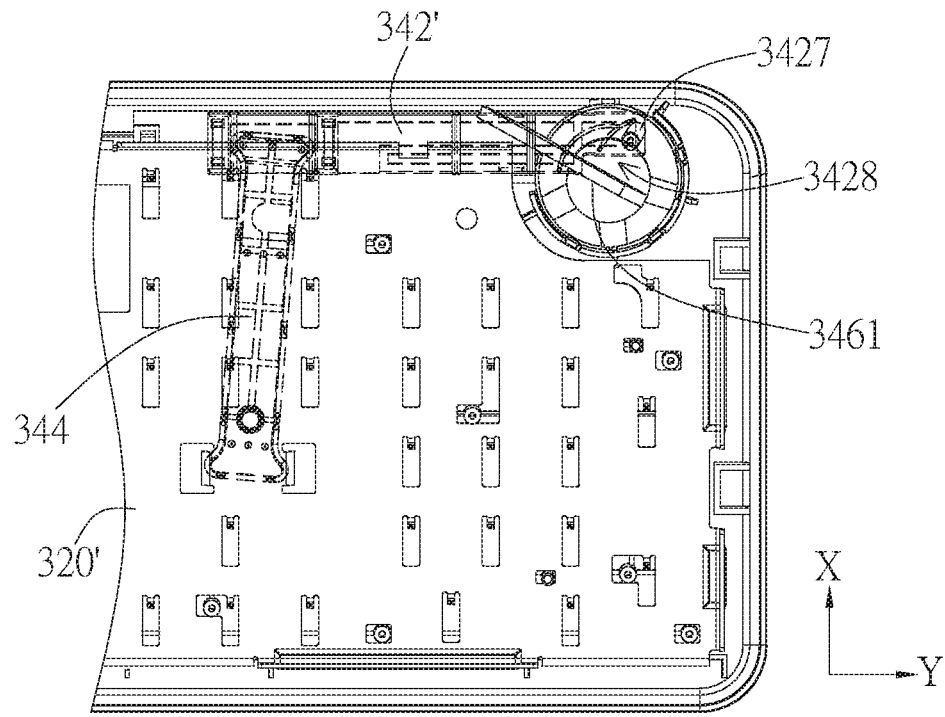

Referring to FIGS. 33A and 33B, the operation of the linking mechanism 340' and the adjusting plate 320' will be described. The keyboard (or the keyswitch module) can change the tactile feedback of the keyswitch structures 310 at the same time by controlling the movement of the linking mechanism 340' to drive the adjusting plate 320' to move, so the operation of changing the tactile feedback of the keyswitch structures 310 is convenient and simple. As shown in FIG. 33A, when the linking mechanism 340' and the adjusting plate 320' are located at the first position relative to the bottom housing 330, the adjusting bar 324 is located at a position relative to the extending arm of the tactile feedback member 312 similar to that in FIG. 11B, 12B, or 13B, e.g. the position of FIG. 11B in this embodiment, so the plurality of keyswitch structures 310 provide a first tactile feedback. In this configuration, the pivotal portion 3462 is located near the right side of the breach 3428 (i.e. near outer side), the adjusting plate 320' is closer to the right side of the bottom housing 330, and the positioning effect of the rotatable unit 346 at the first position is enhanced by the attraction force between the magnetic members 354a and 354b. Moreover, similar to the above embodiments, the magnetic member (e.g. 353a) at the right side of the bottom housing 330 and the magnetic member (e.g. 353b) at the right side of the adjusting plate 320' are close to each other due to attraction force, and the magnetic member (e.g. 351a) of the bottom housing 330 and the magnetic member (e.g. 351b) of the adjusting plate 320' are close to each other due to attraction force, so as to enhance the positioning effect of the adjusting plate 320' at the first position.

As shown in FIG. 33B, when the linking mechanism 340' drives the adjusting plate 320' to move to the second position relative to the bottom housing 330, the adjusting bar 324 is located at a position relative to the extending arm of the tactile feedback member 312 similar to that in FIG. 12B, 13B, or 14B, e.g. the position of FIG. 12B in this embodiment, so the plurality of keyswitch structures 310 provide a tactile feedback different the first tactile feedback. Specifically, when a force is applied to the handle 3461 to enable the rotatable body 3462 to rotate clockwise relative to the bottom housing 330, the rotatable body 3462 drives the first linking bar 342' to move along the Y-axis direction to the right side, the first linking bar 342' drives the first end 3441 of the first linking bar 344 rotates clockwise along the Y-axis direction, and the second end 3442 of the second linking bar 344 correspondingly drives the adjusting plate 320' to move in the Y-axis direction toward the left side. As such, the plurality of adjusting bars 324 drive the corresponding extending arms of the tactile feedback members 312 to move along the Y-axis direction toward the left side, e.g. moving in a direction away from the moving path of the cam portion 131, so as to change the tactile feedback provided by the keyswitch structures 310, such as a different pressing force, a dome-collapse-like tactile feedback, or a linear feedback. In this configuration, the pivotal portion 3463 is located near the left side (i.e. the inner side) of the breach 3428, the adjusting plate 320' is closer to the left side of the bottom housing 330, and the positioning of the rotatable unit 346 at the second position can be enhanced by the attraction force between the magnetic member 354a and another magnetic member 354b. Moreover, similar to the above embodiments, the magnetic member (e.g. 353a) at the left side of the bottom housing 330 and the magnetic member (e.g. 353b) at the left side of the adjusting plate 320' are close to each other due to attraction force, and the magnetic member (e.g. 352a) of the bottom housing 330 and the magnetic member (e.g. 352b) of the adjusting plate 320' are close to each other due to attraction force, so as to enhance the positioning effect of the adjusting plate 320' at the second position.

Figure 34A:
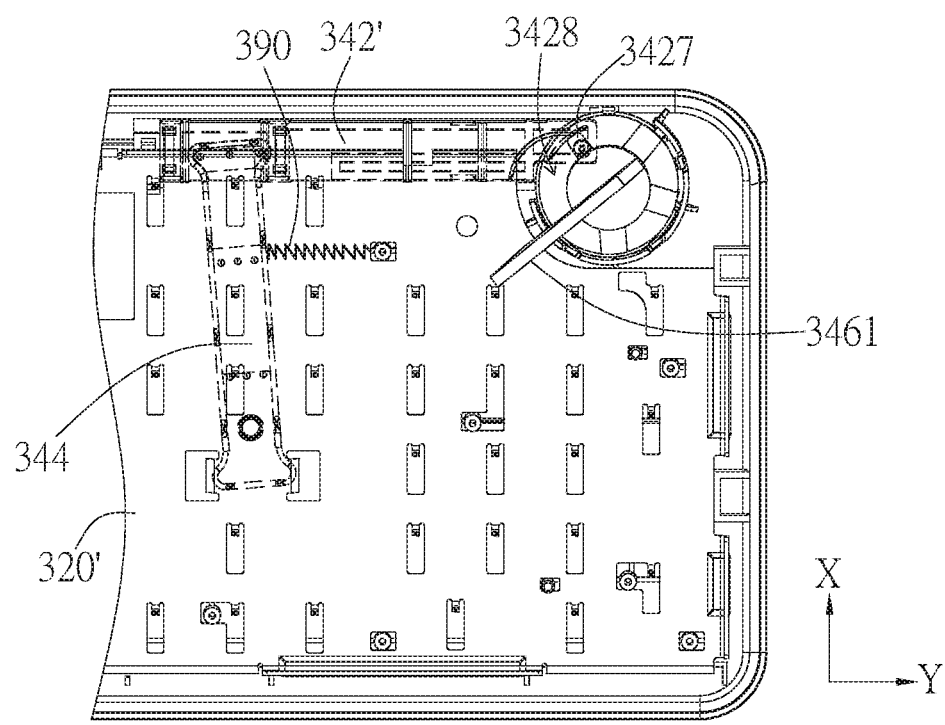
FIGS. 34A and 34B are schematic operation views of yet another embodiment of the keyboard.
Figure 34B:
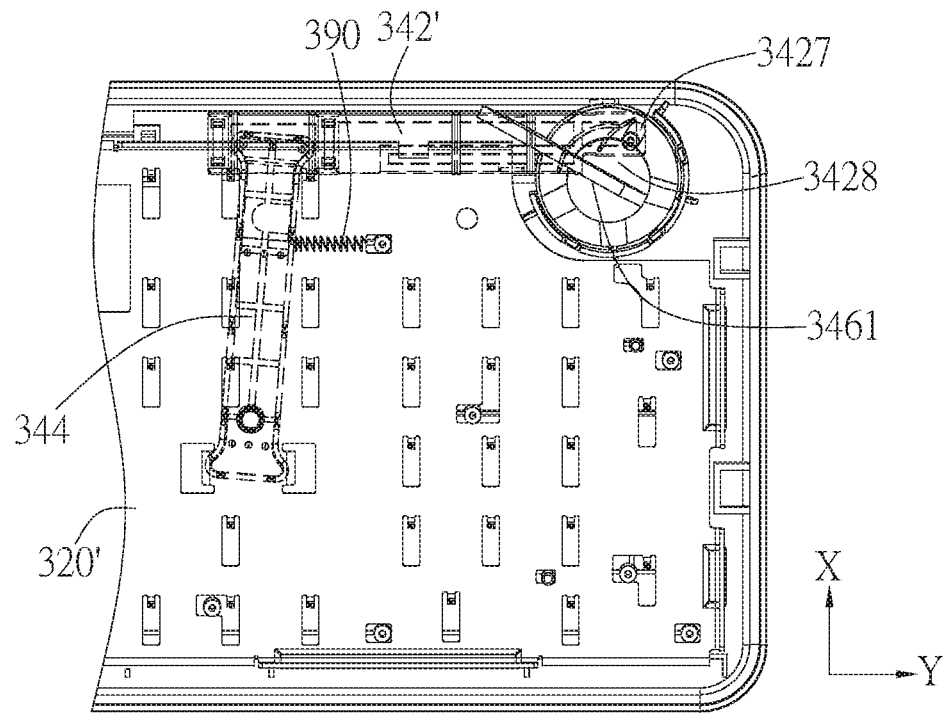

In another embodiment, as shown in FIGS. 34A and 34B, the keyboard further includes a resilient member 390 connected to the second linking bar 344 and the bottom housing 330 to balance the operation force. In an embodiment, the resilient member 390 is implemented as a spring with two ends connected to the second linking bar 344 and the bottom housing 330, respectively. Specifically, as shown in FIG. 34A, when the linking mechanism 340' and the adjusting plate 320' are located at the first position relative to the bottom housing 330, the pivotal portion 3462 is located near the right side of the breach 3428 (i.e. near the outer side), and the resilient member 390 is pulled to have a restoring force. As shown in FIG. 34B, when the force s applied to the handle 3461 to enable the rotatable body 3462 to rotate clockwise relative to the bottom housing 330, the resilient member 390 provides the restoring force to increase the balance of force during operation. For the operation feeling of the rotatable unit 346, when the rotatable unit 346 is switched between different positions such as the first position in FIG. 34A and the second position in FIG. 34B, the clockwise or counterclockwise rotation of the rotatable unit 346 is operated against or releases the restoring force of the resilient member 390. For example, in the clockwise rotation from the first position to the second position, the rotatable unit 346 is operated to release the restoring force of the resilient member 390. In the counterclockwise rotation from the second position to the first position, the rotatable unit 346 is operated against the restoring force of the resilient member 390. The operation feeling of switching the rotatable unit 346 between different positions corresponds to the positioning of the adjusting plate 320' at different positions and different tactile feedbacks.

In another embodiment, as shown in FIGS. 35A to 36B, the linking mechanism 340" includes a rotatable unit 347 and a coupling unit 348. The rotatable unit 347 is rotatable about a rotation axis C and has a slot 380 having a first end 381 and a second end 382. The coupling unit 348 couples the rotatable unit 347 and the adjusting plate 320". A distance between the first end 381 and the rotation axis C is different from a distance between the second end 382 and the rotation axis C. Specifically, the rotatable unit 347 includes a handle 3471 and a rotatable body 3472. The handle 3471 is connected to the rotatable body 3472 and is exposed outside the keyboard to allow the user to operate. For example, the user can apply a force on the handle 3471 to rotate the rotatable body 3472. The slot 380 is preferably disposed on the rotatable body 3472 and shifted relative to the rotation axis C. For example, the slot 380 can be a arch-shaped slot, and the center of a circle from which the slot 380 is formed does not overlap with the rotation axis C, so that the distance between the first end 381 and the rotation axis C is different from the distance between the second end 382 and the rotation axis C. For example, in the embodiment, the distance between the first end 381 and the rotation axis C is smaller than the distance between the second end 382 and the rotation axis C. In this embodiment, the slot 380 preferably extends across the moving direction of the adjusting plate 320", so that the difference of the distance between the first end 381 and the rotation axis C and the distance between the second end 382 and the rotation axis C is proportional to the moving distance of the adjusting plate 320".

The coupling unit 348 has a protrusion 3482, and the adjusting plate 320" has a corresponding hole 325. The handle 3471 and the rotatable body 3472 are located at two opposite sides with respect to the adjusting plate 320" and connected to each other running through the opening 321 of the plate body 322. As such, the coupling unit 348 is located between the handle 3471 and the adjusting plate 320" in a manner that the protrusion 348 extends through the hole 325 into the slot 380. When the rotatable unit 347 rotates relative to the bottom housing 330, the slot 380 rotates relative to the protrusion 325 to position the protrusion 325 near the first end 381 or the second end 382, so that the adjusting plate 320" is driven to move correspondingly.

The keyboard further includes a first magnetic member 355a and a second magnetic member disposed on the bottom housing 330. The rotatable unit 347 has a magnetic portion 355c. When rotatable unit 347 rotates, the magnetic portion 355c is selectively close to the first magnetic member 355a or the second magnetic member 355b. Specifically, the bottom housing 330 has multiple slots 338, which are configured to accommodate the first magnetic member 355a and the second magnetic member 355b, respectively. The first magnetic member 355a and the second magnetic member 355b are preferably disposed along the rotation direction of the rotatable body 3472. When the rotatable unit 347 rotates from the first position to the second position, the magnetic portion 355a moves away from the first magnetic member 355a and approaches close to the second magnetic member 355b, so that the positioning of the rotatable unit 347 at the second position is enhanced by the attraction force between the magnetic portion 355c and the second magnetic member 355b. Similarly, when the rotatable unit 347 rotates from the second position to the first position, the magnetic portion 355a moves away from the second magnetic member 355b and approaches close to the first magnetic member 355a, so that the positioning of the rotatable unit 347 at the first position is enhanced by the attraction force between the magnetic portion 355c and the first magnetic member 355a. The first magnetic member 355a (or the second magnetic member 355*b*) and the magnetic portion 355*c* can be implemented as magnets, or a combination of magnet and magnetic material.

Figure 37A:
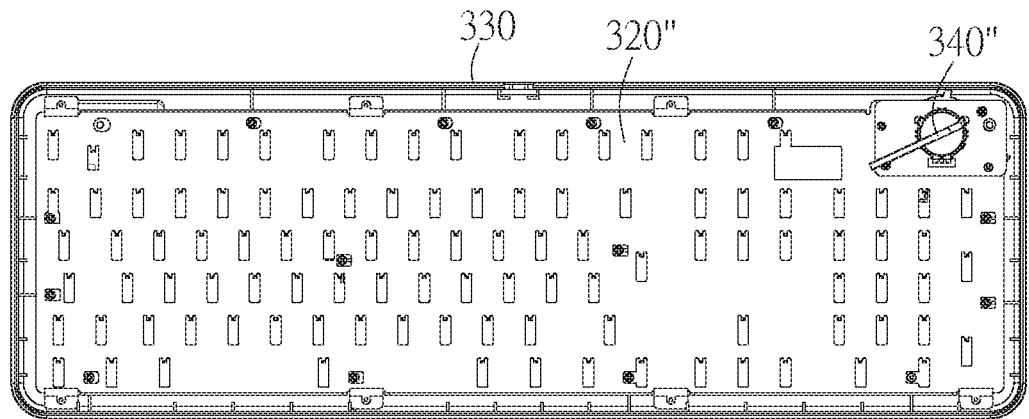
FIGS. 37A and 38A are plane views of the adjusting plate of FIG. 35A at different positions.
Figure 37B:
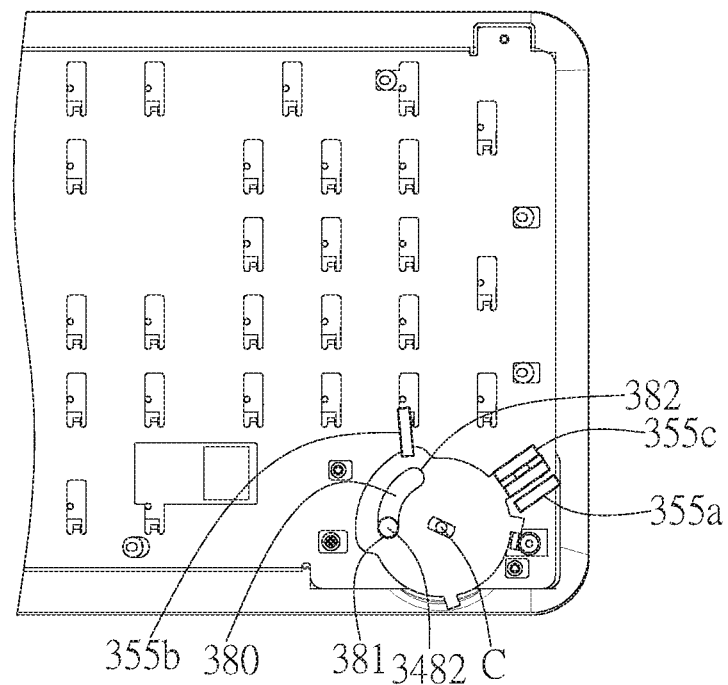
FIGS. 37B and 38B are bottom plane views of the adjusting plate of FIG. 35A at different positions without showing the bottom housing.

Referring to FIG. 37A to 38B, the operation of the linking mechanism 340" and the adjusting plate 320" will be described. The keyboard (or the keyswitch module) can change the tactile feedback of the keyswitch structures 310 at the same time by controlling the movement of the linking mechanism 340" to drive the adjusting plate 320" to move, so the operation of changing the tactile feedback of the keyswitch structures 310 is convenient and simple. As shown in FIGS. 37A and 37B, when the linking mechanism 340" and the adjusting plate 320" are located at the first position relative to the bottom housing 330, the adjusting bar 324 is located at a position relative to the extending arm of the tactile feedback member 312 similar to that in FIG. 11B, 12B, or 13B, e.g. the position of FIG. 11B in this embodiment, so the plurality of keyswitch structures 310 provide a first tactile feedback. In this configuration, the protrusion 3482 is located at the first end 381 of the slot 380, the adjusting plate 320" is closer to the right side of the bottom housing 330, and the positioning of the rotatable unit 347 at the first position is enhanced by the attraction force between the magnetic portion 355*c* and the first magnetic members 355*a*. Moreover, similar to the above embodiments, the magnetic member (e.g. 353*a*) at the right side of the bottom housing 330 and the magnetic member (e.g. 353*b*) at the right side of the adjusting plate 320" are close to each other due to attraction force, so as to enhance the positioning effect of the adjusting plate 320" at the first position.

Figure 38A:
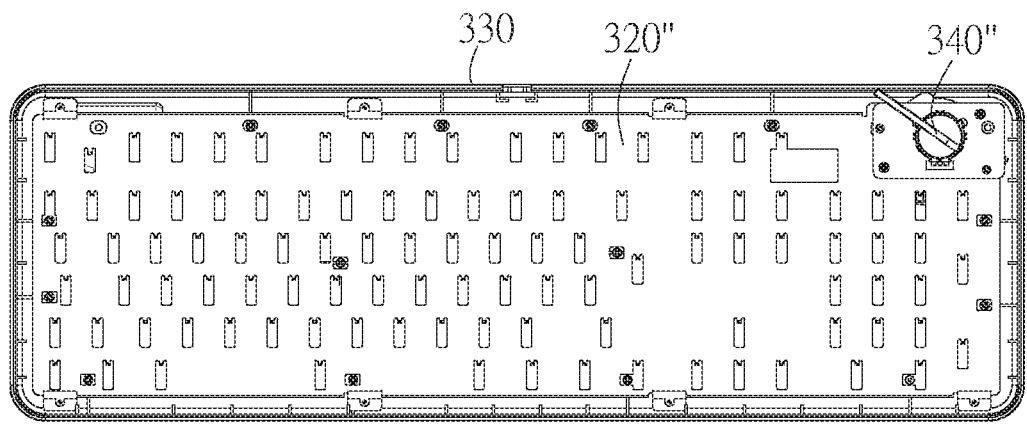
Figure 38B:
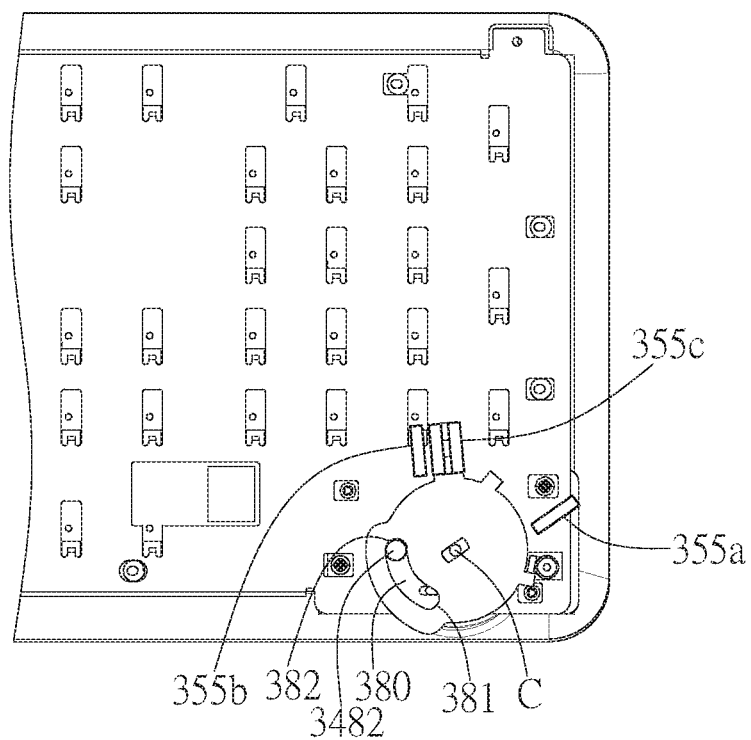

As shown in FIGS. 38A and 38B, when the linking mechanism 340" drives the adjusting plate 320" to move to the second position relative to the bottom housing 330, the adjusting bar 324 is located at a position relative to the extending arm of the tactile feedback member 312 similar to that in FIG. 12B, 13B, or 14B, e.g. the position of FIG. 12B in this embodiment, so the plurality of keyswitch structures 310 provide a tactile feedback different the first tactile feedback. Specifically, when a force is applied to the handle 3471 to enable the rotatable body 3472 to rotate clockwise relative to the bottom housing 330, the slot 380 rotates relative to the protrusion 325 to position the protrusion 325 at the second end 382. Since the slot 380 is disposed off the rotation center C, the rotatable body 3472 drives the adjusting plate 320" to move in the Y-axis direction toward the left side. As such, the plurality of adjusting bars 324 drive the corresponding extending arms of the tactile feedback members 312 to move along the Y-axis direction toward the left side, e.g. moving in a direction away from the moving path of the cam portion 131, so as to change the tactile feedback provided by the keyswitch structures 310, such as a different pressing force, a dome-collapse-like tactile feedback, or a linear feedback. In this configuration, the adjusting plate 320" is closer to the left side of the bottom housing 330, and the positioning of the rotatable unit 347 at the second position can be enhanced by the attraction force between the magnetic portion 355*c* and the second magnetic member 355*b*. Moreover, similar to the above embodiments, the magnetic member (e.g. 353*a*) at the right side of the bottom housing 330 and the magnetic member (e.g. 353*b*) at the right side of the adjusting plate 320" are away from each other, and the magnetic member (e.g. 353*a*) at the left side of the bottom housing 330 and the magnetic member (e.g. 353*b*) at the left side of the adjusting plate 320" are close to each other due to attraction force, so as to enhance the positioning effect of the adjusting plate 320" at the second position.

Figure 35A:
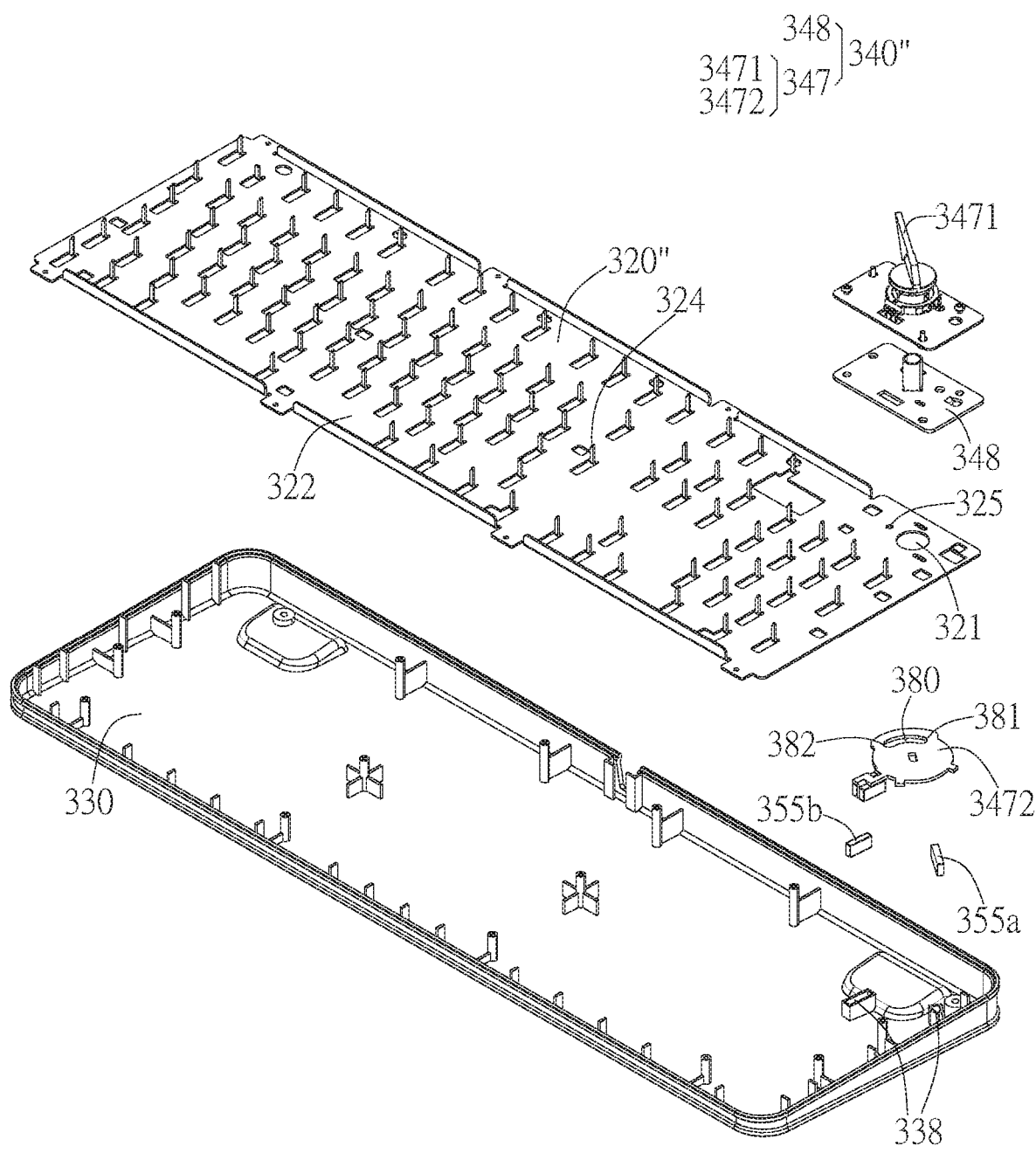
FIGS. 35A and 35B are an exploded view and an exploded bottom view of another embodiment of the linking mechanism.
Figure 35B:
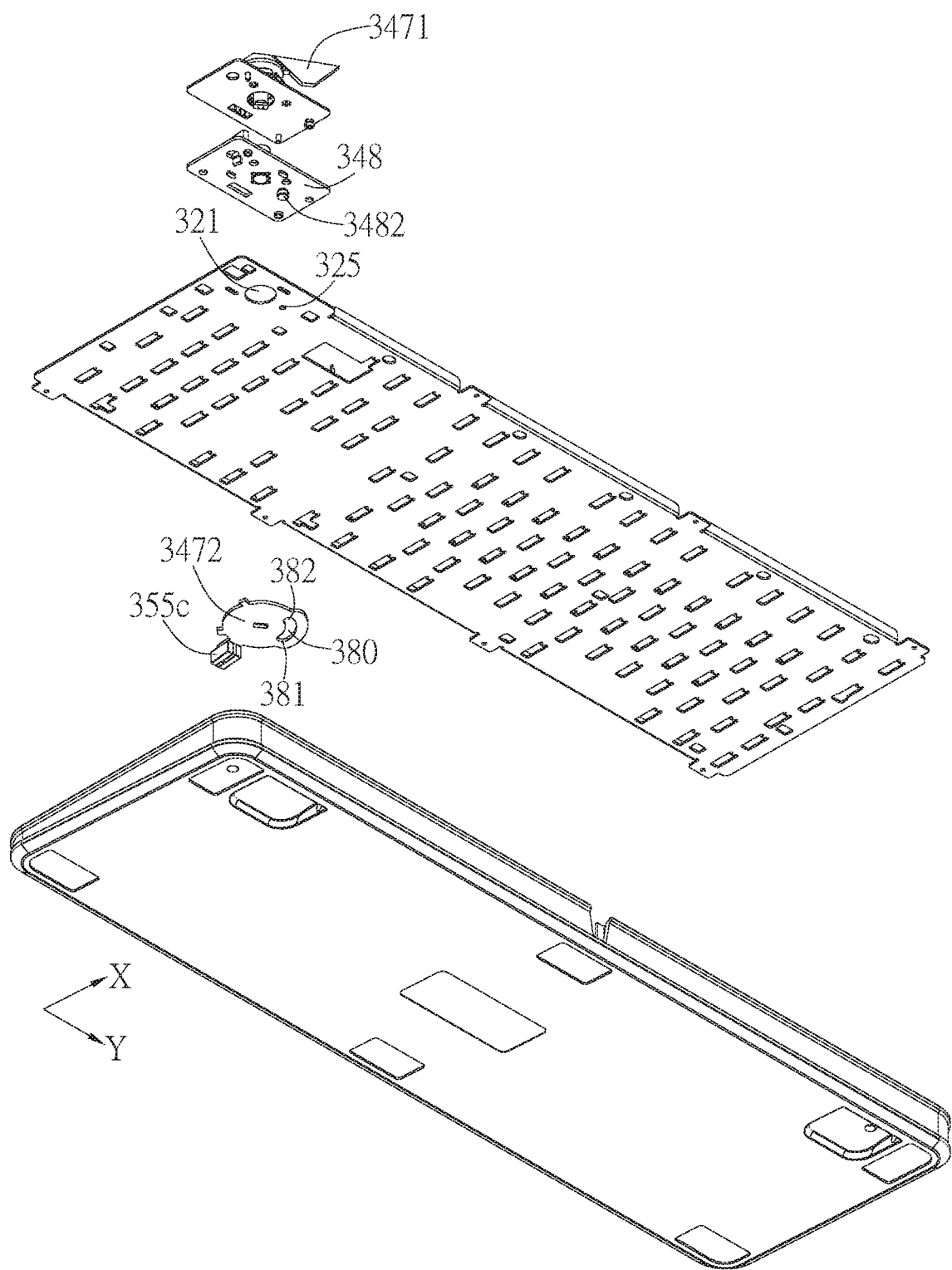
Figure 36A:
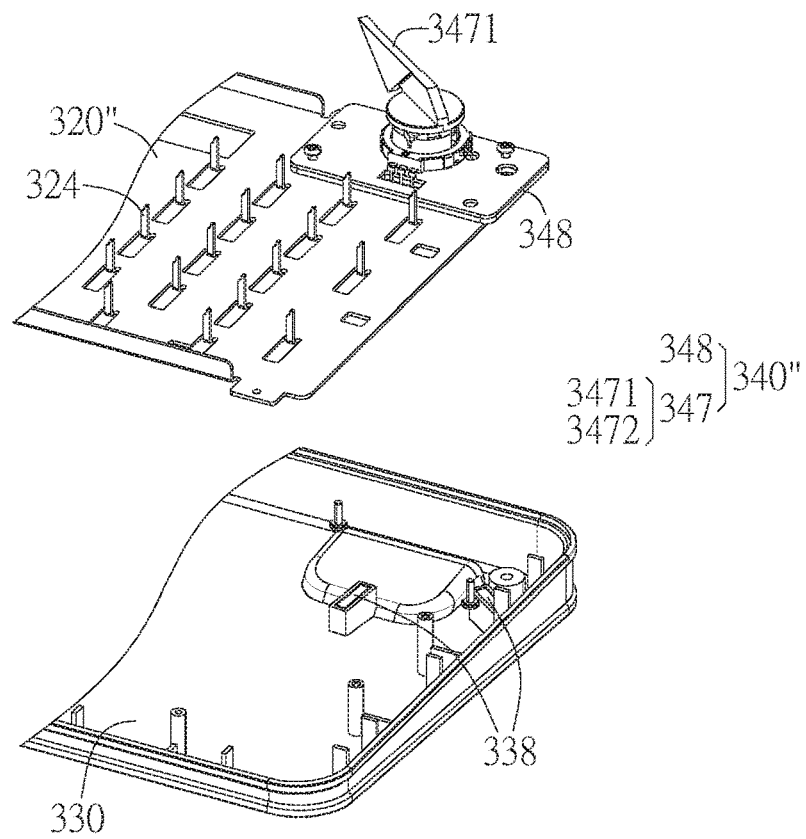
FIGS. 36A and 36B are a partially assembled view and a partially assembled bottom view of FIG. 35A.
Figure 36B:
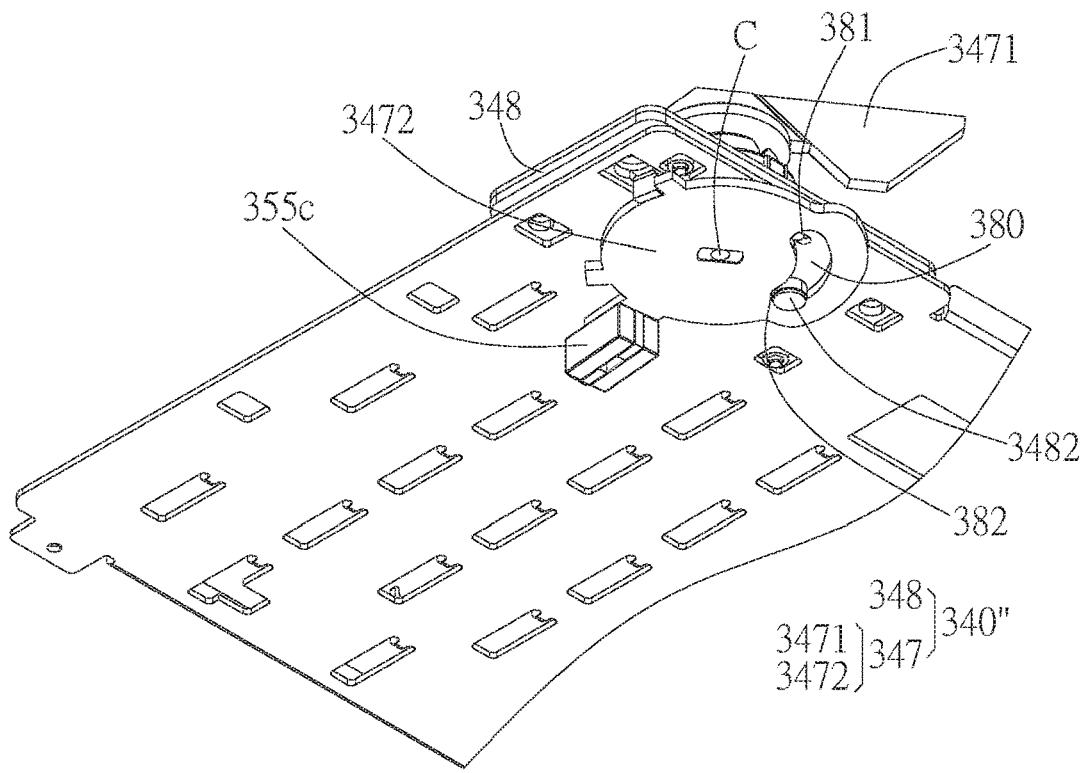

In the embodiment of FIG. 35A, the coupling unit 348 is illustrated to couple the adjusting plate 320" and the rotation unit 347, but not limited thereto. In another embodiment (not shown), the protrusion 3482 can be integrated to the adjusting plate 320" to eliminate the disposition of the coupling unit 348. Specifically, the adjusting plate 320" has the protrusion 3482, and the protrusion 3428 and the adjusting bar 324 protrude from the plate body 322 toward two opposite sides. When the rotatable unit 347 rotates relative to the bottom housing 330, the slot 380 rotates relative to the protrusion 3482, so the protrusion 3482 is located in the slot 380 near the first end 381 or the second end 382 to drive the adjusting plate 320" to move. In the above embodiments that the adjusting plate is driven by rotation of the linking member, the user can operate with merely two or three fingers, and the handle, e.g. 3461 or 3471, provides a function of force arm, so that the user can operate with less force and more convenience.

Figure 39A:
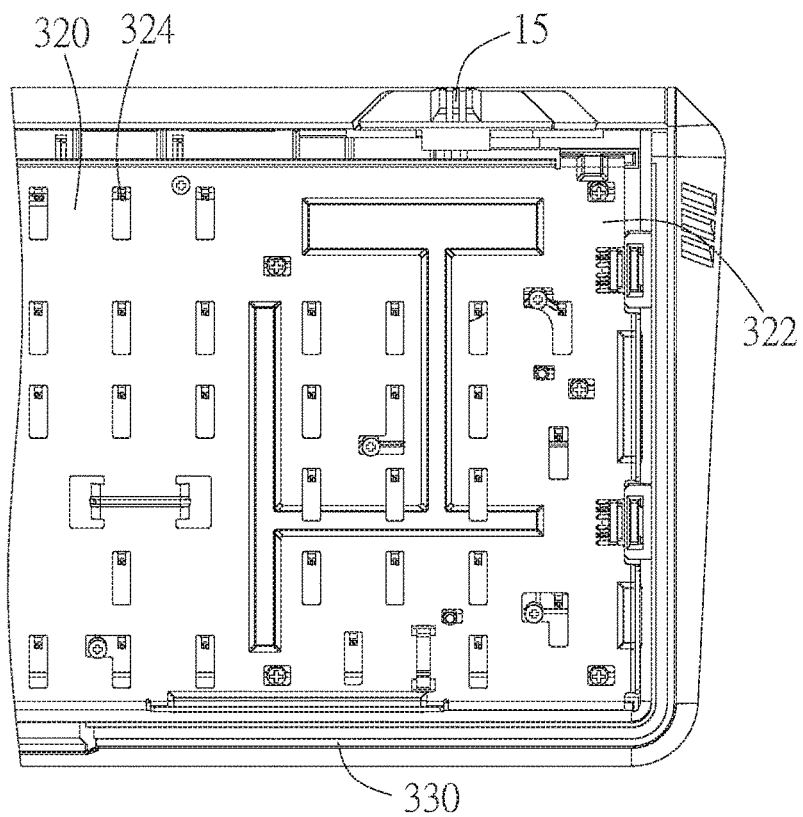
FIGS. 39A and 39B are schematic operation views of another embodiment of the keyboard.
Figure 39B:
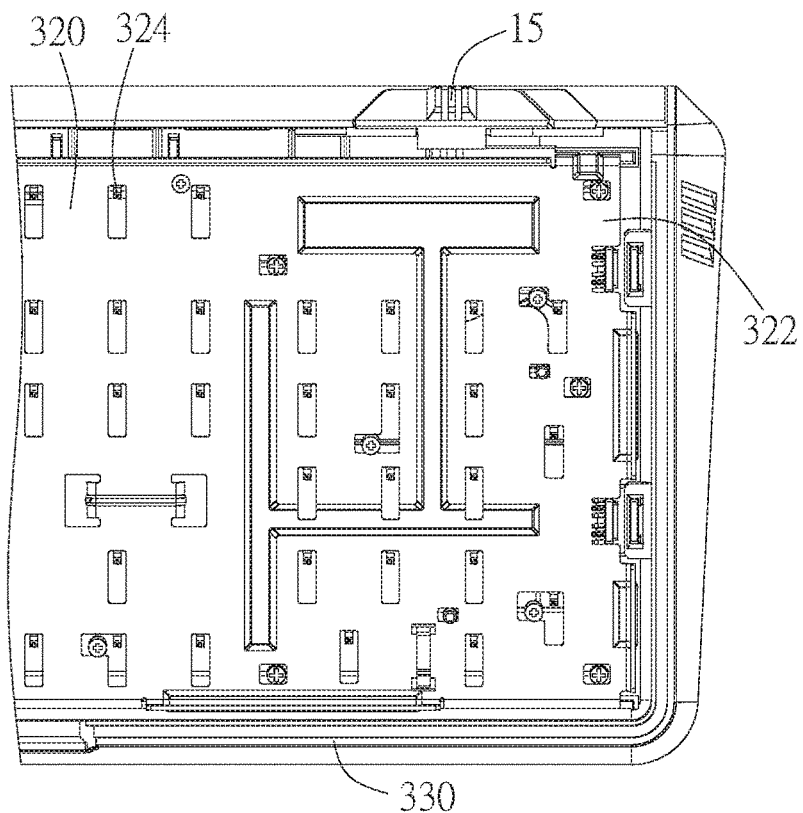

In another embodiment, as shown in FIGS. 39A and 39B, the adjusting plate 320 can be directly move without using the linking mechanism, to enable the adjusting bars 324 to drive the tactile feedback members 312 to change tactile feedback of the keyswitch structures 310. In other words, the embodiment of FIG. 39A is substantially the same as the embodiment 18. As shown in FIG. 39A, the adjusting plate 320 is movably disposed on the bottom housing 330 and has a control member 15. The control member 15 is connected to the plate body 322 and exposed outside the bottom housing 330 and provided for a user to control the movement of the adjusting plate 320 to different positions. The user can move the adjusting plate 320 to the first position shown in FIG. 39A or the second position shown in FIG. 39B by directly move the control member 15, so as to change the tactile feedback of the keyswitch structures. For example, as shown in FIG. 39A, when the control member 15 and the adjusting plate 320 are located at the first position relative to the bottom housing 330, the adjusting bar 324 is located at a position relative to the extending arm of the tactile feedback member 312 similar to that in FIG. 11B, 12B, or 13B, e.g. the position of FIG. 11B in this embodiment, so the plurality of keyswitch structures 310 provide a first tactile feedback. In this configuration, the adjusting plate 320 is closer to the right side of the bottom housing 330, and similar to the above embodiments, the magnetic member (e.g. 353*a*) at the right side of the bottom housing 330 and the magnetic member (e.g. 353*b*) at the right side of the adjusting plate 320 are close to each other due to attraction force, so as to enhance the positioning effect of the adjusting plate 320 at the first position.

As shown in FIG. 39B, when control member 15 drives the adjusting plate 320 to move to the second position relative to the bottom housing 330, the adjusting bar 324 is located at a position relative to the extending arm of the tactile feedback member 312 similar to that in FIG. 12B, 13B, or 14B, e.g. the position of FIG. 12B in this embodiment, so the plurality of keyswitch structures 310 provide a tactile feedback different the first tactile feedback. Specifically, when a force is applied to the control member 15 to drive the adjusting plate 320 to move in the Y-axis direction toward the left side, the plurality of adjusting bars 324 drive the corresponding extending arms of the tactile feedback members 312 to move along the Y-axis direction toward the left side, e.g. moving in a direction away from the moving path of the cam portion 131, so as to change the tactile feedback provided by the keyswitch structures 310, such as a different pressing force, a dome-collapse-like tactile feedback, or a linear feedback. In this configuration, the adjusting plate 320 is closer to the left side of the bottom housing 330, and similar to the above embodiments, the magnetic member (e.g. 353a) at the left side of the bottom housing 330 and the magnetic member (e.g. 353b) at the left side of the adjusting plate 320 are close to each other due to attraction force, so as to enhance the positioning effect of the adjusting plate 320 at the second position.

Figure 40:
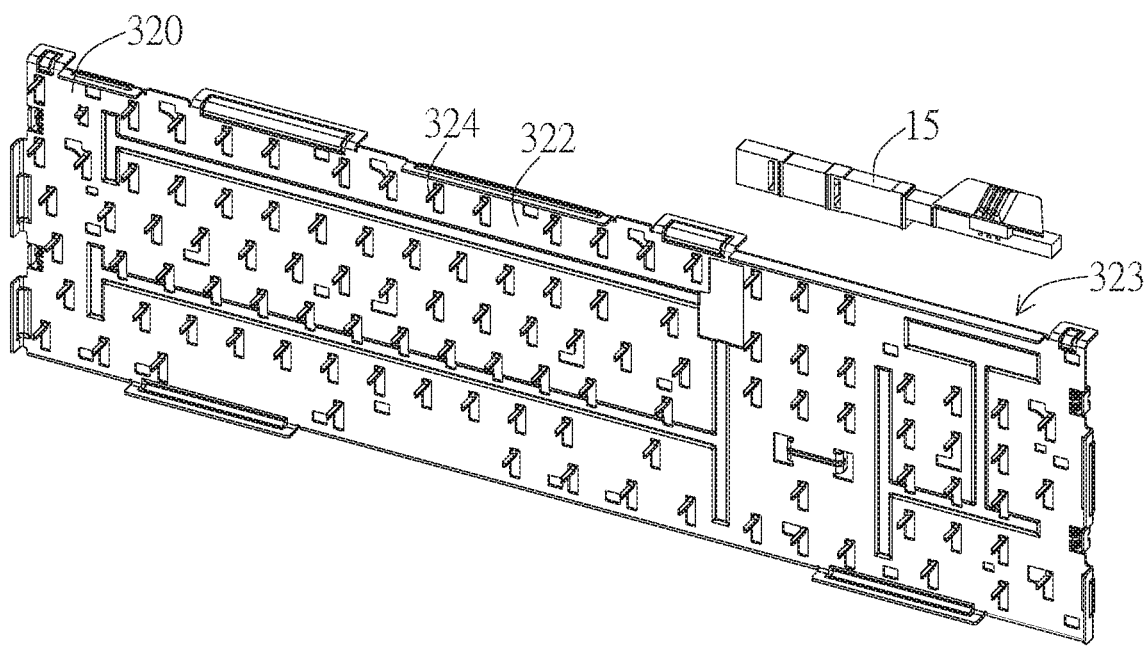
FIG. 40 is a schematic view of the adjusting plate and the control member of the invention

As shown in FIG. 40, in an embodiment, the plate body 322 of the adjusting plate 320 preferably has an engaging portion 323 to engage the control member 15, so that the adjusting plate 320 can move together with the control member 15. For example, the engaging portion 323 can be a trough and the control member 15 is engaged with the trough by shape. In this embodiment, the control member 15 may have a configuration similar to that of the first linking bar, e.g. 342 or 342', and multiple set of magnetic members e.g. 351a, 351b and 352a, 352b, can be provided correspondingly to the control member 15 and the bottom housing, to enhance the positioning effect of the control member 15. It noted that in this embodiment the control member 15 and the plate body 322 are illustrated as two separate components, but not limited thereto. In another embodiment, the control member 15 can be integrated to the adjusting plate 320 to be a portion of the adjusting plate 320, which extends from the plate body 322.

Although the preferred embodiments of the present disclosure have been described herein, the above description is merely illustrative. The preferred embodiments disclosed will not limit the scope of the present disclosure. Further modification of the disclosure herein disclosed will occur to those skilled in the respective arts and all such modifications are deemed to be within the scope of the disclosure as defined by the appended claims.

What is claimed is:

1. A keyboard, comprising:
   a plurality of keyswitch structures, each of the keyswitch structures comprising a tactile feedback member; and
   an adjusting plate movably disposed under the keyswitch structures, the adjusting plate comprising a plate body and a plurality of adjusting bars protruding from the plate body toward the keyswitch structures and respectively corresponding to the tactile feedback members of the keyswitch structures,
   wherein each tactile feedback member includes a positioning portion and an extending arm such that
   when the adjusting plate moves in a first direction relative to the keyswitch structures, the adjusting bars drive the positioning portion to deform along the same direction of the adjusting plate, so as to change the orientation of the extending arm along a second direction, perpendicular to the first direction.

2. A keyboard, comprising:
   a plurality of keyswitch structures, each of the keyswitch structures comprising a cam portion and a tactile feedback member having an extending arm extending across a moving path of the cam portion; and
   an adjusting plate movably disposed under the keyswitch structures, the adjusting plate comprising a plate body and a plurality of adjusting bars protruding from the plate body toward the keyswitch structures and respectively corresponding to the tactile feedback members of the keyswitch structures,
   wherein when the adjusting plate moves in one direction relative to the keyswitch structures, a position of the extending arm relative to the moving path in each of the keyswitch structures is changed by the adjusting bars' movement back and forth along the one direction.

3. The keyboard of claim 2, further comprising a bottom housing, wherein the adjusting plate movably is disposed on the bottom housing; the adjusting plate has a control member coupling with the plate body; the control member is exposed outside the bottom housing and provided for a user to control the movement of the adjusting plate to different positions.

4. The keyboard of claim 2, further comprising a switch unit and an indicator electrically connected to the switch unit, wherein the adjusting plate further comprises an indicator bar disposed corresponding to the switch unit; when the linking mechanism moves, the indicator bar selectively triggers the switch unit to change an indicating status of the indicator to indicate whether the tactile feedback of the keyswitch structures is changed.

5. The keyboard of claim 2, comprising a set of magnetic members disposed corresponding to the adjusting plate and the bottom housing, wherein when the adjusting plate moves, the set of magnetic members are selectively close to or away from each other; the tactile feedback member comprises a positioning portion; the adjusting bar corresponds to the positioning portion or the extending arm; when the adjusting plate moves, the adjusting bar drives the positioning portion or the extending arm to move to change a relative position of the positioning portion and the extending arm.

6. The keyboard of claim 2, further comprising:
   a bottom housing disposed under the adjusting plate; and
   a linking mechanism movably disposed on the bottom housing and coupling with the adjusting plate,
   wherein when the linking mechanism moves relative to the bottom housing, the adjusting plate moves along with the linking mechanism.

7. The keyboard of claim 6, wherein the linking mechanism comprises a rotatable unit and a coupling unit coupling the rotatable unit and the adjusting plate; the rotatable unit is rotatable about a rotation axis and has a slot having a first end and a second end; a distance between the first end and the rotation axis is different from a distance between the second end and the rotation axis; the coupling unit has a protrusion; when the rotatable unit rotates relative to the bottom housing, the slot rotates relative to the protrusion, so the protrusion is located in the slot near the first end or the second end to drive the adjusting plate to move.

8. The keyboard of claim 6, wherein the linking mechanism comprises a rotatable unit rotatable about a rotation axis; the rotatable unit has a slot having a first end and a second end; a distance between the first end and the rotation axis is different from a distance between the second end and the rotation axis; the adjusting plate has a protrusion; when the rotatable unit rotates relative to the bottom housing, the slot rotates relative to the protrusion, so the protrusion is located in the slot near the first end or the second end to drive the adjusting plate to move.

9. The keyboard of claim 6, wherein the linking mechanism comprises a first linking bar movably disposed on the bottom housing and a second linking bar rotatably disposed on the bottom housing; a first end of the second linking bar couples with the first linking bar, and a second end of the second linking bar couples with the plate body.

10. The keyboard of claim 9, wherein the plate body has a coupling portion; the coupling portion is bent downward from the plate body to couple with the second end of the second linking bar; the first linking bar has an accommodation portion; the first end of the second linking bar is accommodated in the accommodation portion; the second end of the second linking bar is pivotally connected to the bottom housing.

11. The keyboard of claim 9, further comprising a set of magnetic members disposed corresponding to the bottom housing and the first linking bar, wherein when the linking mechanism moves, the set of magnetic members are selectively close to or away from each other.

12. The keyboard of claim 6, wherein the linking mechanism comprises:
   a rotatable unit rotatably disposed on the bottom housing;
   a first linking bar coupling with the rotatable unit; and
   a second linking bar rotatably disposed on the bottom housing,
   wherein a first end of the second linking bar couples with the first linking bar, and a second end of the second linking bar couples with the plate body.

13. The keyboard of claim 12, further comprising a resilient member connected to the second linking bar and the bottom housing, and a set of magnetic members disposed corresponding to the rotatable unit and the bottom housing, wherein when the rotatable unit rotates, the set of magnetic members are selectively close to or away from each other.

14. The keyboard of claim 12, wherein the plate body has a coupling portion; the coupling portion is bent downward from the plate body to couple with the second end of the second linking bar, and the first linking bar has an accommodation portion; the first end of the second linking bar is accommodated in the accommodation portion; the second end of the second linking bar is pivotally connected to the bottom housing.

15. A keyboard, comprising:
   a keyswitch module, comprising:
      a plurality of keyswitch structures, each of the keyswitch structures comprising a tactile feedback member;
      an adjusting plate disposed under the keyswitch structures, the adjusting plate comprising a plate body and a plurality of adjusting bars protruding from the plate body toward the keyswitch structures and respectively corresponding to the tactile feedback members of the keyswitch structures;
      a bottom housing disposed under the adjusting plate; and
      a linking mechanism movably disposed on the bottom housing and coupling with the adjusting plate; and
   an auxiliary module connected to the keyswitch module, the auxiliary module comprising a driving device and a coupling member, the coupling member coupling the driving device and the linking mechanism, the driving device driving the coupling member to move to drive the linking mechanism to move relative to the bottom housing, so that the adjusting plate moves along with the linking mechanism, and the adjusting bars drive the tactile feedback members to change tactile feedback of the keyswitch structures.

16. The keyboard of claim 15, wherein the auxiliary module is detachably connected to the keyboard module, and the auxiliary module is electrically connected to the keyswitch module by a pogo pin; the auxiliary module further comprises a wireless module; the keyswitch module is wirelessly connected to an information processing device by the wireless module.

17. The keyboard of claim 15, further comprising a switch unit and an indicator electrically connected to the switch unit, wherein the adjusting plate further comprises an indicator bar disposed corresponding to the switch unit; when the linking mechanism moves, the indicator bar selectively triggers the switch unit to change an indicating status of the indicator to indicate whether the tactile feedback of the keyswitch structures is changed.

18. The keyboard of claim 15, comprising a set of magnetic members disposed corresponding to the adjusting plate and the bottom housing, wherein when the adjusting plate moves, the set of magnetic members are selectively close to or away from each other; the tactile feedback member comprises a positioning portion and an extending arm; the adjusting bar corresponds to the positioning portion or the extending arm; when the adjusting plate moves, the adjusting bar drives the positioning portion or the extending arm to move to change a relative position of the positioning portion and the extending arm.

19. The keyboard of claim 15, wherein the linking mechanism comprises a first linking bar movably disposed on the bottom housing and a second linking bar rotatably disposed on the bottom housing; a first end of the second linking bar couples with the first linking bar, and a second end of the second linking bar couples with the plate body.

20. The keyboard of claim 19, wherein the plate body has a coupling portion; the coupling portion is bent downward from the plate body to couple with the second end of the second linking bar; the first linking bar has an accommodation portion; the first end of the second linking bar is accommodated in the accommodation portion; the second end of the second linking bar is pivotally connected to the bottom housing.

21. The keyboard of claim 20, further comprising a set of magnetic members disposed corresponding to the bottom housing and the first linking bar, wherein when the linking mechanism moves, the set of magnetic members are selectively close to or away from each other.

* * * * *